US012747728B2

(12) United States Patent
Yeung et al.

(10) Patent No.: US 12,747,728 B2
(45) Date of Patent: Sep. 29, 2026

(54) CRANKSHAFT AND CONNECTING ROD ASSEMBLIES FOR HYDRAULIC FRACTURING PUMPS

(71) Applicant: BJ Energy Solutions, LLC, The Woodlands, TX (US)

(72) Inventors: Tony Yeung, The Woodlands, TX (US); Hau Nguyen-Phuc Pham, The Woodlands, TX (US)

(73) Assignee: BJ Energy Solutions, LLC, The Woodlands, TX (US)

( * ) Notice: Subject to any disclaimer, the term of this patent is extended or adjusted under 35 U.S.C. 154(b) by 0 days.

(21) Appl. No.: 18/528,967

(22) Filed: Dec. 5, 2023

(65) Prior Publication Data

US 2024/0151221 A1 May 9, 2024

Related U.S. Application Data

(63) Continuation-in-part of application No. 17/664,578, filed on May 23, 2022, now Pat. No. 11,639,654.

(Continued)

(51) Int. Cl.

*F04B 53/00* (2006.01)
*E21B 43/26* (2006.01)

(Continued)

(52) U.S. Cl.

CPC .............. *F04B 53/006* (2013.01); *F16C 3/06* (2013.01); *F16C 7/02* (2013.01); *E21B 43/2607* (2020.05)

(58) Field of Classification Search

CPC ...... F16C 3/06; F16C 3/08; F16C 7/02; F16C 9/02; F16C 9/04; F04B 53/006; E21B 43/2607

See application file for complete search history.

(56) References Cited

U.S. PATENT DOCUMENTS 405,150 A 6/1889 Dodd
459,097 A * 9/1891 Kenyon .................... F16C 7/02 403/162

(Continued)

FOREIGN PATENT DOCUMENTS

AU 9609498 A 7/1999
AU 737970 B2 9/2001

(Continued)

OTHER PUBLICATIONS

Machine translation of CN 103459863 A obtained on Jan. 27, 2025.*

(Continued)

*Primary Examiner* — Adam D Rogers
(74) *Attorney, Agent, or Firm* — Norton Rose Fulbright, US LLP

(57) ABSTRACT

Crankshaft and connecting rod assemblies for hydraulic fracturing pumps and related methods may enhance the flow of fracturing fluid into a wellhead during a high-pressure fracturing operation. The assemblies and methods may include a crankshaft having a crankpin between first and second journals. The crankpin may include first and second longitudinally spaced ridges at least partially extending circumferentially around the crankpin. The assemblies and methods further may include first and second connecting rods connected to the crankpin. The first connecting rod may include first and second crankpin connectors connected to the crankpin and at least partially defining therebetween a connecting rod clearance between and positioned to at least partially receive therein an end of a second connecting rod. The assemblies and methods also may include first and second rod clamps connected to the first crankpin connector, thereby to rotatably connect the first and second connecting rods to the crankpin.

20 Claims, 16 Drawing Sheets

Related U.S. Application Data

(60) Provisional application No. 63/386,289, filed on Dec. 6, 2022, provisional application No. 63/202,031, filed on May 24, 2021.

(51) Int. Cl.
*F16C 3/06* (2006.01)
*F16C 7/02* (2006.01)

(56) References Cited

U.S. PATENT DOCUMENTS 831,608 A * 9/1906 Everett ..................... F16C 3/06 74/595
1,322,824 A 11/1919 Royce
1,716,049 A 6/1929 Greve
1,726,633 A 9/1929 Smith
1,997,834 A 4/1935 Root et al.
2,178,662 A 11/1939 Hanson
2,427,638 A * 9/1947 Vilter .................... F04B 27/053 417/281
2,448,379 A 8/1948 Mantle
2,498,229 A 2/1950 Adler
2,535,703 A 12/1950 Smith et al.
2,572,711 A 10/1951 William
2,820,341 A 1/1958 Amann
2,868,004 A 1/1959 Runde
2,940,377 A 6/1960 Darnell et al.
2,947,141 A 8/1960 Russ
2,956,738 A 10/1960 Af et al.
3,068,796 A 12/1962 Pfluger et al.
3,191,517 A 6/1965 Solzman
3,241,896 A 3/1966 Pinkerton
3,257,031 A 6/1966 Dietz
3,274,768 A 9/1966 Klein
3,378,074 A 4/1968 Kiel
3,382,671 A 5/1968 Ehni, III
3,401,873 A 9/1968 Privon et al.
3,463,612 A 8/1969 Whitsel, Jr.
3,496,880 A 2/1970 Wolff
3,550,696 A 12/1970 Kenneday
3,560,053 A 2/1971 Ortloff
3,586,459 A 6/1971 Zerlauth
3,632,222 A 1/1972 Cronstedt
3,656,582 A 4/1972 Alcock
3,667,868 A 6/1972 Rudolf
3,692,434 A 9/1972 Schnear
3,739,872 A 6/1973 McNair
3,757,581 A 9/1973 Mankin et al.
3,759,063 A 9/1973 Bendall
3,765,173 A 10/1973 Harris
3,771,916 A 11/1973 Flanigan et al.
3,773,438 A 11/1973 Hall et al.
3,781,135 A 12/1973 Nickell
3,786,835 A 1/1974 Finger
3,791,682 A 2/1974 Mitchell
3,796,045 A 3/1974 Foster-Pegg
3,814,549 A 6/1974 Cronstedt
3,820,922 A 6/1974 Sensinger et al.
3,847,511 A 11/1974 Cole
3,866,108 A 2/1975 Yannone et al.
3,875,380 A 4/1975 Rankin
3,963,372 A 6/1976 McLain et al.
4,010,613 A 3/1977 McInerney
4,019,477 A 4/1977 Overton
4,031,407 A 6/1977 Reed
4,050,862 A 9/1977 Buse
4,059,045 A 11/1977 McClain
4,086,976 A 5/1978 Holm et al.
4,117,342 A 9/1978 Melley, Jr.
4,173,121 A 11/1979 Yu
4,204,808 A 5/1980 Reese et al.
4,209,079 A 6/1980 Marchal et al.
4,209,979 A 7/1980 Woodhouse et al.
4,222,229 A 9/1980 Uram
4,239,396 A 12/1980 Arribau et al.
4,269,569 A 5/1981 Hoover
4,311,395 A 1/1982 Douthitt et al.
4,330,237 A 5/1982 Battah
4,341,508 A 7/1982 Rambin, Jr.
4,357,027 A 11/1982 Zeitlow
4,383,478 A 5/1983 Jones
4,402,504 A 9/1983 Christian
4,430,047 A 2/1984 Ilg
4,442,665 A 4/1984 Fick et al.
4,457,325 A 7/1984 Green
4,470,771 A 9/1984 Hall et al.
4,483,684 A 11/1984 Black
4,505,650 A 3/1985 Hannett et al.
4,574,880 A 3/1986 Handke
4,584,654 A 4/1986 Crane
4,620,330 A 11/1986 Izzi, Sr.
4,655,693 A 4/1987 Grime
4,672,813 A 6/1987 David
4,754,607 A 7/1988 Mackay
4,782,244 A 11/1988 Wakimoto
4,796,777 A 1/1989 Keller
4,869,209 A 9/1989 Young
4,913,625 A 4/1990 Gerlowski
4,983,259 A 1/1991 Duncan et al.
4,990,058 A 2/1991 Eslinger
5,032,065 A 7/1991 Yamamuro et al.
5,135,361 A 8/1992 Dion
5,167,493 A 12/1992 Kobari
5,245,970 A 9/1993 Iwaszkiewicz et al.
5,291,842 A 3/1994 Sallstrom et al.
5,326,231 A 7/1994 Pandeya et al.
5,362,219 A 11/1994 Paul et al.
5,370,504 A 12/1994 Nagashima
5,511,956 A 4/1996 Hasegawa et al.
5,537,813 A 7/1996 Davis et al.
5,553,514 A 9/1996 Walkowc
5,560,195 A 10/1996 Anderson et al.
5,586,444 A 12/1996 Fung
5,622,245 A 4/1997 Reik et al.
5,626,103 A 5/1997 Haws et al.
5,634,777 A 6/1997 Albertin et al.
5,651,400 A 7/1997 Corts et al.
5,678,460 A 10/1997 Walkowc
5,717,172 A 2/1998 Griffin, Jr. et al.
5,720,598 A 2/1998 de Chizzelle
5,761,084 A 6/1998 Edwards
5,811,676 A 9/1998 Spalding et al.
5,839,888 A 11/1998 Harrison
5,846,062 A 12/1998 Yanagisawa et al.
5,875,744 A 3/1999 Vallejos
5,983,962 A 11/1999 Gerardot
5,992,944 A 11/1999 Hara
6,041,856 A 3/2000 Thrasher et al.
6,050,080 A 4/2000 Horner
6,067,962 A 5/2000 Bartley et al.
6,071,188 A 6/2000 O'Neill et al.
6,074,170 A 6/2000 Bert et al.
6,123,751 A 9/2000 Nelson et al.
6,129,335 A 10/2000 Yokogi
6,145,318 A 11/2000 Kaplan et al.
6,202,537 B1 * 3/2001 Havran ................. F02B 75/243 92/72
6,209,495 B1 4/2001 Warren
6,230,481 B1 5/2001 Jahr
6,279,309 B1 8/2001 Lawlor et al.
6,321,860 B1 11/2001 Reddoch
6,334,746 B1 1/2002 Nguyen et al.
6,401,472 B2 6/2002 Pollrich et al.
6,530,224 B1 3/2003 Conchieri
6,543,395 B2 4/2003 Green
6,655,922 B1 12/2003 Flek
6,669,453 B1 12/2003 Breeden et al.
6,765,304 B2 7/2004 Baten et al.
6,786,051 B2 9/2004 Kristich et al.
6,832,900 B2 12/2004 Leu
6,851,514 B2 2/2005 Han et al.
6,859,740 B2 2/2005 Stephenson et al.
6,901,735 B2 6/2005 Lohn

(56) References Cited

U.S. PATENT DOCUMENTS

| | | | | |
|---|---|---|---|---|
| 6,962,057 | B2 | 11/2005 | Kurokawa et al. | |
| 7,007,966 | B2 | 3/2006 | Campion | |
| 7,047,747 | B2 | 5/2006 | Tanaka | |
| 7,065,953 | B1 | 6/2006 | Kopko | |
| 7,143,016 | B1 | 11/2006 | Discenzo et al. | |
| 7,222,015 | B2 | 5/2007 | Davis et al. | |
| 7,281,519 | B2 | 10/2007 | Schroeder et al. | |
| 7,388,303 | B2 | 6/2008 | Seiver | |
| 7,404,294 | B2 | 7/2008 | Sundin | |
| 7,442,239 | B2 | 10/2008 | Armstrong et al. | |
| 7,469,664 | B2 * | 12/2008 | Hofbauer | F02B 33/12 123/70 R |
| 7,524,173 | B2 | 4/2009 | Cummins | |
| 7,545,130 | B2 | 6/2009 | Latham | |
| 7,552,903 | B2 | 6/2009 | Dunn et al. | |
| 7,563,076 | B2 | 7/2009 | Brunet et al. | |
| 7,563,413 | B2 | 7/2009 | Naets et al. | |
| 7,574,325 | B2 | 8/2009 | Dykstra | |
| 7,581,379 | B2 | 9/2009 | Yoshida et al. | |
| 7,594,424 | B2 | 9/2009 | Fazekas | |
| 7,614,239 | B2 | 11/2009 | Herzog et al. | |
| 7,627,416 | B2 | 12/2009 | Batenburg et al. | |
| 7,677,316 | B2 | 3/2010 | Butler et al. | |
| 7,721,521 | B2 | 5/2010 | Kunkle et al. | |
| 7,730,711 | B2 | 6/2010 | Kunkle et al. | |
| 7,779,961 | B2 | 8/2010 | Matte | |
| 7,789,452 | B2 | 9/2010 | Dempsey et al. | |
| 7,836,949 | B2 | 11/2010 | Dykstra | |
| 7,841,394 | B2 | 11/2010 | McNeel et al. | |
| 7,845,413 | B2 | 12/2010 | Shampine et al. | |
| 7,861,679 | B2 | 1/2011 | Lemke et al. | |
| 7,886,702 | B2 | 2/2011 | Jerrell et al. | |
| 7,900,724 | B2 | 3/2011 | Promersberger et al. | |
| 7,921,914 | B2 | 4/2011 | Bruins et al. | |
| 7,938,151 | B2 | 5/2011 | Hockner | |
| 7,955,056 | B2 | 6/2011 | Pettersson | |
| 7,980,357 | B2 | 7/2011 | Edwards | |
| 8,056,635 | B2 | 11/2011 | Shampine et al. | |
| 8,083,504 | B2 | 12/2011 | Williams et al. | |
| 8,099,942 | B2 | 1/2012 | Alexander et al. | |
| 8,186,334 | B2 | 5/2012 | Ooyama | |
| 8,196,555 | B2 | 6/2012 | Ikeda et al. | |
| 8,202,354 | B2 | 6/2012 | Iijima | |
| 8,316,936 | B2 | 11/2012 | Roddy et al. | |
| 8,336,631 | B2 | 12/2012 | Shampine et al. | |
| 8,388,317 | B2 | 3/2013 | Sung | |
| 8,414,673 | B2 | 4/2013 | Raje et al. | |
| 8,469,826 | B2 | 6/2013 | Brosowske | |
| 8,500,215 | B2 | 8/2013 | Gastauer et al. | |
| 8,506,267 | B2 | 8/2013 | Gambier et al. | |
| 8,575,873 | B2 | 11/2013 | Peterson et al. | |
| 8,616,005 | B1 | 12/2013 | Cousino, Sr. | |
| 8,621,873 | B2 | 1/2014 | Robertson et al. | |
| 8,641,399 | B2 | 2/2014 | Mucibabic et al. | |
| 8,656,990 | B2 | 2/2014 | Kajaria et al. | |
| 8,672,606 | B2 | 3/2014 | Glynn et al. | |
| 8,707,853 | B1 | 4/2014 | Dille et al. | |
| 8,708,667 | B2 | 4/2014 | Collingborn | |
| 8,714,253 | B2 | 5/2014 | Sherwood et al. | |
| 8,757,918 | B2 | 6/2014 | Ramnarain et al. | |
| 8,763,583 | B2 | 7/2014 | Hofbauer et al. | |
| 8,770,329 | B2 | 7/2014 | Spitler | |
| 8,784,081 | B1 | 7/2014 | Blume | |
| 8,789,601 | B2 | 7/2014 | Broussard et al. | |
| 8,794,307 | B2 | 8/2014 | Coquilleau et al. | |
| 8,801,394 | B2 | 8/2014 | Anderson | |
| 8,851,186 | B2 | 10/2014 | Shampine et al. | |
| 8,851,441 | B2 | 10/2014 | Acuna et al. | |
| 8,894,356 | B2 | 11/2014 | Lafontaine et al. | |
| 8,905,056 | B2 | 12/2014 | Kendrick | |
| 8,951,019 | B2 | 2/2015 | Hains et al. | |
| 8,973,560 | B2 | 3/2015 | Krug | |
| 8,997,904 | B2 | 4/2015 | Cryer et al. | |
| 9,011,111 | B2 | 4/2015 | Lesko | |
| 9,016,383 | B2 | 4/2015 | Shampine et al. | |
| 9,032,620 | B2 | 5/2015 | Frassinelli et al. | |
| 9,057,247 | B2 | 6/2015 | Kumar et al. | |
| 9,097,249 | B2 | 8/2015 | Petersen | |
| 9,103,193 | B2 | 8/2015 | Coli et al. | |
| 9,121,257 | B2 | 9/2015 | Coli et al. | |
| 9,133,765 | B2 | 9/2015 | Hofbauer | |
| 9,140,110 | B2 | 9/2015 | Coli et al. | |
| 9,175,810 | B2 | 11/2015 | Hains et al. | |
| 9,187,982 | B2 | 11/2015 | Dehring et al. | |
| 9,206,667 | B2 | 12/2015 | Khvoshchev et al. | |
| 9,212,643 | B2 | 12/2015 | Deliyski | |
| 9,222,346 | B1 | 12/2015 | Walls | |
| 9,324,049 | B2 | 4/2016 | Thomeer et al. | |
| 9,341,055 | B2 | 5/2016 | Weightman et al. | |
| 9,346,662 | B2 | 5/2016 | Van Vliet et al. | |
| 9,366,114 | B2 | 6/2016 | Coli et al. | |
| 9,376,786 | B2 | 6/2016 | Numasawa | |
| 9,394,829 | B2 | 7/2016 | Cabeen et al. | |
| 9,395,049 | B2 | 7/2016 | Vicknair et al. | |
| 9,401,670 | B2 | 7/2016 | Minato | |
| 9,410,410 | B2 | 8/2016 | Broussard et al. | |
| 9,410,546 | B2 | 8/2016 | Jaeger et al. | |
| 9,429,078 | B1 | 8/2016 | Crowe et al. | |
| 9,435,333 | B2 | 9/2016 | McCoy et al. | |
| 9,453,528 | B2 * | 9/2016 | Schick | F16C 9/02 |
| 9,488,169 | B2 | 11/2016 | Cochran et al. | |
| 9,493,997 | B2 | 11/2016 | Liu et al. | |
| 9,512,783 | B2 | 12/2016 | Veilleux, Jr. et al. | |
| 9,534,473 | B2 | 1/2017 | Morris et al. | |
| 9,546,652 | B2 | 1/2017 | Yin | |
| 9,550,501 | B2 | 1/2017 | Ledbetter et al. | |
| 9,556,721 | B2 | 1/2017 | Jang et al. | |
| 9,562,420 | B2 | 2/2017 | Morris et al. | |
| 9,570,945 | B2 | 2/2017 | Fischer | |
| 9,579,980 | B2 | 2/2017 | Cryer et al. | |
| 9,587,649 | B2 | 3/2017 | Oehring | |
| 9,593,710 | B2 | 3/2017 | Laimboeck et al. | |
| 9,611,728 | B2 | 4/2017 | Oehring | |
| 9,617,808 | B2 | 4/2017 | Liu et al. | |
| 9,638,101 | B1 | 5/2017 | Crowe et al. | |
| 9,638,194 | B2 | 5/2017 | Wiegman et al. | |
| 9,650,871 | B2 | 5/2017 | Oehring et al. | |
| 9,656,762 | B2 | 5/2017 | Kamath et al. | |
| 9,689,316 | B1 | 6/2017 | Crom | |
| 9,695,808 | B2 | 7/2017 | Giessbach et al. | |
| 9,739,130 | B2 | 8/2017 | Young | |
| 9,764,266 | B1 | 9/2017 | Carter | |
| 9,777,748 | B2 | 10/2017 | Lu et al. | |
| 9,803,467 | B2 | 10/2017 | Tang et al. | |
| 9,803,793 | B2 | 10/2017 | Davi et al. | |
| 9,809,308 | B2 | 11/2017 | Aguilar et al. | |
| 9,829,002 | B2 | 11/2017 | Crom | |
| 9,840,897 | B2 | 12/2017 | Larson | |
| 9,840,901 | B2 | 12/2017 | Oehring et al. | |
| 9,845,730 | B2 | 12/2017 | Betti et al. | |
| 9,850,422 | B2 | 12/2017 | Lestz et al. | |
| 9,856,131 | B1 | 1/2018 | Moffitt, Jr. | |
| 9,863,279 | B2 | 1/2018 | Laing et al. | |
| 9,869,305 | B1 | 1/2018 | Crowe et al. | |
| 9,871,406 | B1 | 1/2018 | Churnock et al. | |
| 9,879,609 | B1 | 1/2018 | Crowe et al. | |
| RE46,725 | E | 2/2018 | Case et al. | |
| 9,893,500 | B2 | 2/2018 | Oehring et al. | |
| 9,893,660 | B2 | 2/2018 | Peterson et al. | |
| 9,897,003 | B2 | 2/2018 | Motakef et al. | |
| 9,920,615 | B2 | 3/2018 | Zhang et al. | |
| 9,945,365 | B2 | 4/2018 | Hernandez et al. | |
| 9,964,052 | B2 | 5/2018 | Millican et al. | |
| 9,970,278 | B2 | 5/2018 | Broussard et al. | |
| 9,981,840 | B2 | 5/2018 | Shock | |
| 9,995,102 | B2 | 6/2018 | Dille et al. | |
| 9,995,218 | B2 | 6/2018 | Oehring et al. | |
| 10,008,880 | B2 | 6/2018 | Vicknair et al. | |
| 10,008,912 | B2 | 6/2018 | Davey et al. | |
| 10,018,096 | B2 | 7/2018 | Wallimann et al. | |
| 10,020,711 | B2 | 7/2018 | Oehring et al. | |
| 10,024,123 | B2 | 7/2018 | Steffenhagen et al. | |
| 10,029,289 | B2 | 7/2018 | Wendorski et al. | |
| 10,030,579 | B2 | 7/2018 | Austin et al. | |

(56) References Cited

U.S. PATENT DOCUMENTS

| | | | |
|---|---|---|---|
| 10,036,238 | B2 | 7/2018 | Oehring |
| 10,040,541 | B2 | 8/2018 | Wilson et al. |
| 10,060,293 | B2 | 8/2018 | Del Bono |
| 10,060,349 | B2 | 8/2018 | Morales Álvarez et al. |
| 10,077,933 | B2 | 9/2018 | Nelson et al. |
| 10,082,137 | B2 | 9/2018 | Graham et al. |
| 10,094,366 | B2 | 10/2018 | Marica |
| 10,100,827 | B2 | 10/2018 | Devan et al. |
| 10,107,084 | B2 | 10/2018 | Coli et al. |
| 10,107,085 | B2 | 10/2018 | Coli et al. |
| 10,114,061 | B2 | 10/2018 | Frampton et al. |
| 10,119,381 | B2 | 11/2018 | Oehring et al. |
| 10,125,750 | B2 | 11/2018 | Pfaff et al. |
| 10,134,257 | B2 | 11/2018 | Zhang et al. |
| 10,138,098 | B2 | 11/2018 | Sørensen et al. |
| 10,151,244 | B2 | 12/2018 | Giancotti et al. |
| 10,161,423 | B2 | 12/2018 | Rampen et al. |
| 10,174,599 | B2 | 1/2019 | Shampine et al. |
| 10,184,397 | B2 | 1/2019 | Austin et al. |
| 10,196,258 | B2 | 2/2019 | Kalala et al. |
| 10,221,856 | B2 | 3/2019 | Hernandez et al. |
| 10,227,854 | B2 | 3/2019 | Glass |
| 10,227,855 | B2 | 3/2019 | Coli et al. |
| 10,246,984 | B2 | 4/2019 | Payne et al. |
| 10,247,182 | B2 | 4/2019 | Zhang et al. |
| 10,254,732 | B2 | 4/2019 | Oehring et al. |
| 10,267,439 | B2 | 4/2019 | Pryce et al. |
| 10,280,724 | B2 | 5/2019 | Hinderliter |
| 10,287,943 | B1 | 5/2019 | Schiltz |
| 10,288,519 | B2 | 5/2019 | De La Cruz |
| 10,303,190 | B2 | 5/2019 | Shock |
| 10,305,350 | B2 | 5/2019 | Johnson et al. |
| 10,316,832 | B2 | 6/2019 | Byrne |
| 10,317,875 | B2 | 6/2019 | Pandurangan et al. |
| 10,337,402 | B2 | 7/2019 | Austin et al. |
| 10,358,035 | B2 | 7/2019 | Cryer et al. |
| 10,371,012 | B2 | 8/2019 | Davis et al. |
| 10,374,485 | B2 | 8/2019 | Morris et al. |
| 10,378,326 | B2 | 8/2019 | Morris et al. |
| 10,393,108 | B2 | 8/2019 | Chong et al. |
| 10,407,990 | B2 | 9/2019 | Oehring et al. |
| 10,408,031 | B2 | 9/2019 | Oehring et al. |
| 10,415,348 | B2 | 9/2019 | Zhang et al. |
| 10,415,557 | B1 | 9/2019 | Crowe et al. |
| 10,415,562 | B2 | 9/2019 | Kajita et al. |
| RE47,695 | E | 11/2019 | Case et al. |
| 10,465,689 | B2 | 11/2019 | Crom |
| 10,478,753 | B1 | 11/2019 | Elms et al. |
| 10,526,882 | B2 | 1/2020 | Oehring et al. |
| 10,563,649 | B2 | 2/2020 | Zhang et al. |
| 10,577,910 | B2 | 3/2020 | Stephenson |
| 10,584,645 | B2 | 3/2020 | Nakagawa et al. |
| 10,590,867 | B2 | 3/2020 | Thomassin et al. |
| 10,598,258 | B2 | 3/2020 | Oehring et al. |
| 10,610,842 | B2 | 4/2020 | Chong |
| 10,662,749 | B1 | 5/2020 | Hill et al. |
| 10,711,787 | B1 | 7/2020 | Darley |
| 10,738,580 | B1 | 8/2020 | Fischer et al. |
| 10,753,153 | B1 | 8/2020 | Fischer et al. |
| 10,753,165 | B1 | 8/2020 | Fischer et al. |
| 10,760,556 | B1 | 9/2020 | Crom et al. |
| 10,794,165 | B2 | 10/2020 | Fischer et al. |
| 10,794,166 | B2 | 10/2020 | Reckels et al. |
| 10,801,311 | B1 | 10/2020 | Cui et al. |
| 10,815,764 | B1 | 10/2020 | Yeung et al. |
| 10,815,978 | B2 | 10/2020 | Glass |
| 10,830,032 | B1 | 11/2020 | Zhang et al. |
| 10,830,225 | B2 | 11/2020 | Repaci |
| 10,859,203 | B1 | 12/2020 | Cui et al. |
| 10,864,487 | B1 | 12/2020 | Han et al. |
| 10,865,624 | B1 | 12/2020 | Cui et al. |
| 10,865,631 | B1 | 12/2020 | Zhang et al. |
| 10,870,093 | B1 | 12/2020 | Zhong et al. |
| 10,871,045 | B2 | 12/2020 | Fischer et al. |
| 10,892,596 | B2 | 1/2021 | Enya et al. |
| 10,895,202 | B1 | 1/2021 | Yeung et al. |
| 10,900,475 | B2 | 1/2021 | Weightman et al. |
| 10,907,459 | B1 | 2/2021 | Yeung et al. |
| 10,927,774 | B2 | 2/2021 | Cai et al. |
| 10,927,802 | B2 | 2/2021 | Oehring et al. |
| 10,954,770 | B1 | 3/2021 | Yeung et al. |
| 10,954,855 | B1 | 3/2021 | Ji et al. |
| 10,961,614 | B1 | 3/2021 | Djavanroodi |
| 10,961,908 | B1 | 3/2021 | Yeung et al. |
| 10,961,912 | B1 | 3/2021 | Yeung et al. |
| 10,961,914 | B1 | 3/2021 | Yeung et al. |
| 10,961,993 | B1 | 3/2021 | Ji et al. |
| 10,961,995 | B2 | 3/2021 | Mayorca |
| 10,968,837 | B1 | 4/2021 | Yeung et al. |
| 10,982,523 | B1 | 4/2021 | Hill et al. |
| 10,989,019 | B2 | 4/2021 | Cai et al. |
| 10,989,180 | B2 | 4/2021 | Yeung et al. |
| 10,995,564 | B2 | 5/2021 | Miller et al. |
| 11,002,189 | B2 | 5/2021 | Yeung et al. |
| 11,008,950 | B2 | 5/2021 | Ethier et al. |
| 11,015,423 | B1 | 5/2021 | Yeung et al. |
| 11,015,536 | B2 | 5/2021 | Yeung et al. |
| 11,015,594 | B2 | 5/2021 | Yeung et al. |
| 11,022,526 | B1 | 6/2021 | Yeung et al. |
| 11,028,677 | B1 | 6/2021 | Yeung et al. |
| 11,035,213 | B2 | 6/2021 | Dusterhoft et al. |
| 11,035,214 | B2 | 6/2021 | Cui et al. |
| 11,047,379 | B1 | 6/2021 | Li et al. |
| 11,053,853 | B2 | 7/2021 | Li et al. |
| 11,060,455 | B1 | 7/2021 | Yeung et al. |
| 11,066,915 | B1 | 7/2021 | Yeung et al. |
| 11,068,455 | B2 | 7/2021 | Shabi et al. |
| 11,085,281 | B1 | 8/2021 | Yeung et al. |
| 11,085,282 | B2 | 8/2021 | Mazrooee et al. |
| 11,092,152 | B2 | 8/2021 | Yeung et al. |
| 11,098,651 | B1 | 8/2021 | Yeung et al. |
| 11,105,250 | B1 | 8/2021 | Zhang et al. |
| 11,105,266 | B2 | 8/2021 | Zhou et al. |
| 11,109,508 | B1 | 8/2021 | Yeung et al. |
| 11,111,768 | B1 | 9/2021 | Yeung et al. |
| 11,125,066 | B1 | 9/2021 | Yeung et al. |
| 11,125,156 | B2 | 9/2021 | Zhang et al. |
| 11,129,295 | B1 | 9/2021 | Yeung et al. |
| 11,143,000 | B2 | 10/2021 | Li et al. |
| 11,143,005 | B2 | 10/2021 | Dusterhoft et al. |
| 11,143,006 | B1 | 10/2021 | Zhang et al. |
| 11,149,533 | B1 | 10/2021 | Yeung et al. |
| 11,149,726 | B1 | 10/2021 | Yeung et al. |
| 11,156,159 | B1 | 10/2021 | Yeung et al. |
| 11,168,681 | B2 | 11/2021 | Boguski et al. |
| 11,174,716 | B1 | 11/2021 | Yeung et al. |
| 11,193,360 | B1 | 12/2021 | Yeung et al. |
| 11,193,361 | B1 | 12/2021 | Yeung et al. |
| 11,205,880 | B1 | 12/2021 | Zhou |
| 11,205,881 | B2 | 12/2021 | Makino |
| 11,208,879 | B1 | 12/2021 | Yeung et al. |
| 11,208,953 | B1 | 12/2021 | Yeung et al. |
| 11,220,895 | B1 | 1/2022 | Yeung et al. |
| 11,236,739 | B2 | 2/2022 | Yeung et al. |
| 11,242,737 | B2 | 2/2022 | Zhang et al. |
| 11,243,509 | B2 | 2/2022 | Cai et al. |
| 11,251,650 | B1 | 2/2022 | Liu et al. |
| 11,261,717 | B2 | 3/2022 | Yeung et al. |
| 11,268,346 | B2 | 3/2022 | Yeung et al. |
| 11,280,266 | B2 | 3/2022 | Yeung et al. |
| 11,306,835 | B1 | 4/2022 | Dille et al. |
| RE49,083 | E | 5/2022 | Case et al. |
| 11,339,638 | B1 | 5/2022 | Yeung et al. |
| 11,346,200 | B2 | 5/2022 | Cai et al. |
| 11,373,058 | B2 | 6/2022 | Jaaskelainen et al. |
| RE49,140 | E | 7/2022 | Case et al. |
| 11,377,943 | B2 | 7/2022 | Kriebel et al. |
| RE49,155 | E | 8/2022 | Case et al. |
| RE49,156 | E | 8/2022 | Case et al. |
| 11,401,927 | B2 | 8/2022 | Li et al. |
| 11,428,165 | B2 | 8/2022 | Yeung et al. |
| 11,441,483 | B2 | 9/2022 | Li et al. |
| 11,448,122 | B2 | 9/2022 | Feng et al. |
| 11,466,680 | B2 | 10/2022 | Yeung et al. |

(56) References Cited

U.S. PATENT DOCUMENTS 11,480,040 B2 10/2022 Han et al.
11,492,887 B2 11/2022 Cui et al.
11,499,405 B2 11/2022 Zhang et al.
11,506,039 B2 11/2022 Zhang et al.
11,512,570 B2 11/2022 Yeung et al.
11,519,395 B2 12/2022 Zhang et al.
11,519,405 B2 12/2022 Deng et al.
11,530,602 B2 12/2022 Yeung et al.
11,549,349 B2 1/2023 Wang et al.
11,555,390 B2 1/2023 Cui et al.
11,555,756 B2 1/2023 Yeung et al.
11,557,887 B2 1/2023 Ji et al.
11,560,779 B2 1/2023 Mao et al.
11,560,845 B2 1/2023 Yeung et al.
11,572,775 B2 2/2023 Mao et al.
11,575,249 B2 2/2023 Ji et al.
11,592,020 B2 2/2023 Chang et al.
11,596,047 B2 2/2023 Liu et al.
11,598,263 B2 3/2023 Yeung et al.
11,603,797 B2 3/2023 Zhang et al.
11,607,982 B2 3/2023 Tian et al.
11,608,726 B2 3/2023 Zhang et al.
11,624,326 B2 4/2023 Yeung et al.
11,629,583 B2 4/2023 Yeung et al.
11,629,589 B2 4/2023 Lin et al.
11,639,654 B2 * 5/2023 Yeung .................. F04B 1/0413
166/379
11,649,766 B1 5/2023 Yeung et al.
11,662,384 B2 5/2023 Liu et al.
11,668,173 B2 6/2023 Zhang et al.
11,668,289 B2 6/2023 Chang et al.
11,677,238 B2 6/2023 Liu et al.
11,732,563 B2 * 8/2023 Yeung .................. F04B 1/0413
166/379
11,867,045 B2 * 1/2024 Yeung .................... F04B 53/22
11,988,204 B2 5/2024 Chretien et al.
2002/0126922 A1 9/2002 Cheng et al.
2002/0197176 A1 12/2002 Kondo
2003/0031568 A1 2/2003 Stiefel
2003/0061819 A1 4/2003 Kuroki et al.
2003/0161212 A1 8/2003 Neal et al.
2004/0016245 A1 1/2004 Pierson
2004/0074238 A1 4/2004 Wantanabe et al.
2004/0076526 A1 4/2004 Fukano et al.
2004/0187950 A1 9/2004 Cohen et al.
2004/0219040 A1 11/2004 Kugelev et al.
2005/0051322 A1 3/2005 Speer
2005/0056081 A1 3/2005 Gocho
2005/0139286 A1 6/2005 Poulter et al.
2005/0196298 A1 9/2005 Manning
2005/0226754 A1 10/2005 Orr et al.
2005/0274134 A1 12/2005 Ryu et al.
2006/0061091 A1 3/2006 Osterloh
2006/0062914 A1 3/2006 Garg et al.
2006/0196251 A1 9/2006 Richey
2006/0211356 A1 9/2006 Grassman
2006/0228225 A1 10/2006 Rogers
2006/0260331 A1 11/2006 Andreychuk
2006/0272333 A1 12/2006 Sundin
2007/0029090 A1 2/2007 Andreychuk et al.
2007/0041848 A1 2/2007 Wood et al.
2007/0066406 A1 3/2007 Keller et al.
2007/0098580 A1 5/2007 Petersen
2007/0107981 A1 5/2007 Sicotte
2007/0125544 A1 6/2007 Robinson et al.
2007/0169543 A1 7/2007 Fazekas
2007/0181212 A1 8/2007 Fell
2007/0277982 A1 12/2007 Shampine et al.
2007/0295569 A1 12/2007 Manzoor et al.
2008/0006089 A1 1/2008 Adnan et al.
2008/0098891 A1 5/2008 Feher et al.
2008/0161974 A1 7/2008 Alston
2008/0212275 A1 9/2008 Waryck et al.
2008/0229757 A1 9/2008 Alexander et al.
2008/0264625 A1 10/2008 Ochoa
2008/0264649 A1 10/2008 Crawford
2008/0298982 A1 12/2008 Pabst et al.
2009/0064685 A1 3/2009 Busekros et al.
2009/0068031 A1 3/2009 Gambier et al.
2009/0092510 A1 4/2009 Williams et al.
2009/0124191 A1 5/2009 Van Becelaere
2009/0178412 A1 7/2009 Spytek
2009/0212630 A1 8/2009 Flegel et al.
2009/0249794 A1 10/2009 Wilkes et al.
2009/0252616 A1 10/2009 Brunet et al.
2009/0308602 A1 12/2009 Bruins et al.
2010/0019626 A1 1/2010 Stout et al.
2010/0071899 A1 3/2010 Coquilleau et al.
2010/0218508 A1 9/2010 Brown et al.
2010/0300683 A1 12/2010 Looper et al.
2010/0310384 A1 12/2010 Stephenson et al.
2011/0041681 A1 2/2011 Duerr
2011/0052423 A1 3/2011 Gambier et al.
2011/0054704 A1 3/2011 Karpman et al.
2011/0085924 A1 4/2011 Shampine et al.
2011/0142536 A1 6/2011 Ramnarain et al.
2011/0146244 A1 6/2011 Farman et al.
2011/0146246 A1 6/2011 Farman et al.
2011/0173991 A1 7/2011 Dean et al.
2011/0197988 A1 8/2011 Van Vliet et al.
2011/0241888 A1 10/2011 Lu et al.
2011/0265443 A1 11/2011 Ansari et al.
2011/0272158 A1 11/2011 Neal
2012/0023973 A1 2/2012 Mayorca
2012/0048242 A1 3/2012 Surnilla et al.
2012/0085541 A1 4/2012 Love et al.
2012/0137699 A1 6/2012 Montagne et al.
2012/0179444 A1 7/2012 Ganguly et al.
2012/0192542 A1 8/2012 Chillar et al.
2012/0199001 A1 8/2012 Chillar et al.
2012/0204627 A1 8/2012 Anderl et al.
2012/0207415 A1 8/2012 Tusinean et al.
2012/0255734 A1 10/2012 Coli et al.
2012/0310509 A1 12/2012 Pardo et al.
2012/0324903 A1 12/2012 Dewis et al.
2013/0039780 A1 2/2013 Lane
2013/0068307 A1 3/2013 Hains et al.
2013/0087045 A1 4/2013 Sullivan et al.
2013/0087945 A1 4/2013 Kusters et al.
2013/0134702 A1 5/2013 Boraas et al.
2013/0189915 A1 7/2013 Hazard
2013/0205798 A1 8/2013 Kwok et al.
2013/0233165 A1 9/2013 Matzner et al.
2013/0255953 A1 10/2013 Tudor
2013/0259707 A1 10/2013 Yin
2013/0284455 A1 10/2013 Kajaria et al.
2013/0300341 A1 11/2013 Gillette, II
2013/0306322 A1 11/2013 Sanborn et al.
2014/0000668 A1 1/2014 Lessard
2014/0010671 A1 1/2014 Cryer et al.
2014/0013768 A1 1/2014 Laing et al.
2014/0032082 A1 1/2014 Gehrke et al.
2014/0044517 A1 2/2014 Saha et al.
2014/0048253 A1 2/2014 Andreychuk
2014/0090729 A1 4/2014 Coulter et al.
2014/0090742 A1 4/2014 Coskrey et al.
2014/0094105 A1 4/2014 Lundh et al.
2014/0095114 A1 4/2014 Thomeer et al.
2014/0095554 A1 4/2014 Thomeer et al.
2014/0123621 A1 5/2014 Driessens et al.
2014/0130422 A1 5/2014 Laing et al.
2014/0138079 A1 5/2014 Broussard et al.
2014/0144641 A1 5/2014 Chandler
2014/0147291 A1 5/2014 Burnette
2014/0158345 A1 6/2014 Jang et al.
2014/0174097 A1 6/2014 Hammer et al.
2014/0196459 A1 7/2014 Futa et al.
2014/0216736 A1 8/2014 Leugemors et al.
2014/0219824 A1 8/2014 Burnette
2014/0250845 A1 9/2014 Jackson et al.
2014/0251623 A1 9/2014 Lestz et al.
2014/0277772 A1 9/2014 Lopez et al.
2014/0290266 A1 10/2014 Veilleux, Jr. et al.
2014/0318638 A1 10/2014 Harwood et al.

(56) References Cited

U.S. PATENT DOCUMENTS

2014/0322050 A1 10/2014 Marette et al.
2014/0328706 A1 11/2014 Kushnarev et al.
2015/0027730 A1 1/2015 Hall et al.
2015/0078924 A1 3/2015 Zhang et al.
2015/0101344 A1 4/2015 Jarrier et al.
2015/0114652 A1 4/2015 Lestz et al.
2015/0129210 A1 5/2015 Chong et al.
2015/0135659 A1 5/2015 Jarrier et al.
2015/0159553 A1 6/2015 Kippel et al.
2015/0192117 A1 7/2015 Bridges
2015/0204148 A1 7/2015 Liu et al.
2015/0204322 A1 7/2015 Iund et al.
2015/0211512 A1 7/2015 Wiegman et al.
2015/0214816 A1 7/2015 Raad
2015/0217672 A1 8/2015 Shampine et al.
2015/0226140 A1 8/2015 Zhang et al.
2015/0252661 A1 9/2015 Glass
2015/0275891 A1 10/2015 Chong
2015/0337730 A1 11/2015 Kupiszewski et al.
2015/0340864 A1 11/2015 Compton
2015/0345385 A1 12/2015 Santini
2015/0369351 A1 12/2015 Hermann et al.
2016/0025090 A1 1/2016 Bayyouk et al.
2016/0032703 A1 2/2016 Broussard et al.
2016/0032836 A1 2/2016 Hawkinson et al.
2016/0076447 A1 3/2016 Merlo et al.
2016/0102581 A1 4/2016 Del Bono
2016/0105022 A1 4/2016 Oehring et al.
2016/0108713 A1 4/2016 Dunaeva et al.
2016/0123185 A1 5/2016 Le Pache et al.
2016/0168979 A1 6/2016 Zhang et al.
2016/0177675 A1 6/2016 Morris et al.
2016/0177945 A1 6/2016 Byrne et al.
2016/0186671 A1 6/2016 Austin et al.
2016/0195082 A1 7/2016 Wiegman et al.
2016/0215774 A1 7/2016 Oklejas et al.
2016/0230525 A1 8/2016 Lestz et al.
2016/0244314 A1 8/2016 Van Vliet et al.
2016/0248230 A1 8/2016 Tawy et al.
2016/0253634 A1 9/2016 Thomeer et al.
2016/0258267 A1 9/2016 Payne et al.
2016/0273328 A1 9/2016 Oehring
2016/0273346 A1 9/2016 Tang et al.
2016/0290114 A1 10/2016 Oehring et al.
2016/0319650 A1 11/2016 Oehring et al.
2016/0326845 A1 11/2016 Djikpesse et al.
2016/0348479 A1 12/2016 Oehring et al.
2016/0369609 A1 12/2016 Morris et al.
2016/0369926 A1 12/2016 Shuck
2017/0009905 A1 1/2017 Arnold
2017/0016433 A1 1/2017 Chong et al.
2017/0030177 A1 2/2017 Oehring et al.
2017/0038137 A1 2/2017 Turney
2017/0045055 A1 2/2017 Hoefel et al.
2017/0052087 A1 2/2017 Faqihi et al.
2017/0074074 A1 3/2017 Joseph et al.
2017/0074076 A1 3/2017 Joseph et al.
2017/0074089 A1 3/2017 Agarwal et al.
2017/0082110 A1 3/2017 Lammers
2017/0089189 A1 3/2017 Norris et al.
2017/0114613 A1 4/2017 Lecerf et al.
2017/0114625 A1 4/2017 Norris et al.
2017/0122310 A1 5/2017 Ladrón de Guevara
2017/0131174 A1 5/2017 Enev et al.
2017/0145918 A1 5/2017 Oehring et al.
2017/0191350 A1 7/2017 Johns et al.
2017/0218727 A1 8/2017 Oehring et al.
2017/0226839 A1 8/2017 Broussard et al.
2017/0226842 A1 8/2017 Omont et al.
2017/0226998 A1 8/2017 Zhang et al.
2017/0227002 A1 8/2017 Mikulski et al.
2017/0233103 A1 8/2017 Teicholz et al.
2017/0234165 A1 8/2017 Kersey et al.
2017/0234308 A1 8/2017 Buckley
2017/0241336 A1 8/2017 Jones et al.
2017/0241671 A1 8/2017 Ahmad
2017/0248034 A1 8/2017 Dzieciol et al.
2017/0248208 A1 8/2017 Tamura
2017/0248308 A1 8/2017 Makarychev-Mikhailov et al.
2017/0275149 A1 9/2017 Schmidt
2017/0288400 A1 10/2017 Williams
2017/0292409 A1 10/2017 Aguilar et al.
2017/0302135 A1 10/2017 Cory
2017/0305736 A1 10/2017 Haile et al.
2017/0306847 A1 10/2017 Suciu et al.
2017/0306936 A1 10/2017 Dole et al.
2017/0322086 A1 11/2017 Luharuka et al.
2017/0333086 A1 11/2017 Jackson
2017/0334448 A1 11/2017 Schwunk
2017/0335842 A1 11/2017 Robinson et al.
2017/0350471 A1 12/2017 Steidl et al.
2017/0356470 A1 12/2017 Jaffrey
2017/0370199 A1 12/2017 Witkowski et al.
2017/0370480 A1 12/2017 Witkowski et al.
2018/0034280 A1 2/2018 Pedersen
2018/0038216 A1 2/2018 Zhang et al.
2018/0038328 A1 2/2018 Louven et al.
2018/0041093 A1 2/2018 Miranda
2018/0045202 A1 2/2018 Crom
2018/0058171 A1 3/2018 Roesner et al.
2018/0087499 A1 3/2018 Zhang et al.
2018/0087996 A1 3/2018 De La Cruz
2018/0112503 A1 4/2018 Lane et al.
2018/0156210 A1 6/2018 Oehring et al.
2018/0172294 A1 6/2018 Owen
2018/0183219 A1 6/2018 Oehring et al.
2018/0186442 A1 7/2018 Maier
2018/0187662 A1 7/2018 Hill et al.
2018/0209415 A1 7/2018 Zhang et al.
2018/0223640 A1 8/2018 Keihany et al.
2018/0224044 A1 8/2018 Penney et al.
2018/0229998 A1 8/2018 Shock
2018/0258746 A1 9/2018 Broussard et al.
2018/0266412 A1 9/2018 Stokkevåg et al.
2018/0278124 A1 9/2018 Oehring et al.
2018/0283102 A1 10/2018 Cook
2018/0283618 A1 10/2018 Cook
2018/0284817 A1 10/2018 Cook et al.
2018/0290877 A1 10/2018 Shock
2018/0291781 A1 10/2018 Pedrini
2018/0298731 A1 10/2018 Bishop
2018/0298735 A1 10/2018 Conrad
2018/0307255 A1 10/2018 Bishop
2018/0313456 A1 11/2018 Bayyouk et al.
2018/0328157 A1 11/2018 Bishop
2018/0334893 A1 11/2018 Oehring
2018/0363435 A1 12/2018 Coli et al.
2018/0363436 A1 12/2018 Coli et al.
2018/0363437 A1 12/2018 Coli et al.
2018/0363438 A1 12/2018 Coli et al.
2019/0003272 A1 1/2019 Morris et al.
2019/0003329 A1 1/2019 Morris et al.
2019/0010793 A1 1/2019 Hinderliter
2019/0011051 A1 1/2019 Yeung
2019/0048993 A1 2/2019 Akiyama et al.
2019/0063263 A1 2/2019 Davis et al.
2019/0063341 A1 2/2019 Davis
2019/0067991 A1 2/2019 Davis et al.
2019/0071992 A1 3/2019 Feng
2019/0072005 A1 3/2019 Fisher et al.
2019/0078471 A1 3/2019 Braglia et al.
2019/0088845 A1 3/2019 Sugi et al.
2019/0091619 A1 3/2019 Huang
2019/0106316 A1 4/2019 Van Vliet et al.
2019/0106970 A1 4/2019 Oehring
2019/0112908 A1 4/2019 Coli et al.
2019/0112910 A1 4/2019 Oehring et al.
2019/0119096 A1 4/2019 Haile et al.
2019/0120024 A1 4/2019 Oehring et al.
2019/0120031 A1 4/2019 Gilje
2019/0120134 A1 4/2019 Goleczka et al.
2019/0128247 A1 5/2019 Douglas, III
2019/0128288 A1 5/2019 Konada et al.
2019/0131607 A1 5/2019 Gillette

(56) References Cited

U.S. PATENT DOCUMENTS

| | | | |
|---|---|---|---|
| 2019/0136677 | A1 | 5/2019 | Shampine et al. |
| 2019/0153843 | A1 | 5/2019 | Headrick |
| 2019/0153938 | A1 | 5/2019 | Hammoud |
| 2019/0154020 | A1 | 5/2019 | Glass |
| 2019/0155318 | A1 | 5/2019 | Meunier |
| 2019/0178234 | A1 | 6/2019 | Beisel |
| 2019/0178235 | A1 | 6/2019 | Coskrey et al. |
| 2019/0185312 | A1 | 6/2019 | Bush et al. |
| 2019/0203572 | A1 | 7/2019 | Morris et al. |
| 2019/0204021 | A1 | 7/2019 | Morris et al. |
| 2019/0211661 | A1 | 7/2019 | Reckels et al. |
| 2019/0211814 | A1 | 7/2019 | Weightman et al. |
| 2019/0217258 | A1 | 7/2019 | Bishop |
| 2019/0226317 | A1 | 7/2019 | Payne et al. |
| 2019/0245348 | A1 | 8/2019 | Hinderliter et al. |
| 2019/0249652 | A1 | 8/2019 | Stephenson et al. |
| 2019/0249754 | A1 | 8/2019 | Oehring et al. |
| 2019/0257297 | A1 | 8/2019 | Botting et al. |
| 2019/0264549 | A1 | 8/2019 | Lane et al. |
| 2019/0264667 | A1 | 8/2019 | Byrne |
| 2019/0277279 | A1 | 9/2019 | Byrne et al. |
| 2019/0277295 | A1 | 9/2019 | Clyburn et al. |
| 2019/0309585 | A1 | 10/2019 | Miller et al. |
| 2019/0316447 | A1 | 10/2019 | Oehring et al. |
| 2019/0316456 | A1 | 10/2019 | Beisel et al. |
| 2019/0323337 | A1 | 10/2019 | Glass et al. |
| 2019/0330923 | A1 | 10/2019 | Gable et al. |
| 2019/0331100 | A1 | 10/2019 | Gable et al. |
| 2019/0331117 | A1 | 10/2019 | Gable et al. |
| 2019/0337392 | A1 | 11/2019 | Joshi et al. |
| 2019/0338762 | A1 | 11/2019 | Curry et al. |
| 2019/0345920 | A1 | 11/2019 | Surjaatmadja et al. |
| 2019/0353103 | A1 | 11/2019 | Roberge |
| 2019/0356199 | A1 | 11/2019 | Morris et al. |
| 2019/0376449 | A1 | 12/2019 | Carrell |
| 2019/0383123 | A1 | 12/2019 | Hinderliter |
| 2020/0003205 | A1 | 1/2020 | Stokkevåg et al. |
| 2020/0011165 | A1 | 1/2020 | George et al. |
| 2020/0040878 | A1 | 2/2020 | Morris |
| 2020/0049136 | A1 | 2/2020 | Stephenson |
| 2020/0049153 | A1 | 2/2020 | Headrick et al. |
| 2020/0071998 | A1 | 3/2020 | Oehring et al. |
| 2020/0072201 | A1 | 3/2020 | Marica |
| 2020/0088202 | A1 | 3/2020 | Sigmar et al. |
| 2020/0095854 | A1 | 3/2020 | Hinderliter |
| 2020/0109610 | A1 | 4/2020 | Husøy et al. |
| 2020/0109616 | A1 | 4/2020 | Oehring et al. |
| 2020/0132058 | A1 | 4/2020 | Mollatt |
| 2020/0141219 | A1 | 5/2020 | Oehring et al. |
| 2020/0141326 | A1 | 5/2020 | Redford et al. |
| 2020/0141907 | A1 | 5/2020 | Meck et al. |
| 2020/0166026 | A1 | 5/2020 | Marica |
| 2020/0206704 | A1 | 7/2020 | Chong |
| 2020/0208733 | A1 | 7/2020 | Kim |
| 2020/0223648 | A1 | 7/2020 | Herman et al. |
| 2020/0224645 | A1 | 7/2020 | Buckley |
| 2020/0232454 | A1 | 7/2020 | Chretien et al. |
| 2020/0256333 | A1 | 8/2020 | Surjaatmadja et al. |
| 2020/0263498 | A1 | 8/2020 | Fischer et al. |
| 2020/0263525 | A1 | 8/2020 | Reid et al. |
| 2020/0263526 | A1 | 8/2020 | Fischer et al. |
| 2020/0263527 | A1 | 8/2020 | Fischer et al. |
| 2020/0263528 | A1 | 8/2020 | Fischer et al. |
| 2020/0267888 | A1 | 8/2020 | Putz |
| 2020/0291731 | A1 | 9/2020 | Haiderer et al. |
| 2020/0295574 | A1 | 9/2020 | Batsch-Smith |
| 2020/0300050 | A1 | 9/2020 | Oehring et al. |
| 2020/0309027 | A1 | 10/2020 | Rytkönen |
| 2020/0309113 | A1 | 10/2020 | Hunter et al. |
| 2020/0325752 | A1 | 10/2020 | Clark et al. |
| 2020/0325760 | A1 | 10/2020 | Markham |
| 2020/0325761 | A1 | 10/2020 | Williams |
| 2020/0325791 | A1 | 10/2020 | Himmelmann |
| 2020/0325893 | A1 | 10/2020 | Kraige et al. |
| 2020/0332784 | A1 | 10/2020 | Zhang et al. |
| 2020/0332788 | A1 | 10/2020 | Cui et al. |
| 2020/0340313 | A1 | 10/2020 | Fischer et al. |
| 2020/0340322 | A1 | 10/2020 | Sizemore et al. |
| 2020/0340340 | A1 | 10/2020 | Oehring et al. |
| 2020/0340344 | A1 | 10/2020 | Reckels et al. |
| 2020/0340404 | A1 | 10/2020 | Stockstill et al. |
| 2020/0347725 | A1 | 11/2020 | Morris et al. |
| 2020/0354928 | A1 | 11/2020 | Wehler et al. |
| 2020/0355055 | A1 | 11/2020 | Dusterhoft et al. |
| 2020/0362760 | A1 | 11/2020 | Morenko et al. |
| 2020/0362764 | A1 | 11/2020 | Saintignan et al. |
| 2020/0370394 | A1 | 11/2020 | Cai et al. |
| 2020/0370408 | A1 | 11/2020 | Cai et al. |
| 2020/0370429 | A1 | 11/2020 | Cai et al. |
| 2020/0370633 | A1 | 11/2020 | Kumar |
| 2020/0371490 | A1 | 11/2020 | Cai et al. |
| 2020/0386169 | A1 | 12/2020 | Hinderliter et al. |
| 2020/0386222 | A1 | 12/2020 | Pham et al. |
| 2020/0388140 | A1 | 12/2020 | Gomez et al. |
| 2020/0392826 | A1 | 12/2020 | Cui et al. |
| 2020/0392827 | A1 | 12/2020 | George et al. |
| 2020/0393088 | A1 | 12/2020 | Sizemore et al. |
| 2020/0398238 | A1 | 12/2020 | Zhong et al. |
| 2020/0400000 | A1 | 12/2020 | Ghasripoor et al. |
| 2020/0400005 | A1 | 12/2020 | Han et al. |
| 2020/0407625 | A1 | 12/2020 | Stephenson |
| 2020/0408071 | A1 | 12/2020 | Li et al. |
| 2020/0408144 | A1 | 12/2020 | Feng et al. |
| 2020/0408147 | A1 | 12/2020 | Zhang et al. |
| 2020/0408149 | A1 | 12/2020 | Li et al. |
| 2021/0025324 | A1 | 1/2021 | Morris et al. |
| 2021/0025383 | A1 | 1/2021 | Bodishbaugh et al. |
| 2021/0032961 | A1 | 2/2021 | Hinderliter et al. |
| 2021/0054727 | A1 | 2/2021 | Floyd |
| 2021/0071503 | A1 | 3/2021 | Ogg et al. |
| 2021/0071574 | A1 | 3/2021 | Feng et al. |
| 2021/0071579 | A1 | 3/2021 | Li et al. |
| 2021/0071654 | A1 | 3/2021 | Brunson, Jr. |
| 2021/0071752 | A1 | 3/2021 | Cui et al. |
| 2021/0079758 | A1 | 3/2021 | Yeung et al. |
| 2021/0079851 | A1 | 3/2021 | Yeung et al. |
| 2021/0086851 | A1 | 3/2021 | Zhang et al. |
| 2021/0087883 | A1 | 3/2021 | Zhang et al. |
| 2021/0087916 | A1 | 3/2021 | Zhang et al. |
| 2021/0087925 | A1 | 3/2021 | Heidari et al. |
| 2021/0087943 | A1 | 3/2021 | Cui et al. |
| 2021/0088042 | A1 | 3/2021 | Zhang et al. |
| 2021/0123425 | A1 | 4/2021 | Cui et al. |
| 2021/0123434 | A1 | 4/2021 | Cui et al. |
| 2021/0123435 | A1 | 4/2021 | Cui et al. |
| 2021/0131409 | A1 | 5/2021 | Cui et al. |
| 2021/0140416 | A1 | 5/2021 | Buckley |
| 2021/0148208 | A1 | 5/2021 | Thomas et al. |
| 2021/0156240 | A1 | 5/2021 | Cicci et al. |
| 2021/0156241 | A1 | 5/2021 | Cook |
| 2021/0172282 | A1 | 6/2021 | Wang et al. |
| 2021/0180517 | A1 | 6/2021 | Zhou et al. |
| 2021/0190045 | A1 | 6/2021 | Zhang et al. |
| 2021/0199110 | A1 | 7/2021 | Albert et al. |
| 2021/0222690 | A1 | 7/2021 | Beisel |
| 2021/0239112 | A1 | 8/2021 | Buckley |
| 2021/0246774 | A1 | 8/2021 | Cui et al. |
| 2021/0270261 | A1 | 9/2021 | Zhang et al. |
| 2021/0270264 | A1 | 9/2021 | Byrne et al. |
| 2021/0285311 | A1 | 9/2021 | Ji et al. |
| 2021/0285432 | A1 | 9/2021 | Ji et al. |
| 2021/0301807 | A1 | 9/2021 | Cui et al. |
| 2021/0306720 | A1 | 9/2021 | Sandoval et al. |
| 2021/0308638 | A1 | 10/2021 | Zhong et al. |
| 2021/0324718 | A1 | 10/2021 | Anders |
| 2021/0348475 | A1 | 11/2021 | Yeung et al. |
| 2021/0348476 | A1 | 11/2021 | Yeung et al. |
| 2021/0348477 | A1 | 11/2021 | Yeung et al. |
| 2021/0355927 | A1 | 11/2021 | Jian et al. |
| 2021/0372394 | A1 | 12/2021 | Bagulayan et al. |
| 2021/0372395 | A1 | 12/2021 | Li et al. |
| 2021/0376413 | A1 | 12/2021 | Asfha |
| 2021/0388760 | A1 | 12/2021 | Feng et al. |
| 2022/0082007 | A1 | 3/2022 | Zhang et al. |

(56) References Cited

U.S. PATENT DOCUMENTS

2022/0090476 A1 3/2022 Zhang et al.
2022/0090477 A1 3/2022 Zhang et al.
2022/0090478 A1 3/2022 Zhang et al.
2022/0112892 A1 4/2022 Cui et al.
2022/0120262 A1 4/2022 Ji et al.
2022/0145740 A1 5/2022 Yuan et al.
2022/0154775 A1 5/2022 Liu et al.
2022/0155373 A1 5/2022 Liu et al.
2022/0162931 A1 5/2022 Zhong et al.
2022/0162991 A1 5/2022 Zhang et al.
2022/0181859 A1 6/2022 Ji et al.
2022/0186724 A1 6/2022 Chang et al.
2022/0213777 A1 7/2022 Cui et al.
2022/0220836 A1 7/2022 Zhang et al.
2022/0224087 A1 7/2022 Ji et al.
2022/0228468 A1 7/2022 Cui et al.
2022/0228469 A1 7/2022 Zhang et al.
2022/0235639 A1 7/2022 Zhang et al.
2022/0235640 A1 7/2022 Mao et al.
2022/0235641 A1 7/2022 Zhang et al.
2022/0235642 A1 7/2022 Zhang et al.
2022/0235802 A1 7/2022 Jiang et al.
2022/0242297 A1 8/2022 Tian et al.
2022/0243613 A1 8/2022 Ji et al.
2022/0243724 A1 8/2022 Li et al.
2022/0250000 A1 8/2022 Zhang et al.
2022/0255319 A1 8/2022 Liu et al.
2022/0258659 A1 8/2022 Cui et al.
2022/0259947 A1 8/2022 Li et al.
2022/0259964 A1 8/2022 Zhang et al.
2022/0268201 A1 8/2022 Feng et al.
2022/0282606 A1 9/2022 Zhong et al.
2022/0282726 A1 9/2022 Zhang et al.
2022/0290549 A1 9/2022 Zhang et al.
2022/0294194 A1 9/2022 Cao et al.
2022/0298906 A1 9/2022 Zhong et al.
2022/0307359 A1 9/2022 Liu et al.
2022/0307424 A1 9/2022 Wang et al.
2022/0314248 A1 10/2022 Ge et al.
2022/0315347 A1 10/2022 Liu et al.
2022/0316306 A1 10/2022 Liu et al.
2022/0316362 A1 10/2022 Zhang et al.
2022/0316461 A1 10/2022 Wang et al.
2022/0325608 A1 10/2022 Zhang et al.
2022/0330411 A1 10/2022 Liu et al.
2022/0333471 A1 10/2022 Zhong et al.
2022/0339646 A1 10/2022 Yu et al.
2022/0341358 A1 10/2022 Ji et al.
2022/0341362 A1 10/2022 Feng et al.
2022/0341415 A1 10/2022 Deng et al.
2022/0345007 A1 10/2022 Liu et al.
2022/0349345 A1 11/2022 Zhang et al.
2022/0353980 A1 11/2022 Liu et al.
2022/0361309 A1 11/2022 Liu et al.
2022/0364452 A1 11/2022 Wang et al.
2022/0364453 A1 11/2022 Chang et al.
2022/0372857 A1 11/2022 Yeung
2022/0372865 A1 11/2022 Lin et al.
2022/0376280 A1 11/2022 Shao et al.
2022/0381126 A1 12/2022 Cui et al.
2022/0389799 A1 12/2022 Mao et al.
2022/0389803 A1 12/2022 Zhang et al.
2022/0389804 A1 12/2022 Cui et al.
2022/0389865 A1 12/2022 Feng et al.
2022/0389867 A1 12/2022 Li et al.
2022/0412196 A1 12/2022 Cui et al.
2022/0412199 A1 12/2022 Mao et al.
2022/0412200 A1 12/2022 Zhang et al.
2022/0412258 A1 12/2022 Li et al.
2022/0412379 A1 12/2022 Wang et al.
2023/0001524 A1 1/2023 Jiang et al.
2023/0003238 A1 1/2023 Du et al.
2023/0015132 A1 1/2023 Feng et al.
2023/0015529 A1 1/2023 Zhang et al.
2023/0015581 A1 1/2023 Ji et al.
2023/0017968 A1 1/2023 Deng et al.
2023/0029574 A1 2/2023 Zhang et al.
2023/0029671 A1 2/2023 Han et al.
2023/0036118 A1 2/2023 Xing et al.
2023/0040970 A1 2/2023 Liu et al.
2023/0042379 A1 2/2023 Zhang et al.
2023/0047033 A1 2/2023 Fu et al.
2023/0048551 A1 2/2023 Feng et al.
2023/0049462 A1 2/2023 Zhang et al.
2023/0064964 A1 3/2023 Wang et al.
2023/0074794 A1 3/2023 Liu et al.
2023/0085124 A1 3/2023 Zhong et al.
2023/0092506 A1 3/2023 Zhong et al.
2023/0092705 A1 3/2023 Liu et al.
2023/0106683 A1 4/2023 Zhang et al.
2023/0107300 A1 4/2023 Huang et al.
2023/0107791 A1 4/2023 Zhang et al.
2023/0109018 A1 4/2023 Du et al.
2023/0116458 A1 4/2023 Liu et al.
2023/0117362 A1 4/2023 Zhang et al.
2023/0119725 A1 4/2023 Wang et al.
2023/0119876 A1 4/2023 Mao et al.
2023/0119896 A1 4/2023 Zhang et al.
2023/0120810 A1 4/2023 Fu et al.
2023/0121251 A1 4/2023 Cui et al.
2023/0124444 A1 4/2023 Chang et al.
2023/0138582 A1 5/2023 Li et al.
2023/0144116 A1 5/2023 Li et al.
2023/0145963 A1 5/2023 Zhang et al.
2023/0151722 A1 5/2023 Cui et al.
2023/0151723 A1 5/2023 Ji et al.
2023/0152793 A1 5/2023 Wang et al.
2023/0160289 A1 5/2023 Cui et al.
2023/0160510 A1 5/2023 Bao et al.
2023/0163580 A1 5/2023 Ji et al.
2023/0167776 A1 6/2023 Cui et al.
2023/0374979 A1 11/2023 Volk et al.
2024/0254985 A1* 8/2024 Morreale ................ F04B 53/18
2024/0352841 A1 10/2024 Imel et al.
2024/0410362 A1* 12/2024 Pham ...................... F04B 53/16

FOREIGN PATENT DOCUMENTS

CA 2043184 C 8/1994
CA 2829762 A1 9/2012
CA 2737321 C 9/2013
CA 2876687 A1 5/2014
CA 2693567 C 9/2014
CA 2964597 A1 10/2017
CA 2876687 C 4/2019
CA 3138533 A1 11/2020
CA 2919175 C 3/2021
CN 2622404 Y 6/2004
CN 2779054 Y 5/2006
CN 2890325 Y 4/2007
CN 200964929 Y 10/2007
CN 101323151 A 12/2008
CN 201190660 Y 2/2009
CN 201190892 Y 2/2009
CN 201190893 Y 2/2009
CN 101414171 A 4/2009
CN 201215073 Y 4/2009
CN 201236650 Y 5/2009
CN 201275542 Y 7/2009
CN 201275801 Y 7/2009
CN 201333385 Y 10/2009
CN 201443300 U 4/2010
CN 201496415 U 6/2010
CN 201501365 U 6/2010
CN 201507271 U 6/2010
CN 101323151 B 7/2010
CN 201560210 U 8/2010
CN 201581862 U 9/2010
CN 201610728 U 10/2010
CN 201610751 U 10/2010
CN 201618530 U 11/2010
CN 201661255 U 12/2010
CN 101949382 A 1/2011
CN 201756927 U 3/2011

(56) References Cited

FOREIGN PATENT DOCUMENTS

| | | | | |
|---|---|---|---|---|
| CN | 101414171 | B | 5/2011 | |
| CN | 102128011 | A | 7/2011 | |
| CN | 102140898 | A | 8/2011 | |
| CN | 102155172 | A | 8/2011 | |
| CN | 102182904 | A | 9/2011 | |
| CN | 202000930 | U | 10/2011 | |
| CN | 202055781 | U | 11/2011 | |
| CN | 202082265 | U | 12/2011 | |
| CN | 202100216 | U | 1/2012 | |
| CN | 202100217 | U | 1/2012 | |
| CN | 202100815 | U | 1/2012 | |
| CN | 202124340 | U | 1/2012 | |
| CN | 202140051 | U | 2/2012 | |
| CN | 202140080 | U | 2/2012 | |
| CN | 202144789 | U | 2/2012 | |
| CN | 202144943 | U | 2/2012 | |
| CN | 202149354 | U | 2/2012 | |
| CN | 102383748 | A | 3/2012 | |
| CN | 202156297 | U | 3/2012 | |
| CN | 202158355 | U | 3/2012 | |
| CN | 202163504 | U | 3/2012 | |
| CN | 202165236 | U | 3/2012 | |
| CN | 202180866 | U | 4/2012 | |
| CN | 202181875 | U | 4/2012 | |
| CN | 202187744 | U | 4/2012 | |
| CN | 202191854 | U | 4/2012 | |
| CN | 202250008 | U | 5/2012 | |
| CN | 101885307 | B | 7/2012 | |
| CN | 102562020 | A | 7/2012 | |
| CN | 202326156 | U | 7/2012 | |
| CN | 202370773 | U | 8/2012 | |
| CN | 202417397 | U | 9/2012 | |
| CN | 202417461 | U | 9/2012 | |
| CN | 102729335 | A | 10/2012 | |
| CN | 202463955 | U | 10/2012 | |
| CN | 202463957 | U | 10/2012 | |
| CN | 202467739 | U | 10/2012 | |
| CN | 202467801 | U | 10/2012 | |
| CN | 202531016 | U | 11/2012 | |
| CN | 202544794 | U | 11/2012 | |
| CN | 102825039 | A | 12/2012 | |
| CN | 202578592 | U | 12/2012 | |
| CN | 202579164 | U | 12/2012 | |
| CN | 202594808 | U | 12/2012 | |
| CN | 202594928 | U | 12/2012 | |
| CN | 202596615 | U | 12/2012 | |
| CN | 202596616 | U | 12/2012 | |
| CN | 102889191 | A | 1/2013 | |
| CN | 202641535 | U | 1/2013 | |
| CN | 202645475 | U | 1/2013 | |
| CN | 202666716 | U | 1/2013 | |
| CN | 202669645 | U | 1/2013 | |
| CN | 202669944 | U | 1/2013 | |
| CN | 202671336 | U | 1/2013 | |
| CN | 202673269 | U | 1/2013 | |
| CN | 202751982 | U | 2/2013 | |
| CN | 102963629 | A | 3/2013 | |
| CN | 202767964 | U | 3/2013 | |
| CN | 202789791 | U | 3/2013 | |
| CN | 202789792 | U | 3/2013 | |
| CN | 202810717 | U | 3/2013 | |
| CN | 202827276 | U | 3/2013 | |
| CN | 202833093 | U | 3/2013 | |
| CN | 202833370 | U | 3/2013 | |
| CN | 102140898 | B | 4/2013 | |
| CN | 202895467 | U | 4/2013 | |
| CN | 202926404 | U | 5/2013 | |
| CN | 202935216 | U | 5/2013 | |
| CN | 202935798 | U | 5/2013 | |
| CN | 202935816 | U | 5/2013 | |
| CN | 202970631 | U | 6/2013 | |
| CN | 103223315 | A | 7/2013 | |
| CN | 203050598 | U | 7/2013 | |
| CN | 103233714 | A | 8/2013 | |
| CN | 103233715 | A | 8/2013 | |
| CN | 103245523 | A | 8/2013 | |
| CN | 103247220 | A | 8/2013 | |
| CN | 103253839 | A | 8/2013 | |
| CN | 103277290 | A | 9/2013 | |
| CN | 103321782 | A | 9/2013 | |
| CN | 203170270 | U | 9/2013 | |
| CN | 203172509 | U | 9/2013 | |
| CN | 203175778 | U | 9/2013 | |
| CN | 203175787 | U | 9/2013 | |
| CN | 102849880 | B | 10/2013 | |
| CN | 203241231 | U | 10/2013 | |
| CN | 203244941 | U | 10/2013 | |
| CN | 203244942 | U | 10/2013 | |
| CN | 203303798 | U | 11/2013 | |
| CN | 102155172 | B | 12/2013 | |
| CN | 102729335 | B | 12/2013 | |
| CN | 103420532 | A | 12/2013 | |
| CN | 103459863 | A * | 12/2013 | ............... B21K 1/08 |
| CN | 203321792 | U | 12/2013 | |
| CN | 203412658 | U | 1/2014 | |
| CN | 203420697 | U | 2/2014 | |
| CN | 203480755 | U | 3/2014 | |
| CN | 103711437 | A | 4/2014 | |
| CN | 203531815 | U | 4/2014 | |
| CN | 203531871 | U | 4/2014 | |
| CN | 203531883 | U | 4/2014 | |
| CN | 203556164 | U | 4/2014 | |
| CN | 203558809 | U | 4/2014 | |
| CN | 203559861 | U | 4/2014 | |
| CN | 203559893 | U | 4/2014 | |
| CN | 203560189 | U | 4/2014 | |
| CN | 102704870 | B | 5/2014 | |
| CN | 203611843 | U | 5/2014 | |
| CN | 203612531 | U | 5/2014 | |
| CN | 203612843 | U | 5/2014 | |
| CN | 203614062 | U | 5/2014 | |
| CN | 203614388 | U | 5/2014 | |
| CN | 203621045 | U | 6/2014 | |
| CN | 203621046 | U | 6/2014 | |
| CN | 203621051 | U | 6/2014 | |
| CN | 203640993 | U | 6/2014 | |
| CN | 203655221 | U | 6/2014 | |
| CN | 103899280 | A | 7/2014 | |
| CN | 103923670 | A | 7/2014 | |
| CN | 203685052 | U | 7/2014 | |
| CN | 203716936 | U | 7/2014 | |
| CN | 103990410 | A | 8/2014 | |
| CN | 103993869 | A | 8/2014 | |
| CN | 203754009 | U | 8/2014 | |
| CN | 203754025 | U | 8/2014 | |
| CN | 203754341 | U | 8/2014 | |
| CN | 203756614 | U | 8/2014 | |
| CN | 203770264 | U | 8/2014 | |
| CN | 203784519 | U | 8/2014 | |
| CN | 203784520 | U | 8/2014 | |
| CN | 104057864 | A | 9/2014 | |
| CN | 203819819 | U | 9/2014 | |
| CN | 203823431 | U | 9/2014 | |
| CN | 203835337 | U | 9/2014 | |
| CN | 104074500 | A | 10/2014 | |
| CN | 203876633 | U | 10/2014 | |
| CN | 203876636 | U | 10/2014 | |
| CN | 203877364 | U | 10/2014 | |
| CN | 203877365 | U | 10/2014 | |
| CN | 203877375 | U | 10/2014 | |
| CN | 203877424 | U | 10/2014 | |
| CN | 203879476 | U | 10/2014 | |
| CN | 203879479 | U | 10/2014 | |
| CN | 203890292 | U | 10/2014 | |
| CN | 203899476 | U | 10/2014 | |
| CN | 203906206 | U | 10/2014 | |
| CN | 104150728 | A | 11/2014 | |
| CN | 104176522 | A | 12/2014 | |
| CN | 104196464 | A | 12/2014 | |
| CN | 104234651 | A | 12/2014 | |
| CN | 203971841 | U | 12/2014 | |
| CN | 203975450 | U | 12/2014 | |
| CN | 204003650 | U | 12/2014 | |
| CN | 204020788 | U | 12/2014 | |

(56) References Cited

FOREIGN PATENT DOCUMENTS

| | | | |
|---|---|---|---|
| CN | 204021980 | U | 12/2014 |
| CN | 204024625 | U | 12/2014 |
| CN | 204051401 | U | 12/2014 |
| CN | 204060661 | U | 12/2014 |
| CN | 104260672 | A | 1/2015 |
| CN | 104314512 | A | 1/2015 |
| CN | 204077478 | U | 1/2015 |
| CN | 204077526 | U | 1/2015 |
| CN | 204078307 | U | 1/2015 |
| CN | 204083051 | U | 1/2015 |
| CN | 204113168 | U | 1/2015 |
| CN | 104340682 | A | 2/2015 |
| CN | 104358536 | A | 2/2015 |
| CN | 104369687 | A | 2/2015 |
| CN | 104402178 | A | 3/2015 |
| CN | 104402185 | A | 3/2015 |
| CN | 104402186 | A | 3/2015 |
| CN | 204209819 | U | 3/2015 |
| CN | 204224560 | U | 3/2015 |
| CN | 204225813 | U | 3/2015 |
| CN | 204225839 | U | 3/2015 |
| CN | 104533392 | A | 4/2015 |
| CN | 104563938 | A | 4/2015 |
| CN | 104563994 | A | 4/2015 |
| CN | 104563995 | A | 4/2015 |
| CN | 104563998 | A | 4/2015 |
| CN | 104564033 | A | 4/2015 |
| CN | 204257122 | U | 4/2015 |
| CN | 204283610 | U | 4/2015 |
| CN | 204283782 | U | 4/2015 |
| CN | 204297682 | U | 4/2015 |
| CN | 204299810 | U | 4/2015 |
| CN | 103223315 | B | 5/2015 |
| CN | 104594857 | A | 5/2015 |
| CN | 104595493 | A | 5/2015 |
| CN | 104612647 | A | 5/2015 |
| CN | 104612928 | A | 5/2015 |
| CN | 104632126 | A | 5/2015 |
| CN | 204325094 | U | 5/2015 |
| CN | 204325098 | U | 5/2015 |
| CN | 204326983 | U | 5/2015 |
| CN | 204326985 | U | 5/2015 |
| CN | 204344040 | U | 5/2015 |
| CN | 204344095 | U | 5/2015 |
| CN | 104727797 | A | 6/2015 |
| CN | 204402414 | U | 6/2015 |
| CN | 204402423 | U | 6/2015 |
| CN | 204402450 | U | 6/2015 |
| CN | 103247220 | B | 7/2015 |
| CN | 104803568 | A | 7/2015 |
| CN | 204436360 | U | 7/2015 |
| CN | 204457524 | U | 7/2015 |
| CN | 204472485 | U | 7/2015 |
| CN | 204473625 | U | 7/2015 |
| CN | 204477303 | U | 7/2015 |
| CN | 204493095 | U | 7/2015 |
| CN | 204493309 | U | 7/2015 |
| CN | 103253839 | B | 8/2015 |
| CN | 104820372 | A | 8/2015 |
| CN | 104832093 | A | 8/2015 |
| CN | 104863523 | A | 8/2015 |
| CN | 204552723 | U | 8/2015 |
| CN | 204553866 | U | 8/2015 |
| CN | 204571831 | U | 8/2015 |
| CN | 204703814 | U | 10/2015 |
| CN | 204703833 | U | 10/2015 |
| CN | 204703834 | U | 10/2015 |
| CN | 105092401 | A | 11/2015 |
| CN | 103233715 | B | 12/2015 |
| CN | 103790927 | B | 12/2015 |
| CN | 105207097 | A | 12/2015 |
| CN | 204831952 | U | 12/2015 |
| CN | 204899777 | U | 12/2015 |
| CN | 102602323 | B | 1/2016 |
| CN | 105240064 | A | 1/2016 |
| CN | 204944834 | U | 1/2016 |
| CN | 205042127 | U | 2/2016 |
| CN | 205172478 | U | 4/2016 |
| CN | 103993869 | B | 5/2016 |
| CN | 105536299 | A | 5/2016 |
| CN | 105545207 | A | 5/2016 |
| CN | 205260249 | U | 5/2016 |
| CN | 103233714 | B | 6/2016 |
| CN | 104340682 | B | 6/2016 |
| CN | 205297518 | U | 6/2016 |
| CN | 205298447 | U | 6/2016 |
| CN | 205391821 | U | 7/2016 |
| CN | 205400701 | U | 7/2016 |
| CN | 103277290 | B | 8/2016 |
| CN | 104260672 | B | 8/2016 |
| CN | 205477370 | U | 8/2016 |
| CN | 205479153 | U | 8/2016 |
| CN | 205503058 | U | 8/2016 |
| CN | 205503068 | U | 8/2016 |
| CN | 205503089 | U | 8/2016 |
| CN | 105958098 | A | 9/2016 |
| CN | 205599180 | U | 9/2016 |
| CN | 106121577 | A | 11/2016 |
| CN | 205709587 | U | 11/2016 |
| CN | 104612928 | B | 12/2016 |
| CN | 106246120 | A | 12/2016 |
| CN | 205805471 | U | 12/2016 |
| CN | 106321045 | A | 1/2017 |
| CN | 205858306 | U | 1/2017 |
| CN | 106438310 | A | 2/2017 |
| CN | 205937833 | U | 2/2017 |
| CN | 104563994 | B | 3/2017 |
| CN | 206129196 | U | 4/2017 |
| CN | 104369687 | B | 5/2017 |
| CN | 106715165 | A | 5/2017 |
| CN | 106761561 | A | 5/2017 |
| CN | 106762501 | A | 5/2017 |
| CN | 104820372 | B | 6/2017 |
| CN | 105240064 | B | 6/2017 |
| CN | 206237147 | U | 6/2017 |
| CN | 206287832 | U | 6/2017 |
| CN | 206346711 | U | 7/2017 |
| CN | 104563995 | B | 9/2017 |
| CN | 107120822 | A | 9/2017 |
| CN | 107143298 | A | 9/2017 |
| CN | 107159046 | A | 9/2017 |
| CN | 107188018 | A | 9/2017 |
| CN | 206496016 | U | 9/2017 |
| CN | 104564033 | B | 10/2017 |
| CN | 107234358 | A | 10/2017 |
| CN | 107261975 | A | 10/2017 |
| CN | 206581929 | U | 10/2017 |
| CN | 105092401 | B | 12/2017 |
| CN | 107476769 | A | 12/2017 |
| CN | 107520526 | A | 12/2017 |
| CN | 206754664 | U | 12/2017 |
| CN | 107605427 | A | 1/2018 |
| CN | 106438310 | B | 2/2018 |
| CN | 107654196 | A | 2/2018 |
| CN | 107656499 | A | 2/2018 |
| CN | 107728657 | A | 2/2018 |
| CN | 206985503 | U | 2/2018 |
| CN | 207017968 | U | 2/2018 |
| CN | 107859053 | A | 3/2018 |
| CN | 207057867 | U | 3/2018 |
| CN | 207085817 | U | 3/2018 |
| CN | 105545207 | B | 4/2018 |
| CN | 107883091 | A | 4/2018 |
| CN | 107902427 | A | 4/2018 |
| CN | 107939290 | A | 4/2018 |
| CN | 107956708 | A | 4/2018 |
| CN | 207169595 | U | 4/2018 |
| CN | 207194873 | U | 4/2018 |
| CN | 207245674 | U | 4/2018 |
| CN | 108034466 | A | 5/2018 |
| CN | 108036071 | A | 5/2018 |
| CN | 108087050 | A | 5/2018 |
| CN | 108087225 | A | 5/2018 |
| CN | 207380566 | U | 5/2018 |

(56) References Cited

FOREIGN PATENT DOCUMENTS

| | | | |
|---|---|---|---|
| CN | 108103483 | A | 6/2018 |
| CN | 108179046 | A | 6/2018 |
| CN | 108254276 | A | 7/2018 |
| CN | 108311535 | A | 7/2018 |
| CN | 207583576 | U | 7/2018 |
| CN | 207634064 | U | 7/2018 |
| CN | 207648054 | U | 7/2018 |
| CN | 207650621 | U | 7/2018 |
| CN | 108371894 | A | 8/2018 |
| CN | 207777153 | U | 8/2018 |
| CN | 108547601 | A | 9/2018 |
| CN | 108547766 | A | 9/2018 |
| CN | 108555826 | A | 9/2018 |
| CN | 108561098 | A | 9/2018 |
| CN | 108561750 | A | 9/2018 |
| CN | 108590617 | A | 9/2018 |
| CN | 207813495 | U | 9/2018 |
| CN | 207814698 | U | 9/2018 |
| CN | 207862275 | U | 9/2018 |
| CN | 108687954 | A | 10/2018 |
| CN | 207935270 | U | 10/2018 |
| CN | 207961582 | U | 10/2018 |
| CN | 207964530 | U | 10/2018 |
| CN | 108789848 | A | 11/2018 |
| CN | 108799473 | A | 11/2018 |
| CN | 108868675 | A | 11/2018 |
| CN | 208086829 | U | 11/2018 |
| CN | 208089263 | U | 11/2018 |
| CN | 208169068 | U | 11/2018 |
| CN | 108979569 | A | 12/2018 |
| CN | 109027662 | A | 12/2018 |
| CN | 109058092 | A | 12/2018 |
| CN | 208179454 | U | 12/2018 |
| CN | 208179502 | U | 12/2018 |
| CN | 208253147 | U | 12/2018 |
| CN | 208260574 | U | 12/2018 |
| CN | 109114418 | A | 1/2019 |
| CN | 109141990 | A | 1/2019 |
| CN | 208313120 | U | 1/2019 |
| CN | 208330319 | U | 1/2019 |
| CN | 208342730 | U | 1/2019 |
| CN | 208430982 | U | 1/2019 |
| CN | 208430986 | U | 1/2019 |
| CN | 109404274 | A | 3/2019 |
| CN | 109429610 | A | 3/2019 |
| CN | 109491318 | A | 3/2019 |
| CN | 109515177 | A | 3/2019 |
| CN | 109526523 | A | 3/2019 |
| CN | 109534737 | A | 3/2019 |
| CN | 208564504 | U | 3/2019 |
| CN | 208564516 | U | 3/2019 |
| CN | 208564525 | U | 3/2019 |
| CN | 208564918 | U | 3/2019 |
| CN | 208576026 | U | 3/2019 |
| CN | 208576042 | U | 3/2019 |
| CN | 208650818 | U | 3/2019 |
| CN | 208669244 | U | 3/2019 |
| CN | 109555484 | A | 4/2019 |
| CN | 109682881 | A | 4/2019 |
| CN | 208730959 | U | 4/2019 |
| CN | 208735264 | U | 4/2019 |
| CN | 208746733 | U | 4/2019 |
| CN | 208749529 | U | 4/2019 |
| CN | 208750405 | U | 4/2019 |
| CN | 208764658 | U | 4/2019 |
| CN | 109736740 | A | 5/2019 |
| CN | 109751007 | A | 5/2019 |
| CN | 208868428 | U | 5/2019 |
| CN | 208870761 | U | 5/2019 |
| CN | 109869294 | A | 6/2019 |
| CN | 109882144 | A | 6/2019 |
| CN | 109882372 | A | 6/2019 |
| CN | 209012047 | U | 6/2019 |
| CN | 209100025 | U | 7/2019 |
| CN | 110080707 | A | 8/2019 |
| CN | 110118127 | A | 8/2019 |
| CN | 110124574 | A | 8/2019 |
| CN | 110145277 | A | 8/2019 |
| CN | 110145399 | A | 8/2019 |
| CN | 110152552 | A | 8/2019 |
| CN | 110155193 | A | 8/2019 |
| CN | 110159225 | A | 8/2019 |
| CN | 110159432 | A | 8/2019 |
| CN | 110159433 | A | 8/2019 |
| CN | 110208100 | A | 9/2019 |
| CN | 110252191 | A | 9/2019 |
| CN | 110284854 | A | 9/2019 |
| CN | 110284972 | A | 9/2019 |
| CN | 209387358 | U | 9/2019 |
| CN | 110374745 | A | 10/2019 |
| CN | 209534736 | U | 10/2019 |
| CN | 110425105 | A | 11/2019 |
| CN | 110439779 | A | 11/2019 |
| CN | 110454285 | A | 11/2019 |
| CN | 110454352 | A | 11/2019 |
| CN | 110467298 | A | 11/2019 |
| CN | 110469312 | A | 11/2019 |
| CN | 110469314 | A | 11/2019 |
| CN | 110469405 | A | 11/2019 |
| CN | 110469654 | A | 11/2019 |
| CN | 110485982 | A | 11/2019 |
| CN | 110485983 | A | 11/2019 |
| CN | 110485984 | A | 11/2019 |
| CN | 110486249 | A | 11/2019 |
| CN | 110500255 | A | 11/2019 |
| CN | 110510771 | A | 11/2019 |
| CN | 110513097 | A | 11/2019 |
| CN | 209650738 | U | 11/2019 |
| CN | 209653968 | U | 11/2019 |
| CN | 209654004 | U | 11/2019 |
| CN | 209654022 | U | 11/2019 |
| CN | 209654128 | U | 11/2019 |
| CN | 209656622 | U | 11/2019 |
| CN | 107849130 | B | 12/2019 |
| CN | 108087050 | B | 12/2019 |
| CN | 110566173 | A | 12/2019 |
| CN | 110608030 | A | 12/2019 |
| CN | 110617187 | A | 12/2019 |
| CN | 110617188 | A | 12/2019 |
| CN | 110617318 | A | 12/2019 |
| CN | 209740823 | U | 12/2019 |
| CN | 209780827 | U | 12/2019 |
| CN | 209798631 | U | 12/2019 |
| CN | 209799942 | U | 12/2019 |
| CN | 209800178 | U | 12/2019 |
| CN | 209855723 | U | 12/2019 |
| CN | 209855742 | U | 12/2019 |
| CN | 209875063 | U | 12/2019 |
| CN | 110656919 | A | 1/2020 |
| CN | 107520526 | B | 2/2020 |
| CN | 110787667 | A | 2/2020 |
| CN | 110821464 | A | 2/2020 |
| CN | 110833665 | A | 2/2020 |
| CN | 110848028 | A | 2/2020 |
| CN | 210049880 | U | 2/2020 |
| CN | 210049882 | U | 2/2020 |
| CN | 210097596 | U | 2/2020 |
| CN | 210105817 | U | 2/2020 |
| CN | 210105818 | U | 2/2020 |
| CN | 210105993 | U | 2/2020 |
| CN | 110873093 | A | 3/2020 |
| CN | 210139911 | U | 3/2020 |
| CN | 110947681 | A | 4/2020 |
| CN | 111058810 | A | 4/2020 |
| CN | 111075391 | A | 4/2020 |
| CN | 210289931 | U | 4/2020 |
| CN | 210289932 | U | 4/2020 |
| CN | 210289933 | U | 4/2020 |
| CN | 210303516 | U | 4/2020 |
| CN | 111089003 | A | 5/2020 |
| CN | 111151186 | A | 5/2020 |
| CN | 111167769 | A | 5/2020 |
| CN | 111169833 | A | 5/2020 |
| CN | 111173476 | A | 5/2020 |

(56) References Cited

FOREIGN PATENT DOCUMENTS

| | | | | |
|---|---|---|---|---|
| CN | 111185460 | A | 5/2020 | |
| CN | 111185461 | A | 5/2020 | |
| CN | 111188763 | A | 5/2020 | |
| CN | 111206901 | A | 5/2020 | |
| CN | 111206992 | A | 5/2020 | |
| CN | 111206994 | A | 5/2020 | |
| CN | 210449044 | U | 5/2020 | |
| CN | 210460875 | U | 5/2020 | |
| CN | 210522432 | U | 5/2020 | |
| CN | 210598943 | U | 5/2020 | |
| CN | 210598945 | U | 5/2020 | |
| CN | 210598946 | U | 5/2020 | |
| CN | 210599194 | U | 5/2020 | |
| CN | 210599303 | U | 5/2020 | |
| CN | 210600110 | U | 5/2020 | |
| CN | 111219326 | A | 6/2020 | |
| CN | 111350595 | A | 6/2020 | |
| CN | 210660319 | U | 6/2020 | |
| CN | 210714569 | U | 6/2020 | |
| CN | 210769168 | U | 6/2020 | |
| CN | 210769169 | U | 6/2020 | |
| CN | 210769170 | U | 6/2020 | |
| CN | 210770133 | U | 6/2020 | |
| CN | 210825844 | U | 6/2020 | |
| CN | 210888904 | U | 6/2020 | |
| CN | 210888905 | U | 6/2020 | |
| CN | 210889242 | U | 6/2020 | |
| CN | 111397474 | A | 7/2020 | |
| CN | 111412064 | A | 7/2020 | |
| CN | 111441923 | A | 7/2020 | |
| CN | 111441925 | A | 7/2020 | |
| CN | 111503517 | A | 8/2020 | |
| CN | 111515898 | A | 8/2020 | |
| CN | 111594059 | A | 8/2020 | |
| CN | 111594062 | A | 8/2020 | |
| CN | 111594144 | A | 8/2020 | |
| CN | 211201919 | U | 8/2020 | |
| CN | 211201920 | U | 8/2020 | |
| CN | 211202218 | U | 8/2020 | |
| CN | 111608965 | A | 9/2020 | |
| CN | 111664087 | A | 9/2020 | |
| CN | 111677476 | A | 9/2020 | |
| CN | 111677647 | A | 9/2020 | |
| CN | 111692064 | A | 9/2020 | |
| CN | 111692065 | A | 9/2020 | |
| CN | 211384571 | U | 9/2020 | |
| CN | 211397553 | U | 9/2020 | |
| CN | 211397677 | U | 9/2020 | |
| CN | 211412945 | U | 9/2020 | |
| CN | 211500955 | U | 9/2020 | |
| CN | 211524765 | U | 9/2020 | |
| CN | 216898891 | U | 7/2022 | |
| CN | 116293218 | A | 6/2023 | |
| CO | 5590200 | A1 | 12/2005 | |
| CO | 09053113 | | 10/2009 | |
| CO | 6580169 | U1 | 12/2012 | |
| CO | 6620023 | A1 | 2/2013 | |
| CO | 2017010661 | A1 | 4/2019 | |
| DE | 4004854 | A1 | 8/1991 | |
| DE | 4241614 | A1 | 6/1994 | |
| DE | 102009022859 | A1 | 12/2010 | |
| DE | 102012018825 | A1 | 3/2014 | |
| DE | 102013111655 | A1 | 12/2014 | |
| DE | 202015102989 | U1 | 6/2015 | |
| DE | 102015103872 | A1 | 10/2015 | |
| DE | 102013114335 | B4 | 12/2020 | |
| EP | 0835983 | A2 | 4/1998 | |
| EP | 1378683 | A3 | 8/2004 | |
| EP | 2143916 | A1 | 1/2010 | |
| EP | 2613023 | A2 | 7/2013 | |
| EP | 3095989 | A1 | 11/2016 | |
| EP | 3211766 | A1 | 8/2017 | |
| EP | 3049642 | B1 | 4/2018 | |
| EP | 3354866 | A1 | 8/2018 | |
| EP | 3075946 | B1 | 5/2019 | |
| EP | 3623651 | A1 * | 3/2020 | ................ F16C 3/08 |
| FR | 2795774 | A1 | 1/2001 | |
| GB | 474072 | A | 10/1937 | |
| GB | 1433960 | | 4/1976 | |
| GB | 1438172 | A | 6/1976 | |
| JP | S57135212 | A | 8/1982 | |
| JP | S5826678 | Y2 | 6/1983 | |
| JP | 2005133667 | | 5/2005 | |
| JP | 2006117035 | A | 5/2006 | |
| KR | 20020026398 | A | 4/2002 | |
| KR | 100408485 | B1 | 12/2003 | |
| RU | 13562 | U1 | 4/2000 | |
| WO | 9320328 | A1 | 10/1993 | |
| WO | 2006025886 | A2 | 3/2006 | |
| WO | WO-2008072548 | A1 * | 6/2008 | ............ F16C 17/022 |
| WO | 2009023042 | A1 | 2/2009 | |
| WO | 2011133821 | A3 | 12/2011 | |
| WO | 2012139380 | A1 | 10/2012 | |
| WO | 2013158822 | A1 | 10/2013 | |
| WO | WO-2013152568 | A1 | 10/2013 | |
| WO | 2013163786 | A1 | 11/2013 | |
| WO | 2013185399 | A1 | 12/2013 | |
| WO | 2015158020 | A1 | 10/2015 | |
| WO | 2016014476 | A1 | 1/2016 | |
| WO | 2016033983 | A1 | 3/2016 | |
| WO | 2016078181 | A1 | 5/2016 | |
| WO | 2016101374 | A1 | 6/2016 | |
| WO | 2016112590 | A1 | 7/2016 | |
| WO | 2016186790 | A1 | 11/2016 | |
| WO | 2017146279 | A1 | 8/2017 | |
| WO | 2017123656 | A3 | 10/2017 | |
| WO | 2017213848 | A1 | 12/2017 | |
| WO | 2018031031 | A1 | 2/2018 | |
| WO | 2018031029 | A8 | 3/2018 | |
| WO | 2018038710 | A1 | 3/2018 | |
| WO | 2018044293 | A1 | 3/2018 | |
| WO | 2018044307 | A1 | 3/2018 | |
| WO | 2018071738 | A1 | 4/2018 | |
| WO | 2018075034 | A8 | 5/2018 | |
| WO | 2018101912 | A1 | 6/2018 | |
| WO | 2018106210 | A1 | 6/2018 | |
| WO | 2018106225 | A1 | 6/2018 | |
| WO | 2018106252 | A1 | 6/2018 | |
| WO | 2018132106 | A1 | 7/2018 | |
| WO | 2018101909 | A8 | 8/2018 | |
| WO | 2018156131 | A1 | 8/2018 | |
| WO | 2018187346 | A1 | 10/2018 | |
| WO | 2019045691 | A1 | 3/2019 | |
| WO | 2019046680 | A1 | 3/2019 | |
| WO | 2019060922 | A1 | 3/2019 | |
| WO | 2019117862 | A1 | 6/2019 | |
| WO | 2019126742 | A1 | 6/2019 | |
| WO | 2019147601 | A1 | 8/2019 | |
| WO | 2019169366 | A1 | 9/2019 | |
| WO | 2019195651 | A1 | 10/2019 | |
| WO | 2019200510 | A1 | 10/2019 | |
| WO | 2019210417 | A1 | 11/2019 | |
| WO | 2020018068 | A1 | 1/2020 | |
| WO | 2020046866 | A1 | 3/2020 | |
| WO | 2020076569 | A1 | 4/2020 | |
| WO | 2020097060 | A2 | 5/2020 | |
| WO | 2020104088 | A1 | 5/2020 | |
| WO | WO-2020106603 | A1 | 5/2020 | |
| WO | 2020072076 | A8 | 6/2020 | |
| WO | 2020131085 | A1 | 6/2020 | |
| WO | 2020211083 | A1 | 10/2020 | |
| WO | 2020211086 | A1 | 10/2020 | |
| WO | 2021038604 | A1 | 3/2021 | |
| WO | 2021041783 | A1 | 3/2021 | |
| WO | WO-2021067410 | A1 | 4/2021 | |

OTHER PUBLICATIONS

"Honghua developing new-generation shale-drilling rig, plans testing of frac pump"; Katherine Scott; Drilling Contractor; May 23, 2013; accessed at https://www.drillingcontractor.org/honghua-developing-new-generation-shale-drilling-rig-plans-testing-of-frac-pump-23278.

(56) References Cited

OTHER PUBLICATIONS

"Turbine Frac Units," WMD Squared (2012), https://wmdsquared.com/work/gfes-turbine-frac-units/.
2011 Publications and Services, American Petroleum Institute (2011).
2012 High Horsepower Summit Agenda, Natural Gas for High Horsepower Applications (Sep. 5, 2012).
35% Economy Increase, Dual-fuel System Highlighting Jereh Apollo Frac Pumper, Jereh Group (Apr. 13, 2015), https://www.jereh.com/en/news/press-release/news-detail-7345.htm.
About API, American Petroleum Institute, https://www.api.org /about, accessed Dec. 30, 2021.
About API, American Petroleum Institute, WaybackMachine Capture, https://web.archive.org/web/20110422104346 / http://api.org/aboutapi/, captured Apr. 22, 2011.
Advances in Popular Torque-Link Solution Offer OEMs Greater Benefit, Jun. 21, 2018.
AFD Petroleum Ltd., Automated Hot Zone, Frac Refueling System, Dec. 2018.
AFGlobal Corporation, Durastim Hydraulic Fracturing Pump, A Revolutionary Design for Continuous Duty Hydraulic Fracturing, 2018.
American Petroleum Institute. API 616: Gas Turbines for the Petroleum, Chemical, and Gas Industry Services. 5th ed. Washington, DC: API Publishing Services, 2011.
American Petroleum Institute. API 674: Positive Displacement Pumps—Reciprocating. 3rd ed. Washington, DC: API Publishing Services, 2010.
Ankit Tiwari, Design of a Cooling System for a Hydraulic Fracturing Equipment, The Pennsylvania State University, The Graduate School, College of Engineering, 2015.
API Member Companies, American Petroleum Institute, WaybackMachine Capture, https://web.archive.org/web/20130424080625/http://api.org/globalitems/globalheaderpages/membership/api-member-companies, accessed Jan. 4, 2021.
API's Global Industry Services, American Petroleum Institute, © Aug. 2020.
Arop, Julius Bankong. Geomechanical review of hydraulic fracturing technology. Thesis (M. Eng.). Cambridge, MA: Massachusetts Institute of Technology, Dept. of Civil and Environmental Engineering. Oct. 29, 2013. https://dspace.mit.edu/handle/1721.1/82176.
B.M. Mahlalela, et al., .Electric Power Generation Potential Based on Waste Heat and Geothermal Resources in South Africa, pangea.Stanford.edu (Feb. 11, 2019).
Blago Minovski, Coupled Simulations of Cooling and Engine Systems for Unsteady Analysis of the Benefits of Thermal Engine Encapsulation, Department of Applied Mechanics, Chalmers University of Technology Goteborg, Sweden 2015.
Business Week: Fiber-optic cables help fracking, cablinginstall.com. Jul. 12, 2013. https://www.cablinginstall.com/cable/article/16474208/businessweek-fiberoptic-cables-help-fracking.
Cameron, A Schlumberger Company, Frac Manifold Systems, 2016.
CanDyne Pump Services, Inc. Weatherford Q700 Pump. Calgary, Alberta, Canada: CanDyne Pump Services. Aug. 15, 2015. http://candyne.com/wp-content/uploads/2014/10/181905-94921.q700-quintuplex-pump.pdf.
Capstone Turbine Corporation, Capstone Receives Three Megawatt Order from Large Independent Oil & Gas Company in Eagle Ford Shale Play, Dec. 7, 2010.
Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.
Chun, M. K., H. K. Song, and R. Lallemand. "Heavy duty gas turbines in petrochemical plants: Samsung's Daesan plant (Korea) beats fuel flexibility records with over 95% hydrogen in process gas." Proceedings of PowerGen Asia Conference, Singapore. 1999.
CNG Delivery, Fracturing with natural gas, dual-fuel drilling with CNG, Aug. 22, 2019.
Cooper et al., Jet Frac Porta-Skid—A New Concept in Oil Field Service Pump Equipments[sic]; Halliburton Services; SPE-2706 (1969).
De Gevigney et al., "Analysis of No. load dependent power losses in a planetary gear train by using thermal network method", International Gear Conference 2014: Aug. 26-28, 2014, Lyon, pp. 615-624.
Department of Energy, United States of America, The Water-Energy Nexus: Challenges and Opportunities purenergypolicy.org (Jun. 2014).
Dowell B908 "Turbo-Jet" Operator's Manual.
Dziubak, Tadeusz, "Experimental Studies of Dust Suction Irregularity from Multi-Cyclone Dust Collector of Two-Stage Air Filter", Energies 2021, 14, 3577, 28 pages.
Ecob, David J., et al. "Design and Development of a Landfill Gas Combustion System for the Typhoon Gas Turbine." ASME 1996 International Gas Turbine and Aeroengine Congress and Exhibition. American Society of Mechanical Engineers Digital Collection, 1996.
Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.
Emmanuel Akita et al., Mewbourne College of Earth & Energy, Society of Petroleum Engineers; Drilling Systems Automation Technical Section (DSATS); 2019.
EMPengineering.com, HEMP Resistant Electrical Generators / Hardened Structures HEMP/GMD Shielded Generators, Virginia, Nov. 3, 2012.
Europump and Hydrualic Institute, Variable Speed Pumping: A Guide to Successful Applications, Elsevier Ltd, 2004.
Eygun, Christiane, et al., URTeC: 2687987, Mitigating Shale Gas Developments Carbon Footprint: Evaluating and Implementing Solutions in Argentina, Copyright 2017, Unconventional Resources Technology Conference.
Ferdinand P. Beer et al., Mechanics of Materials (6th ed. 2012).
Filipovic, Ivan, Preliminary Selection of Basic Parameters of Different Torsional Vibration Dampers Intended for use in Medium-Speed Diesel Engines, Transactions of Famena XXXVI-3 (2012).
Final written decision of PGR2021-00102 dated Feb. 6, 2023.
Final written decision of PGR2021-00103 dated Feb. 6, 2023.
FMC Technologies, Operation and Maintenance Manual, L06 Through L16 Triplex Pumps Doc No. OMM50000903 Rev: E p. 1 of 66. Aug. 27, 2009.
Frac Shack, Bi-Fuel FracFueller brochure, 2011.
Frac Tank Hose (FRAC), 4starhose.com. Accessed: Nov. 10, 2019. http://www.4starhose.com/product/frac_tank_hose_frac.aspx.
Fracking companies switch to electric motors to power pumps, iadd-intl.org. Jun. 27, 2019. https://www.iadd-intl.org/articles/fracking-companies-switch-to-electric-motors-to-power-pumps/.
Fracture Design and Stimulation, Mike Eberhard, P.E., Wellconstruction & Operations Technical Workshop Insupport of the EPA Hydraulic Fracturing Study, Mar. 10-11, 2011.
FTS International's Dual Fuel Hydraulic Fracturing Equipment Increases Operational Efficiencies, Provides Cost Benefits, Jan. 3, 2018.
Gardner Denver Hydraulic Fracturing Pumps GD 3000 https://www.gardnerdenver.com/en-us/pumps/triplex-fracking-pump-gd-3000.
*General Purpose* vs. *Special Purpose Couplings*, Jon Mancuso, Proceedings of the Twenty-Third Turbomachinerysymposium (1994).
Ginter, Timothy, and Thomas Bouvay. "Uprate options for the MS7001 heavy duty gas turbine." GE paper GER-3808C, GE Energy 12 (2006).
Green Field Energy Services Deploys Third New Hydraulic Fracturing System, Green Field Energy Services, Inc. (Jul. 11, 2012), https://www.prnewswire.com/news-releases/green-field-energy-services-deploys-third-new-hydraulic-facturing-sp read-162113425.
Green Field Energy Services Natural Gas Driven Turbine Frac Pumps HHP Summit Presentation, Yumpu (Sep. 2012), https://www.yumpu.com/en/document/read/49685291/turbine-frac-pump-assembly-hhp ("Green Field").
Halliburton, Vessel-based Modular Solution (VMS), 2015.

(56) References Cited

OTHER PUBLICATIONS

HCl Jet Frac, Screenshots from YouTube, Dec. 11, 2010. https://www.youtube.com/watch?v=6HjXkdbFaFQ.
Hydraulic Fracturing: Gas turbine proves successful in shale gasfield operations, Vericor (2017), https://www.vericor.com/wp-content/uploads/2020/02/7.-Fracing-4500hp-Pump-China-En.pdf ("Vericor Case Study").
Ibragimov, É.S., Use of gas-turbine engines in oil field pumping units; Chem Petrol Eng; (1994) 30: 530. https://doi.org/10.1007/BF01154919. (Translated from Khimicheskaya i Neftyanoe Mashinostroenie, No. 11, pp. 24-26, Nov. 1994.).
IHS Markit Standards Store, https://global.ihs.com/doc_ detail.cfm?document_name=API%20STD%20674&item_s_key=00010672#doc-detail-history-anchor, accessed Dec. 30, 2021; and https://global.ihs.com/doc_detail.cfm?&input_doc _number=671&input_doc_title=&document_name=API%20STD%20671&item_s_key=00010669&item_key_date=890331&origin=DSSC, accessed Dec. 30, 2021.
II-VI Marlow Industries, Thermoelectric Technologies in Oil, Gas, and Mining Industries, blog.marlow.com (Jul. 24, 2019).
Integrated Flow, Skid-mounted Modular Process Systems, Jul. 15, 2017, https://ifsolutions.com/why-modular/.
ISM, What is Cracking Pressure, 2019.
J. Porteiro et al., Feasibility of a new domestic CHP trigeneration with heat pump: II. Availability analysis. Design and development, Applied Thermal Engineering 24 (2004) 1421-1429.
JBG Enterprises, Inc., WS-Series Blowout Prevention Safety Coupling—Quick Release Couplings, Sep. 11, 2015, http://www.jgbhose.com/products/WS-Series-Blowout-Prevention-Sarety-Coupling.asp.
Jereh Apollo 4500 Turbine Frac Pumper Finishes Successful Field Operation in China, Jereh Group (Feb. 13, 2015), as available on Apr. 20, 2015, https://web.archive.org/web/20150420220625/https://www. prnewswire.com/news-releases/jereh-apollo-4500-turbine-frac-pumper-finishes-successful-field-operation-in-china-300035829.html.
Jereh Apollo Turbine Fracturing Pumper Featured on China Central Television, Jereh Group (Mar. 9, 2018), https://www.jereh.com/en/news/press-release/news-detail-7267.htm.
Jereh Debut's Super power Turbine Fracturing Pump, Leading the Industrial Revolution, Jereh Oilfield Services Group (Mar. 19, 2014), https://www.prnewswire.com/news-releases/jereh-debuts-super-power-turbine-fracturing-pump-leading-the-industrial-revolution-250992111.html.
Jereh Group, Jereh Fracturing Equipment. YouTube (Jun. 8, 2015), https://www.youtube.com/watch? v=m0vMiq84P4Q.
Jereh Group, Jereh Fracturing Unit, Fracturing Spread, YouTube (Mar. 30, 2015), https://www.youtube.com/watch?v=PlkDbU5dE0o.
Jereh Unveiled New Electric Fracturing Solution at OTC 2019, Jereh Group (May 7, 2019), as available on May 28, 2019, https://web.archive.org/web/20190528183906/https://www.prnewswire .com/news-releases/jereh-unveiled-new-electric-fracturing-solution-at-otc-2019-300845028.html.
Jp Yadav et al., Power Enhancement of Gas Turbine Plant by Intake Air Fog Cooling, Jun. 2015.
Karassik, Igor, Joseph Messina, Paul Cooper, and Charles Heald. Pump Handbook. 4th ed. New York: McGraw-Hill Education, 2008.
Karen Boman, Turbine Technology Powers Green Field Multi-Fuel Frack Pump, Rigzone (Mar. 7, 2015), as available on Mar. 14, 2015, https://web.archive.org/web/20150314203227/https://www.rigzone.co m/news/oil-gas/a/124883/Turbine_Technology_Powers_Green_Field_ MultiFuel_Frack_Pump.
Kas'yanov et al., Application of gas-turbine engines in pumping units complexes of hydraulic fracturing of oil and gas reservoirs; Exposition Oil & Gas; (Oct. 2012) (published in Russian).
Lekontsev, Yu M., et al. "Two-side sealer operation." Journal of Mining Science 49.5 (2013): 757-762.
Leslie Turj, Green Field asset sale called 'largest disposition industry has seen,' The INDsider Media (Mar. 19, 2014), http://theind.com/ article-16497-green-field-asset-sale-called-%E2%80%98largest-disposition-industry-has-seen%60.html.
M. Ahmadzadehtalatapeh et al. Performance enhancement of gas turbine units by retrofitting with inlet air cooling technologies (IACTs): an hour-by-hour simulation study, Journal of the Brazilian Society of Mechanical Sciences and Engineering, Mar. 2020.
Marine Turbine Technologies, 1 MW Power Generation Package, http://marineturbine.com/power-generation, 2017.
Marine Turbine. Turbine Powered Frac Units. Franklin, Louisiana: Marine Turbine Technologies, 2020.
Mee Industries: Inlet Air Fogging Systems for Oil, Gas and Petrochemical Processing, Verdict Media Limited Copyright 2020.
Mobile Fuel Delivery, atlasoil.com. Mar. 6, 2019. https://www.atlasoil.com/nationwide-fueling/onsite-and-mobile-fueling.
Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).
Overview of Industry Guidance/Best Practices on Hydraulic Fracturing (HF), American Petroleum Institute, © 2012.
PbNG, Natural Gas Fuel for Drilling and Hydraulic Fracturing, Diesel Displacement / Dual Fuel & Bi-Fuel, May 2014.
Pettigrew, Dana, et al., High Pressure Multi-Stage Centrifugal Pump for 10,000 psi Frac Pump—HPHPS Frac Pump, Copyright 2013, Society of Petroleum Engineers, SPE 166191.
Plos One, Dynamic Behavior of Reciprocating Plunger Pump Discharge Valve Based on Fluid Structure Interaction and Experimental Analysis. Oct. 21, 2015.
Porter, John A. (Solar Division International Harvester Co.), Modern Industrial Gas Turbines for the Oil Field; American Petroleum Institute; Drilling and Production Practice; API-67-243 (Jan. 1, 1967).
PowerShelter Kit II, nooutage.com, Sep. 6, 2019.
Procedures for Standards Development, American Petroleum Institute, Third Edition (2006).
Publications, American Petroleum Institute, WaybackMachine Capture, https://web.archive.org/web/20110427043936 / http://www.api.org:80/Publications/, captured Apr. 27, 2011.
Pump Control With Variable Frequency Drives, Kevin Tory, Pumps & Systems: Advances in Motors and Drives, Reprint from Jun. 2008.
Researchgate, Answer by Byron Woolridge, found at https://www.researchgate.net/post/ How_can_we_improve_the_efficiency_of_the_gas_turbine_cycles, Jan. 1, 2013.
Review of HHP Summit 2012, Gladstein, Neandross & Associates https://www.gladstein.org/gna-conferences/high-horsepower-summit-2012/.
Rigmaster Machinery Ltd., Model: 2000 RMP-6-PLEX, brochure, downloaded at https://www.rigmastermachinery.com/_files/ugd/431e62_eaecd77c9fe54af8b13d08396072da67.pdf.
Rotating Right. Quintuplex Power Pump Model Q700. Edmonton, Alberta, Canada: Weatherford International Ltd. https://www.rotatingright.com/pdf/weatherford/RR%2026-Weatherford%20Model%20Q700.pdf, 2021.
Shandong Saigao Group Corporation. Q4 (5W115) Quintuplex Plunger Pump. Jinan City, Shandong Province, China; Saigao. Oct. 20, 2014. https://www.saigaogroup.com/product/q400-5w115-quintuplex-plunger-pump.html.
Special-Purpose Couplings for Petroleum, Chemical, and Gas Industry Services, API Standard 671 (4th Edition) (2010).
SPM® QEM 5000 E-Frac Pump Specification Sheet, Weir Group (2019) ("Weir 5000").
Standards, American Petroleum Institute, WaybackMachine Capture, https://web.archive.org/web/20110207195046/ http:/www.api.org/Standards/, captured Feb. 7, 2011; and https://web.archive.org/web/20110204112554/http://global.ihs.com/?RID=API1, captured Feb. 4, 2011.
Swagelok, The right valve for controlling flow direction? Check, 2016.
Technology.org, Check valves how do they work and what are the main type, 2018.
The Application of Flexible Couplings for Turbomachinery, Jon R.Mancuso et al., Proceedings of the Eighteenthturbomachinery Symposium (1989).

(56) References Cited

OTHER PUBLICATIONS

The Leader in Frac Fueling, suncoastresources.com. Jun. 29, 2015. https://web.archive.org/web/20150629220609/ https://www.suncoastresources.com/oilfield/fueling-services/.
The Weir Group, Inc. Weir SPM Pump Product Catalog. Ft. Worth, TX: S.P.M. Flow Control, Inc. Oct. 30, 2017. https://manage.global.weir/assets/files/product%20brochures/SPM_2P140706_Pump_Product_Catalogue_View.pdf.
Tom Hausfeld, GE Power & Water, and Eldon Schelske, Evolution Well Services, TM2500+ Power for Hydraulic Fracturing.
Transcript of Jereh Group, Jereh Fracturing Equipment, YouTube (Jun. 8, 2015), https://www.youtube.com/watch?v=m0vMiq84P4Q.
Transcript of Jereh Group, Jereh Fracturing Unit, Fracturing Spread, YouTube (Mar. 30, 2015).
Wallace, E.M., Associated Shale Gas: From Flares to Rig Power, Copyright 2015, Society of Petroleum Engineers, SPE-173491-MS.
Walzel, Brian, Hart Energy, Oil, Gas Industry Discovers Innovative Solutions to Environmental Concerns, Dec. 10, 2018.
Weir Oil & Gas Introduces Industry's First Continuous Duty 5000-Horsepower Pump, Weir Group (Jul. 25, 2019), https://www.global. weir/newsroom/news-articles/weir-oil-and-gas-introduces-industrys-first-continuous-duty-5000-horsepower-pump/.
Weir SPM. Weir SPM General Catalog: Well Service Pumps, Flow Control Products, Manifold Trailers, Safety Products, Post Sale Services. Ft. Worth, TX: Weir Oil & Gas. May 28, 2016. https://www.pumpfundamentals.com/pumpdatabase2/weir-spm-general.pdf.
Wikipedia, Westinghouse Combustion Turbine Systems Division, https://en.wikipedia.org/wiki/Westinghouse_Combustion_Turbine_Systems_Division, circa 1960.
Wikipedia, Union Pacific GTELs, https://en.wikipedia.org/wiki/Union_Pacific_GTELs, circa 1950.
Williams, C.W. (Gulf Oil Corp. Odessa Texas), The Use of Gas-turbine Engines in an Automated High-Pressure Water-Injection Stations; American Petroleum Institute; API-63-144 (Jan. 1, 1963).
Wolf, Jurgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.
WorldCat Library Collections Database Records for API Standard 671 and API Standard 674, https://www.worldcat.org/title/positive-displacement-pumps-reciprocating/oclc/ 858692269&referer=brief_results, accessed Dec. 30, 2021; and https://www.worldcat. org/title/special-purpose-couplings-for-petroleum-chemical-and-gas-industry-services/oclc/871254217&referer=brief_results, accessed Dec. 22, 2021.
ZSi-Foster, Energy | Solar | Fracking | Oil and Gas, Aug. 2020, https://www.zsi-foster.com/energy-solar-fracking-oil-and-gas.html.

* cited by examiner

CRANKSHAFT AND CONNECTING ROD ASSEMBLIES FOR HYDRAULIC FRACTURING PUMPS

PRIORITY CLAIMS

This is a continuation-in-part of U.S. application Ser. No. 17/664,578, filed May 23, 2022, titled "HYDRAULIC FRACTURING PUMPS TO ENHANCE FLOW OF FRACTURING FLUID INTO WELLHEADS AND RELATED METHODS," which claims priority to and the benefit of U.S. Provisional Application No. 63/202,031, filed May 24, 2021, and this also claims priority to and the benefit of U.S. Provisional Application No. 63/386,289, filed Dec. 6, 2022, the disclosures of each of which are incorporated herein by reference in their entireties.

TECHNICAL FIELD

The present disclosure relates to crankshaft and connecting rod assemblies and related methods and, more particularly, to crankshaft and connecting rod assemblies for hydraulic fracturing pumps to enhance the flow of fracturing fluid into wellheads and related methods.

BACKGROUND

Hydraulic fracturing is an oilfield operation that stimulates the production of hydrocarbons, such that the hydrocarbons may more easily or readily flow from a subsurface formation to a well. For example, a hydraulic fracturing system may be configured to fracture a formation by pumping a fracturing fluid into a well at high pressure and high flow rates. Some fracturing fluids may take the form of a slurry including water, proppants, and/or other additives, such as thickening agents and gels. The slurry may be forced via operation of one or more pumps into the formation at rates faster than may be accepted by the existing pores, fractures, faults, or other spaces within the formation. As a result, pressure may build rapidly to the point where the formation may fail and may begin to fracture. By continuing to pump the fracturing fluid into the formation, existing fractures in the formation may be caused to expand and extend in directions away from a well bore, thereby creating additional flow paths for hydrocarbons to flow to the well bore. The proppants may serve to prevent the expanded fractures from closing or may reduce the extent to which the expanded fractures contract when pumping of the fracturing fluid is ceased. Once the formation is fractured, large quantities of the injected fracturing fluid are allowed to flow out of the well, and the production stream of hydrocarbons may be obtained from the formation.

To pump the fracturing fluid into the well bore, a hydraulic fracturing system may include a number of hydraulic fracturing units, each including a prime mover to supply mechanical power and a hydraulic fracturing pump driven by the prime mover. The hydraulic fracturing pump may be supplied with fracturing fluid, and the hydraulic fracturing pump, driven by the prime mover, may pump the fracturing fluid at high-pressure and high flow rates into the wellhead during a fracturing operation. In order to facilitate use of the hydraulic fracturing units and other equipment related to a fracturing operation at different locations, the hydraulic fracturing units may often include a mobile platform, such as a trailer, onto which the prime mover, hydraulic fracturing pump, and other components of the hydraulic fracturing unit may be mounted. The hydraulic fracturing unit may be transported to one wellhead location, set-up for operation, used during the fracturing operation, and once the fracturing operation is completed, it may be partially disassembled for transportation and transported to another wellhead location for use in another fracturing operation. Because the hydraulic fracturing units are often transported on public highways, the maximum dimensions of the hydraulic fracturing units may often be constrained by government regulations.

Although the maximum dimensions of the hydraulic fracturing units may be constrained, it may be desirable for the hydraulic fracturing units to be capable of increased pumping capacity. For example, by increasing the pumping capacity of the hydraulic fracturing units, it may be possible to successfully complete a fracturing operation using fewer hydraulic fracturing units, which may lead to reduced set-up and tear-down time, the need for fewer operators, more efficient operation, and more cost-effective completion of the fracturing operation. However, due at least in part to the constrained maximum dimensions of the hydraulic fracturing units, it may be difficult to increase the pumping capacity of a hydraulic fracturing unit.

In addition, larger hydraulic fracturing pumps driven by more powerful prime movers may develop relatively larger shock and vibration during operation, for example, due to torque loads generated by more powerful prime movers driving higher capacity hydraulic fracturing pumps. Such shock and vibration, if unmitigated, may result in premature wear or failure of components of the hydraulic fracturing unit and manifolds carrying the fracturing fluid to the wellhead. Thus, although hydraulic fracturing units having larger pumping capacities may be desirable, such larger capacities may result other possible drawbacks.

Accordingly, Applicant has recognized a need for hydraulic fracturing units and related methods for providing greater pumping capacity, while mitigating or eliminating possible drawbacks. The present disclosure may address one or more of the above-referenced drawbacks, as well as other possible drawbacks.

SUMMARY

As referenced above, it may be desirable to provide hydraulic fracturing units having higher pumping capacities, but achieving higher pumping capacities may be constrained by limited physical dimensions enabling transportation of hydraulic fracturing units between well sites. In addition, higher pumping capacities may require more powerful prime movers and higher capacity hydraulic fracturing pumps, and operation of such prime movers and hydraulic fracturing pumps may lead to premature wear or failure of components of the hydraulic fracturing units and the manifolds that carry the fracturing fluid to the wellhead due, for example, to increased shock and vibration during operation and proppant settling due to increased stroke lengths.

The present disclosure generally is directed to crankshaft and connecting rod assemblies for hydraulic fracturing pumps to enhance the flow of fracturing fluid into wellheads and related methods and, more particularly, to crankshaft and connecting rod assemblies for hydraulic fracturing pumps to provide increased flow of fracturing fluid into wellheads and related methods. For example, in some embodiments, a hydraulic fracturing pump may be configured to provided increased pumping capacity while retaining dimensions able to fit within physical dimension limitations for transportation between well sites. In addition, in some embodiments, the crankshaft and connecting rod assemblies and related methods may provide higher pumping capacities while reducing wear and/or component damage. As a result, at least some embodiments may reduce the likelihood of, or prevent, premature component wear or failure in hydraulic fracturing systems.

According to some embodiments, a crankshaft and connecting rod assembly for a hydraulic fracturing pump may include a crankshaft including a first journal configured to be rotatably supported in a first frame section of the hydraulic fracturing pump, and a second journal configured to be rotatably supported in a second frame section of the hydraulic fracturing pump. The first journal and the second journal may define therebetween a longitudinal crankshaft axis. The crankshaft further may include a crankpin between the first journal and the second journal and defining a longitudinal crankpin axis extending substantially parallel to and offset from the longitudinal crankshaft axis. The crankpin may include a crankpin body extending along the longitudinal crankpin axis and defining a crankpin surface, with the crankpin surface being substantially cylindrical. The crankpin further may include a first ridge at least partially extending circumferentially around the crankpin surface of the crankpin body, and a second ridge longitudinally spaced from the first ridge and at least partially extending circumferentially around the crankpin surface of the crankpin body. The crankshaft and connecting rod assembly also may include a first connecting rod including a first elongated rod body defining a first longitudinal rod axis and having a first crank end and a first plunger end opposite the first crank end. The first crank end may include a first crankpin connector connected to the crankpin between the first journal and the first ridge, and a second crankpin connector connected to the crankpin between the second ridge and the second journal. The first crank end may define a connecting rod clearance between the first crankpin connector and the second crankpin connector. The first connecting rod further may include a first rod clamp connected to the first crankpin connector, thereby to rotatably connect the first elongated rod body to the crankpin, and a second rod clamp connected to the second crankpin connector, thereby to rotatably connect the first elongated rod body to the crankpin. The first connecting rod also may include first plunger connector at the plunger end of the first elongated rod body and configured to connect a first plunger to the first elongated rod body. The crankshaft and connecting rod assembly also may include a second connecting rod including a second elongated rod body defining a second longitudinal rod axis and having a second crank end and a second plunger end opposite the second crank end. The second crank end may include a third crankpin connector connected to the crankpin between the first crankpin connector and the second crankpin connector of the first connecting rod, thereby to increase pumping capacity of the hydraulic fracturing pump without substantially increasing a length of the hydraulic fracturing pump.

In some embodiments, a crankshaft for a high-power pump may include a first journal configured to be rotatably supported in a first frame section of the high-power pump, and a second journal configured to be rotatably supported in a second frame section of the high-power pump. The first journal and the second journal may define therebetween a longitudinal crankshaft axis. The crankshaft further may include a crankpin between the first journal and the second journal and defining a longitudinal crankpin axis extending substantially parallel to and offset from the longitudinal crankshaft axis. The crankpin may be configured to receive one or more connecting rods and may include a crankpin body extending along the longitudinal crankpin axis and defining a crankpin surface, with the crankpin surface being substantially cylindrical. The crankpin further may include a first ridge at least partially extending circumferentially around the crankpin surface of the crankpin body, and a second ridge longitudinally spaced from the first ridge and at least partially extending circumferentially around the crankpin surface of the crankpin body.

In some embodiments, a connecting rod assembly for a high-power pump may include a first connecting rod having a first elongated rod body defining a first longitudinal rod axis and having a first crank end and a first plunger end opposite the first crank end. The first crank end may include a first crankpin connector configured to be connected to a crankpin, and a second crankpin connector configured to be connected to the crankpin. The first crank end may define a connecting rod clearance between the first crankpin connector and the second crankpin connector and configured to at least partially receive therein a second crank end of a second connecting rod. The first connecting rod further may include a first rod clamp configured to be connected to the first crankpin connector, thereby to rotatably connect the first elongated rod body to the crankpin. The first connecting rod also may include a second rod clamp configured to be connected to the second crankpin connector, thereby to rotatably connect the first elongated rod body to the crankpin. The first connecting rod further may include a first plunger connector at the plunger end of the first elongated rod body and configured to connect a first plunger to the first elongated rod body.

In some embodiments, a hydraulic fracturing pump may include a pump frame and a crankshaft including a first journal configured to be rotatably supported in the frame and a second journal configured to be rotatably supported in the frame. The first journal and the second journal may define therebetween a longitudinal crankshaft axis. The crankshaft further may include a crankpin between the first journal and the second journal and defining a longitudinal crankpin axis extending substantially parallel to and offset from the longitudinal crankshaft axis. The crankpin may include a crankpin body extending along the longitudinal crankpin axis and defining a crankpin surface. The crankpin surface may be substantially cylindrical. The crankpin further may include a first ridge at least partially extending circumferentially around the crankpin surface of the crankpin body, and a second ridge longitudinally spaced from the first ridge and at least partially extending circumferentially around the crankpin surface of the crankpin body. The hydraulic fracturing pump further may include a first connecting rod including a first elongated rod body defining a first longitudinal rod axis and having a first crank end and a first plunger end opposite the first crank end. The first crank end may include a first crankpin connector connected to the crankpin between the first journal and the first ridge, and a second crankpin connector connected to the crankpin between the second ridge and the second journal. The first crank end may define a connecting rod clearance between the first crankpin connector and the second crankpin connector. The first connecting rod further may include a first rod clamp connected to the first crankpin connector, thereby to rotatably connect the first elongated rod body to the crankpin, and a second rod clamp connected to the second crankpin connector, thereby to rotatably connect the first elongated rod body to the crankpin. The first connecting rod also may include a first plunger connector at the plunger end of the first elongated rod body, and the hydraulic fracturing pump further may include a first plunger connected to the first plunger end of the first connecting rod. The hydraulic fracturing pump also may include a second connecting rod including a second elongated rod body defining a second longitudinal rod axis and having a second crank end and a second plunger end opposite the second crank end. The second crank end may include a third crankpin connector connected to the crankpin between the first crankpin connector and the second crankpin connector of the first connecting rod, and the hydraulic fracturing pump further may include a second plunger connected to the second plunger end of the second connecting rod, thereby to increase pumping capacity of the hydraulic fracturing pump without substantially increasing a length of the hydraulic fracturing pump.

In some embodiments, a crankshaft and connecting rod assembly for a high-power pump may include a crankshaft including a first journal configured to be rotatably supported in a first frame section of the high-power pump, and a second journal configured to be rotatably supported in a second frame section of the high-power pump. The first journal and the second journal may define therebetween a longitudinal crankshaft axis. The crankshaft further may include a crankpin between the first journal and the second journal and defining a longitudinal crankpin axis extending substantially parallel to and offset from the longitudinal crankshaft axis. The crankpin may include a crankpin body extending along the longitudinal crankpin axis and defining a crankpin surface. The crankpin surface may be substantially cylindrical. The crankpin also may include a first ridge at least partially extending circumferentially around the crankpin surface of the crankpin body, and a second ridge longitudinally spaced from the first ridge and at least partially extending circumferentially around the crankpin surface of the crankpin body. The crankshaft and connecting rod assembly further may include a first connecting rod including a first elongated rod body defining a first longitudinal rod axis and having a first crank end and a first plunger end opposite the first crank end. The first crank end may include a first crankpin connector connected to the crankpin between the first journal and the first ridge, and a second crankpin connector connected to the crankpin between the second ridge and the second journal. The first crank end may define a connecting rod clearance between the first crankpin connector and the second crankpin connector. The first connecting rod further may include a first rod clamp connected to the first crankpin connector, thereby to rotatably connect the first elongated rod body to the crankpin, and a second rod clamp connected to the second crankpin connector thereby to rotatably connect the first elongated rod body to the crankpin. The first connecting rod also may include a first plunger connector at the plunger end of the first elongated rod body and configured to connect a first plunger to the first elongated rod body. The crankshaft and connecting rod assembly further may include a second connecting rod including a second elongated rod body defining a second longitudinal rod axis and having a second crank end and a second plunger end opposite the second crank end. The second crank end may include a third crankpin connector connected to the crankpin between the first crankpin connector and the second crankpin connector of the first connecting rod, thereby to increase pumping capacity of the high-power pump without substantially increasing a length of the high-power pump.

In some embodiments, a high-power pump may include a pump frame and a crankshaft including a first journal configured to be rotatably supported in the frame and a second journal configured to be rotatably supported in the frame. The first journal and the second journal may define therebetween a longitudinal crankshaft axis. The crankshaft further may include a crankpin between the first journal and the second journal and defining a longitudinal crankpin axis extending substantially parallel to and offset from the longitudinal crankshaft axis. The crankpin may include a crankpin body extending along the longitudinal crankpin axis and defining a crankpin surface. The crankpin surface may be substantially cylindrical. The crankpin further may include a first ridge at least partially extending circumferentially around the crankpin surface of the crankpin body, and a second ridge longitudinally spaced from the first ridge and at least partially extending circumferentially around the crankpin surface of the crankpin body. The high-power pump further may include a first connecting rod including a first elongated rod body defining a first longitudinal rod axis and having a first crank end and a first plunger end opposite the first crank end. The first crank end may include a first crankpin connector connected to the crankpin between the first journal and the first ridge, and a second crankpin connector connected to the crankpin between the second ridge and the second journal. The first crank end may define a connecting rod clearance between the first crankpin connector and the second crankpin connector. The first connecting rod further may include a first rod clamp connected to the first crankpin connector, thereby to rotatably connect the first elongated rod body to the crankpin, and a second rod clamp connected to the second crankpin connector, thereby to rotatably connect the first elongated rod body to the crankpin. The first connecting rod also may include a first plunger connector at the plunger end of the first elongated rod body, and the high-power pump further may include a first plunger connected to the first plunger end of the first connecting rod. The high-power pump also may include a second connecting rod including a second elongated rod body defining a second longitudinal rod axis and having a second crank end and a second plunger end opposite the second crank end. The second crank end may include a third crankpin connector connected to the crankpin between the first crankpin connector and the second crankpin connector of the first connecting rod. The high-power pump further may include a second plunger connected to the second plunger end of the second connecting rod, thereby to increase pumping capacity of the high-power pump without substantially increasing a length of the high-power pump.

In some embodiments, a method for attaching connecting rods to a crankshaft of a hydraulic fracturing pump may include providing a first ridge at least partially extending circumferentially around a crankpin of the crankshaft, and providing a second ridge spaced from the first ridge and at least partially extending circumferentially around the crankpin. The first ridge may at least partially define a first rod receiver portion, the first ridge and the second ridge may at least partially define a second rod receiver portion therebetween, and the second ridge may at least partially define a third rod receiver portion. The method further may include connecting a first connecting rod at the first rod receiver portion and at the third rod receiver portion, and connecting a second connecting rod at the second rod receiver portion. One or more of the first ridge or the second ridge may be positioned to substantially prevent one or more of the first connecting rod or the second connecting rod from moving longitudinally on the crankpin and contacting one another.

In some embodiments, a method of operating a pump to increase pumping capacity during operating of the pump may include supplying power to a pump having a longitudinal pump axis. The method further may include driving via the power a crankpin connected to a first plunger and a second plunger to cause the first plunger and the second plunger to reciprocate and draw-in fluid at a first pressure during an intake stroke and discharge fluid at a second pressure greater than the first pressure during a discharge stroke. The first plunger and the second plunger may be substantially longitudinally aligned relative to the longitudinal pump axis. The method further may include flowing fluid responsive to operating of the pump.

In some embodiments, a method of operating a pump to increase pumping capacity during operating of the pump may include supplying power to a pump having a longitudinal pump axis, and operating the pump via the power so as to pump fluid. The pump may have a first plunger and a second plunger, and each of the first plunger and the second plunger may be configured to draw-in fluid at a first pressure during an intake stroke and discharge fluid at a second pressure greater than the first pressure during a discharge stroke. The first plunger and the second plunger may be substantially longitudinally aligned relative to the longitudinal pump axis. The method further may include flowing fluid responsive to operating of the pump.

In some embodiments, a method of operating a pump to increase pumping capacity during operating of the pump may include supplying power to a pump. The method further may include operating the pump via the power so as to pump fluid via rotation of a crankpin connected to two or more plungers to cause the two or more plungers to reciprocate through a stroke length to draw-in fluid at a first pressure during an intake stroke and discharge fluid during a discharge stroke at a second pressure greater than the first pressure. The two or more plungers may discharge a first volume of fluid per stroke of the two or more plungers that is greater than a second volume of fluid per stroke discharged by another plunger of another pump reciprocating through the stroke length and discharging the first volume per stroke during operation of the another pump. The method also may include flowing fluid responsive to operating of the pump.

In some embodiments, a method of operating a pump to increase pumping capacity during operating of the pump may include supplying power to a pump having a pump length and a pump width defining a pump footprint. The method further may include operating the pump via the power so as to pump fluid via rotation of a crankpin connected to two or more plungers to cause the two or more plungers to reciprocate through a stroke length to draw-in fluid at a first pressure during an intake stroke and discharge fluid during a discharge stroke at a second pressure greater than the first pressure. The two or more plungers may discharge a first volume of fluid per stroke of the two or more plungers that is greater than a second volume of fluid per stroke discharged by another pump having another pump footprint substantially equal to or greater than the footprint of the pump. The method also may include flowing fluid responsive to operating of the pump.

Still other aspects and advantages of these exemplary embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to more clearly illustrate embodiments of the disclosure.

DETAILED DESCRIPTION

Figure 1:
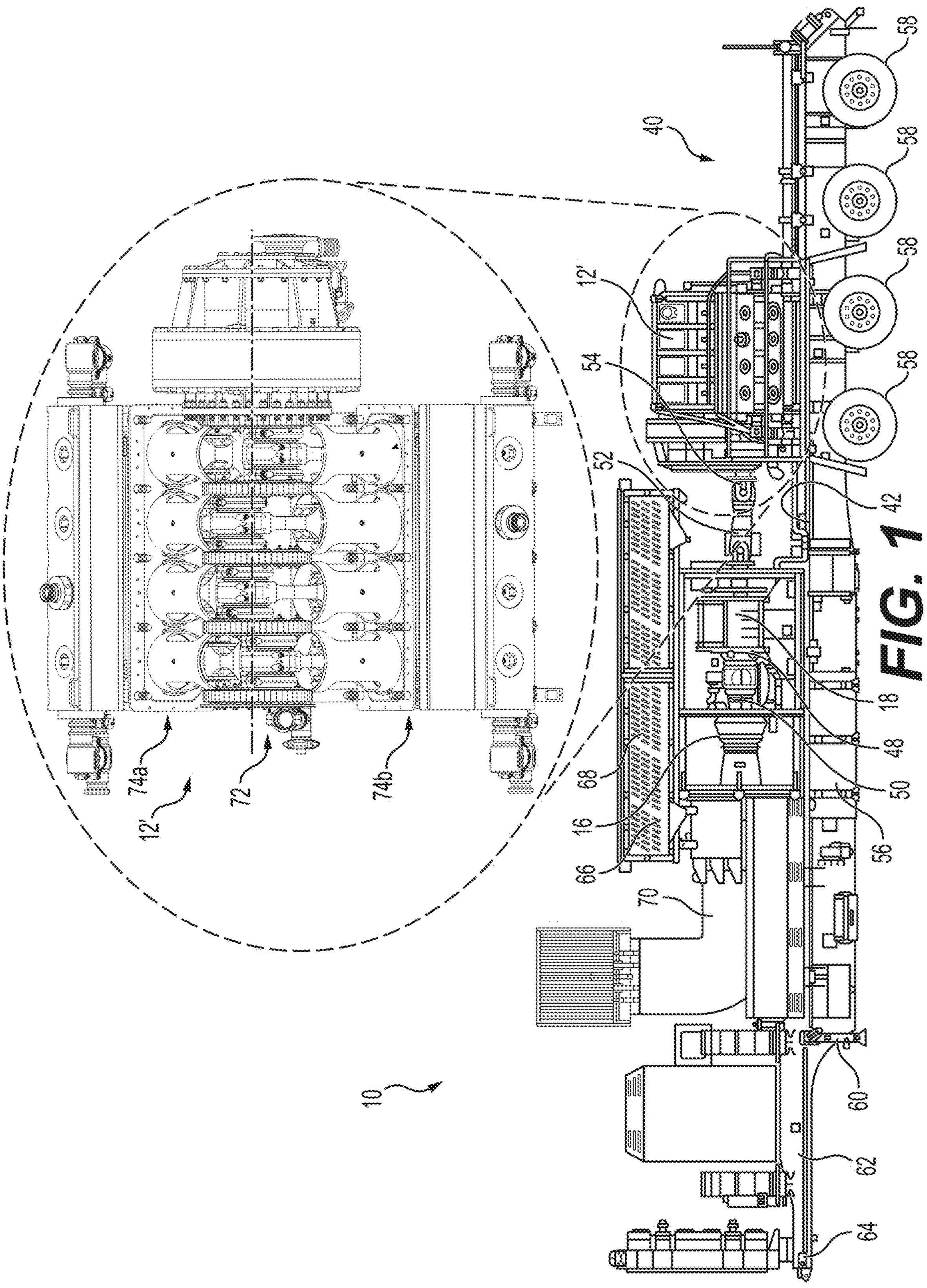
FIG. 1 is a schematic side view of an example hydraulic fracturing unit including an example hydraulic fracturing pump, according to embodiments of the disclosure.

The drawings include like numerals to indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described may be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term “plurality” refers to two or more items or components. The terms “comprising,” “including,” “carrying,” “having,” “containing,” and “involving,” whether in the written description or the claims and the like, are open-ended terms, i.e., to mean “including but not limited to,” unless otherwise stated. Thus, the use of such terms is meant to encompass the items listed thereafter, and equivalents thereof, as well as additional items. The transitional phrases “consisting of” and “consisting essentially of,” are closed or semi-closed transitional phrases, respectively, with respect to any claims. Use of ordinal terms such as “first,” “second,” “third,” and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements. Additionally, it will be understood that the term “wherein” may be used interchangeably with “where.”

The term “coupled” is defined as connected, although not necessarily directly, and not necessarily mechanically; two items that are “coupled” may be unitary with each other. The terms “a” and “an” are defined as one or more unless this disclosure explicitly requires otherwise. The term “substantially” is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term “substantially” may be substituted with “within [a percentage] of” what is specified, where the percentage includes 0.1, 1, 5, and 10 percent; and the term “approximately” may be substituted with “within 10 percent of” what is specified. The phrase “and/or” means “and” or “or.” To illustrate, A, B, and/or C includes: A alone, B alone, C alone, a combination of A and B, a combination of A and C, a combination of B and C, or a combination of A, B, and C. In other words, “and/or” operates as an inclusive or. The phrase “A, B, C, or a combination thereof” includes A alone, B alone, C alone, a combination of A and B, a combination of A and C, a combination of B and C, or a combination of A, B, and C. In other words, “or” is used inclusively unless otherwise is expressly specified.

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Some details associated with the aspects are described above, and others are described below. Other implementations, advantages, and features of the present disclosure will become apparent after review of the entire application, including the following sections: Brief Description of the Drawings, Detailed Description, and the Claims.

Figure 2:
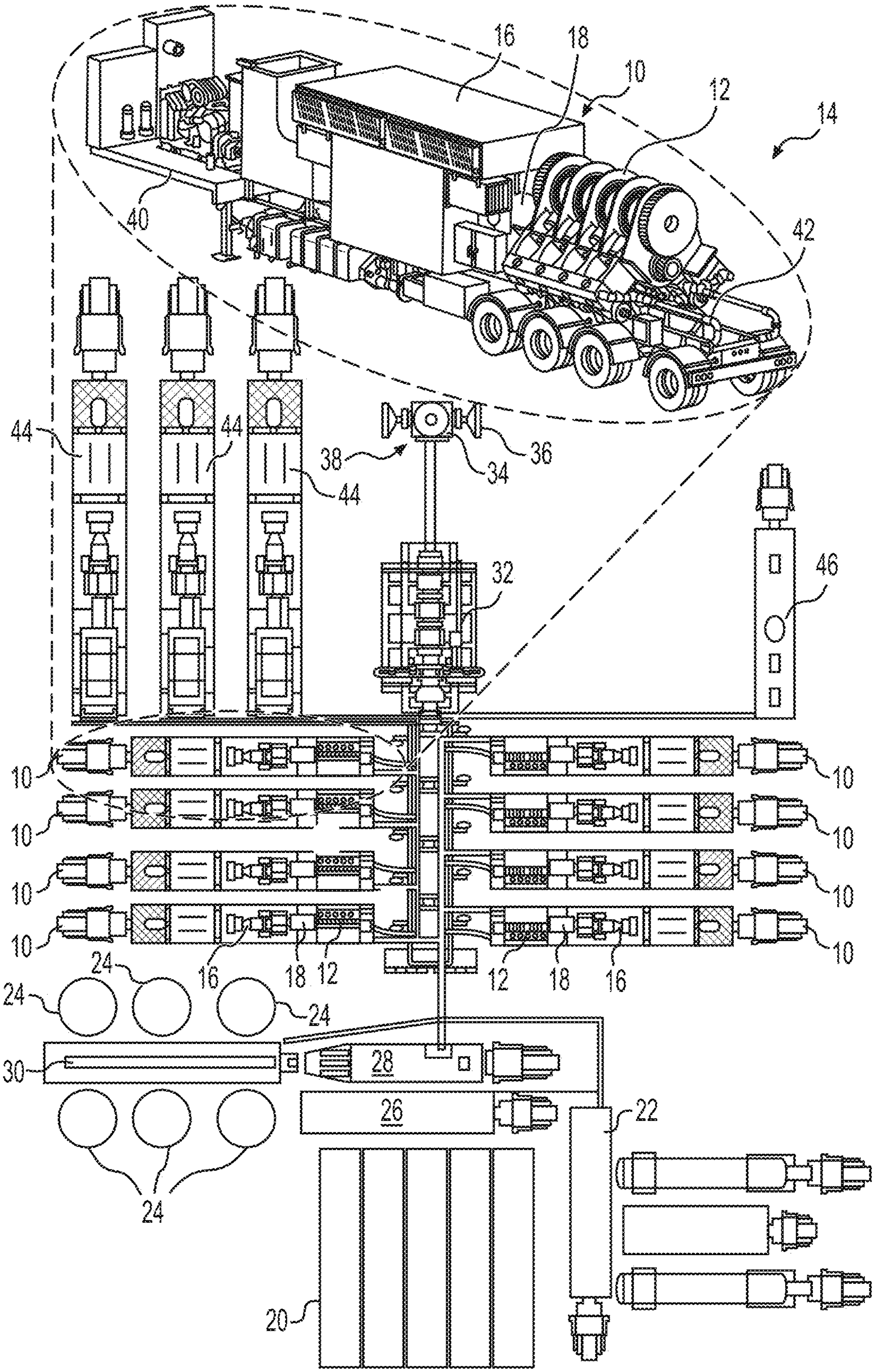
FIG. 2 schematically illustrates an example hydraulic fracturing system including a plurality of hydraulic fracturing units, according to embodiments of the disclosure.

FIG. 1 is a schematic side view of an example hydraulic fracturing unit 10 including an example pump 12 (or 12'), according to embodiments of the disclosure, and FIG. 2 schematically illustrates an example hydraulic fracturing system 14 including a plurality of hydraulic fracturing units 10, according to embodiments of the disclosure. The pump 12 (or 12') may be any high-power pump, high-pressure pump, reciprocating pump, and/or high-flow rate pump suitable for pumping solids, semi-solids, slurries, liquids, fluids, or combinations thereof. In some embodiments, the pump 12 (or 12') may be, for example, a hydraulic fracturing pump for pumping hydraulic fracturing fluid. In some embodiments, the pump 12 (or 12') may be capable of providing a relatively higher pumping capacity while still having physical dimensions enabling transportation of the hydraulic fracturing unit 10 including the hydraulic fracturing pump 12 (or 12') on public highways, as explained in more detail herein. Alternatively, or in addition, some embodiments of the pump 12 (or 12') may operate with relatively lower shock magnitude and/or or vibration magnitude resulting from, for example, torque pulses generated by operation of the pump 12 (or 12'). Although embodiments of the pump 12 (or 12') are described herein as being a “hydraulic fracturing pump” for pumping hydraulic fracturing fluid for the purpose of discussion, the pump 12 (or 12') may be any other type of pump, such as, for example, any type of high-power pump, high-pressure pump, reciprocating pump, and/or high-flow rate pump suitable for pumping solids, semi-solids, slurries, liquids, fluids, or combinations thereof. In some embodiments, the pump 12 (or 12') may be, for example, a hydraulic fracturing pump for pumping solids, semi-solids, slurries, liquids, fluids, or combinations thereof, such as hydraulic fracturing fluid.

As shown in FIGS. 1 and 2, in some embodiments, one or more of the hydraulic fracturing units 10 may include a hydraulic fracturing pump 12 (or 12') driven by a prime mover 16, such as an internal combustion engine. For example, the prime movers 16 may include gas turbine engines (GTEs) or reciprocating-piston engines. In some embodiments, each of the hydraulic fracturing units 10 may include a directly-driven turbine (DDT) hydraulic fracturing pump 12 (or 12'), in which the hydraulic fracturing pump 12 is connected to one or more GTEs that supply power to the respective hydraulic fracturing pump 12 (or 12') for supplying fracturing fluid at high pressure and high flow rates to a formation. For example, the GTE may be connected to a respective hydraulic fracturing pump 12 (or 12') via a transmission 18 (e.g., a reduction gearbox) connected to a drive shaft, which, in turn, is connected to a driveshaft or input flange of a respective hydraulic fracturing pump 12 (or 12'), which may be a reciprocating hydraulic fracturing pump. Other types of engine-to-pump arrangements are contemplated as will be understood by those skilled in the art.

In some embodiments, one or more of the GTEs may be a dual-fuel or bi-fuel GTE, for example, capable of being operated using of two or more different types of fuel, such as natural gas and diesel fuel, although other types of fuel are contemplated. For example, a dual-fuel or bi-fuel GTE may be capable of being operated using a first type of fuel, a second type of fuel, and/or a combination of the first type of fuel and the second type of fuel. For example, the fuel may include gaseous fuels, such as, for example, compressed natural gas (CNG), natural gas, field gas, pipeline gas, methane, propane, butane, and/or liquid fuels, such as, for example, diesel fuel (e.g., #2 diesel), bio-diesel fuel, bio-fuel, alcohol, gasoline, gasohol, aviation fuel, and other fuels as will be understood by those skilled in the art. Gaseous fuels may be supplied by CNG bulk vessels, a gas compressor, a liquid natural gas vaporizer, line gas, and/or well-gas produced natural gas. Other types and associated fuel supply sources are contemplated. The one or more prime movers 16 may be operated to provide horsepower to drive the transmission 18 connected to one or more of the hydraulic fracturing pumps 12 to safely and successfully fracture a formation during a well stimulation project or fracturing operation.

In some embodiments, the prime mover 16 may include one or more electric motors. The electric motor may be rated for over 2,000 hp over 5,000 hp, or over 10,000 hp, for example, for the hydraulic fracturing pump 12 to generate a desired pressure and flow rate. The electric motor may include a stator having stator windings for generating a rotating magnetic field at a synchronous speed corresponding to a frequency of a voltage applied to the stator windings. The motor may also include a rotor having rotor windings for interacting with the rotating magnetic field to rotate the rotor. The rotor windings may be configured to generate rotating magnetic poles for interacting with the rotating magnetic field. In one or more embodiments, the electric motor may be an induction electric motor in which the rotating magnetic poles in the rotor are induced by the rotating magnetic field in the stator. In one or more embodiments, the electric motor may be a multi-phase electric motor, such as a three-phase motor, for example.

The electric motor may include a single shaft electric motor or a dual shaft electric motor. In some embodiments, the electric motor and two or more hydraulic fracturing pump 12 may be disposed on a single chassis. For example, the electric a motor may be disposed on a single chassis and arranged between two hydraulic fracturing pumps 12, for example, in manner similar to the pump arrangements described in U.S. Pat. No. 9,395,049, the disclosure of which is incorporated by reference herein in its entirety. In some embodiments, two or more electric motors and two or more hydraulic fracturing pumps 12 may be disposed on a single chassis. For example, a first electric motor may be connected to or otherwise mechanically linked with a first hydraulic fracturing pump 12 and a second electric motor may be connected to or otherwise mechanically linked with a second hydraulic fracturing pump 12, and each of the first and second electric motor and the first and second hydraulic fracturing pump 12 may be disposed on a single chassis and may be arranged in a manner similar to the pump arrangements described in U.S. Pat. No. 11,118,438, the disclosure of which is incorporated by reference herein in its entirety. For example, each electric motor and corresponding hydraulic fracturing pump 12 may be contained as a single module, and a plurality of such modules may be disposed on a single chassis.

In some embodiments, the electric motor may be supplied with a voltage having a fixed frequency or a voltage having a variable frequency. For example, a voltage with a fixed frequency may be applied to a stator of the electric motor and hence the electric motor may be referred to as a "fixed-frequency motor." Electric power to a motor control center may be supplied by an on-site power source, such as on-site diesel generators, natural gas reciprocating engine generators, or turbine generators, or by an off-site power source, such as a utility grid power. In some embodiments, the motor control center may be disposed with the electric motor and the hydraulic fracturing pump 12 on a single chassis. In some embodiments, a voltage with a variable frequency may be applied to a stator of the electric motor. In some such embodiments, a remotely controllable variable frequency drive (VFD) may be disposed, along with the electric motor(s) and the hydraulic fracturing pump(s) 12, on a single chassis. The VFD may be coupled to or otherwise electrically linked with a power source, for example, as described herein. The VFD may be configured to provide electric power to the one or more electric motors.

In some embodiments, a plurality of electric motors may be connected to or otherwise mechanically linked with a single hydraulic fracturing pump 12. For example, the plurality of electric motors may each be connected to a crankshaft of the hydraulic fracturing pump 12. The plurality of electric motors may include any suitable number of electric motors (e.g., from two electric motors to seven or more electric motors). In some embodiments, at least five electric motors may be coupled to the crankshaft in a manner, such that each electric motor may be positioned about the pump crankshaft axis, so that an output shaft of each electric motor is spaced apart from a longitudinal rotation axis of the crankshaft. For example, the plurality of electric motors may be arranged on or connected to the hydraulic fracturing pump 12 in a manner similar to the electric motor arrangement(s) described in U.S. Publication No. US 2021/0095648 A1, the disclosure of which is incorporated by reference herein in its entirety.

In some embodiments, the fracturing fluid may include, for example, water, proppants, and/or other additives, such as thickening agents and/or gels. For example, proppants may include grains of sand, ceramic beads or spheres, shells, and/or other particulates, and may be added to the fracturing fluid, along with gelling agents to create a slurry, as will be understood by those skilled in the art. The slurry may be forced via the hydraulic fracturing pumps 12 into the formation at rates faster than may be accepted by the existing pores, fractures, faults, or other spaces within the formation. As a result, pressure in the formation may build rapidly to the point where the formation fails and begins to fracture. By continuing to pump the fracturing fluid into the formation, existing fractures in the formation may be caused to expand and extend in directions away from a well bore, thereby creating additional flow paths for hydrocarbons to flow to the well. The proppants may serve to prevent the expanded fractures from closing or may reduce the extent to which the expanded fractures contract when pumping of the fracturing fluid is ceased. Once the well is fractured, large quantities of the injected fracturing fluid may be allowed to flow out of the well, and the water and any proppants not remaining in the expanded fractures may be separated from hydrocarbons produced by the well to protect downstream equipment from damage and corrosion. In some instances, the production stream of hydrocarbons may be processed to neutralize corrosive agents in the production stream resulting from the fracturing process.

In some embodiments, as shown in FIG. 2, the hydraulic fracturing system 14 may include one or more water tanks 20 for supplying water for fracturing fluid, one or more chemical additive units 22 for supplying gels or agents for adding to the fracturing fluid, and/or one or more proppant tanks 24 (e.g., sand tanks) for supplying proppants for the fracturing fluid. The example hydraulic fracturing system 14 shown also includes a hydration unit 26 for mixing water from the water tanks 20 and gels and/or agents from the chemical additive units 22 to form a mixture, for example, gelled water. The example shown also includes a blender 28, which receives the mixture from the hydration unit 26 and proppants via conveyers 30 from the proppant tanks 24. The blender 28 may mix the mixture and the proppants into a slurry to serve as fracturing fluid for the hydraulic fracturing system 14. Once combined, the slurry may be discharged through low-pressure hoses, which convey the slurry into two or more low-pressure lines in a fracturing manifold 32. In the example shown, the low-pressure lines in the fracturing manifold 32 may feed the slurry to the hydraulic fracturing pumps 12 through low-pressure suction hoses, as will be understood by those skilled in the art.

The hydraulic fracturing pumps 12, driven by the respective internal GTEs 16, discharge the slurry (e.g., the fracturing fluid including the water, agents, gels, and/or proppants) at high flow rates and/or high pressures through individual high-pressure discharge lines into two or more high-pressure flow lines, sometimes referred to as "missiles," on the fracturing manifold 32. The flow from the high-pressure flow lines is combined at the fracturing manifold 32, and one or more of the high-pressure flow lines provide fluid flow to a manifold assembly 34, sometimes referred to as a "goat head." The manifold assembly 34 delivers the slurry into a wellhead manifold 36. The wellhead manifold 36 may be configured to selectively divert the slurry to, for example, one or more wellheads 38 via operation of one or more valves. Once the fracturing process is ceased or completed, flow returning from the fractured formation discharges into a flowback manifold, and the returned flow may be collected in one or more flowback tanks as will be understood by those skilled in the art.

As schematically depicted in FIG. 2, one or more of the components of the hydraulic fracturing system 14 may be configured to be portable, so that the hydraulic fracturing system 14 may be transported to a well site, quickly assembled, operated for a relatively short period of time, at least partially disassembled, and transported to another location of another well site for use. For example, the components may be connected to and/or supported on a chassis 40, for example, a trailer and/or a support incorporated into a truck, so that they may be easily transported between well sites. In some embodiments, the prime mover 16, the transmission 18, and/or the hydraulic fracturing pump 12 may be connected to the chassis 40. For example, the chassis 40 may include a platform 42, and the transmission 18 may be connected to the platform 42, and the prime mover 16 may be connected to the transmission 18. In some embodiments, the prime mover 16 may be connected to the transmission 18 without also connecting the prime mover 16 directly to the platform 42, which may result in fewer support structures being needed for supporting the prime mover 16, transmission 18, and/or hydraulic fracturing pump 12 on the chassis 40.

In some embodiments, two or more hydraulic fracturing pumps 12 may be connected to the chassis 40. For example, the chassis 40 may include the prime mover 16 disposed or situated between two hydraulic fracturing pumps 12. In such examples, the prime mover 16 may be a dual-shaft electric motor, and each output shaft of the motor is connected to one of the hydraulic fracturing pumps 12. In some embodiments, the chassis 40 may include a plurality of prime movers 16 and hydraulic fracturing pumps 12. For example, the chassis 40 may include a first prime mover 16 mechanically linked to a first hydraulic fracturing pump 12 and a second prime mover 16 mechanically linked to a second hydraulic fracturing pump 12.

As shown in FIG. 2, some embodiments of the hydraulic fracturing system 14 may include one or more fuel supplies 44 for supplying the prime movers 16 and any other fuel-powered components of the hydraulic fracturing system 14, such as auxiliary equipment, with fuel. The fuel supplies 44 may include gaseous fuels, such as compressed natural gas (CNG), natural gas, field gas, pipeline gas, methane, propane, butane, and/or liquid fuels, such as, for example, diesel fuel (e.g., #2 diesel), bio-diesel fuel, bio-fuel, alcohol, gasoline, gasohol, aviation fuel, and other fuels, as will be understood by those skilled in the art. Gaseous fuels may be supplied by CNG bulk vessels, such as fuel tanks coupled to trucks, a gas compressor, a liquid natural gas vaporizer, line gas, and/or well-gas produced natural gas. The fuel may be supplied to the hydraulic fracturing unit 10 by one of more fuel lines supplying the fuel to a fuel manifold and unit fuel lines between the fuel manifold and the hydraulic fracturing units 10. Other types and associated fuel supply sources and arrangements are contemplated as will be understood by those skilled in the art.

As shown in FIG. 2, some embodiments also may include one or more data centers 46 configured to facilitate receipt and transmission of data communications related to operation of one or more of the components of the hydraulic fracturing system 14. Such data communications may be received and/or transmitted via hard-wired communications cables and/or wireless communications, for example, according to known communications protocols. For example, the data centers 46 may contain at least some components of a hydraulic fracturing control assembly, such as a supervisory controller configured to receive signals from components of the hydraulic fracturing system 14 and/or communicate control signals to components of the hydraulic fracturing system 14, for example, to at least partially control operation of one or more components of the hydraulic fracturing system 14, such as, for example, the prime movers 16, the transmissions 18, and/or the hydraulic fracturing pumps 12 of the hydraulic fracturing units 10, the chemical additive units 22, the hydration units 26, the blender 28, the conveyers 30, the fracturing manifold 32, the manifold assembly 34, the wellhead manifold 36, and/or any associated valves, pumps, and/or other components of the hydraulic fracturing system 14.

Figure 3A:
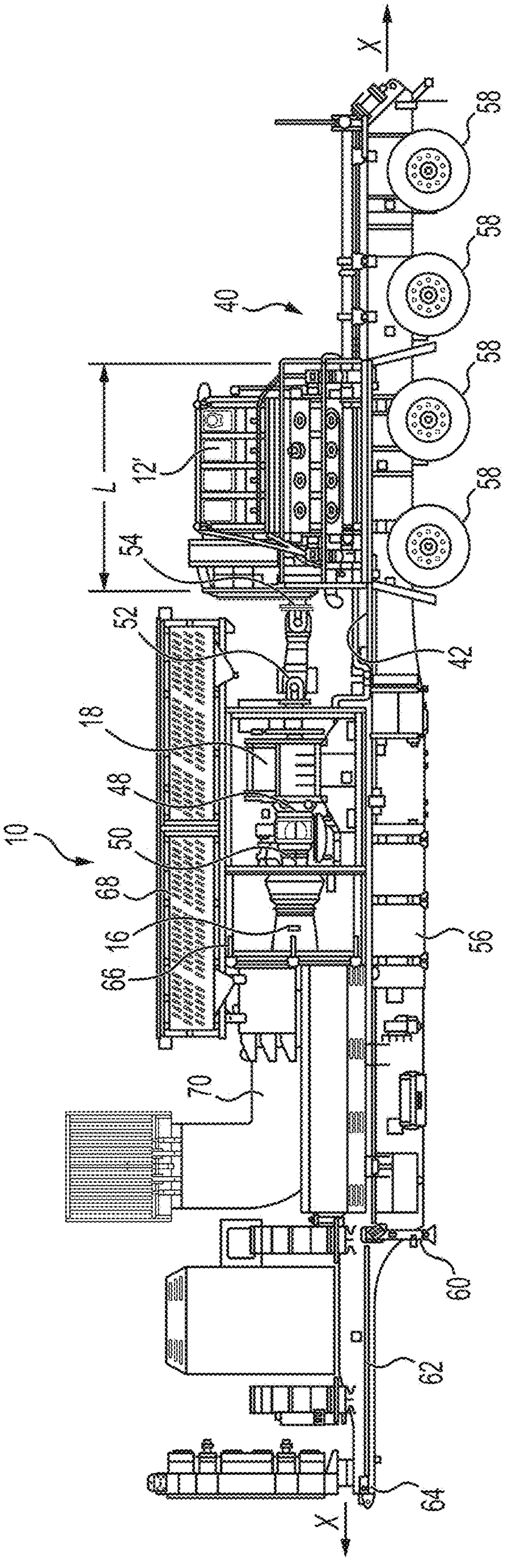
FIG. 3A is a schematic side view of an example hydraulic fracturing unit, according to embodiments of the disclosure.
Figure 3B:
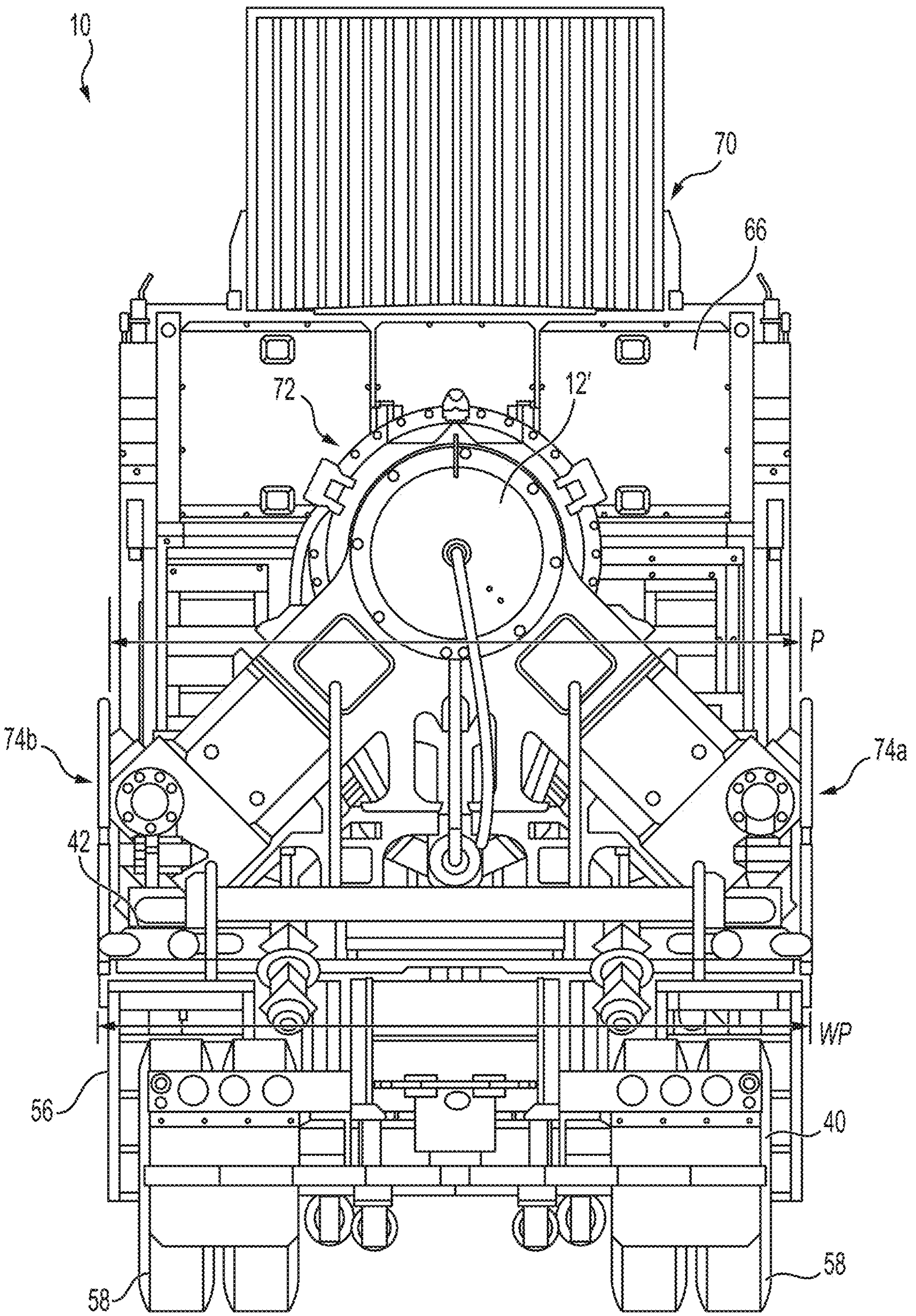
FIG. 3B is a schematic end view of the example hydraulic fracturing unit shown in FIG. 3A, according to embodiments of the disclosure.

FIG. 3A is a schematic side view of an example hydraulic fracturing unit 10, according to embodiments of the disclosure, and FIG. 3B is a schematic end view of the example hydraulic fracturing unit 10 shown in FIG. 3A, according to embodiments of the disclosure. As shown in FIG. 3A, in some embodiments, the transmission 18 may include a transmission input shaft 48 connected to a prime mover output shaft 50 (e.g., a turbine output shaft), such that the transmission input shaft 48 rotates at the same rotational speed as the prime mover output shaft 50. The transmission 18 may also include a transmission output shaft 52 positioned to be driven by the transmission input shaft 48 at a different rotational speed than the transmission input shaft 48. In some embodiments, the transmission 18 may be a reduction transmission, such as a reduction gearbox, which results in the transmission output shaft 52 having a relatively slower rotational speed than the transmission input shaft 48. The transmission 18 may include a continuously variable transmission, an automatic transmission including one or more planetary gear trains, for example, as described herein, a transmission shiftable between different ratios of input-to-output, etc., or any other suitable of types of transmissions, as will be understood by those skilled in the art.

As shown in FIG. 3A, in some embodiments, the hydraulic fracturing pump 12 (or 12') may be, for example, a reciprocating fluid pump, as explained herein. In some embodiments, the hydraulic fracturing pump 12 may include a pump drive shaft 54 connected to the transmission output shaft 52, such that the transmission output shaft 52 drives the pump drive shaft 54 at a desired rotational speed. For example, the transmission output shaft 52 may include an output shaft connection flange, and the pump drive shaft 54 may include a drive shaft connection flange, and the output shaft connection flange and the drive shaft connection flange may be coupled to one another, for example, directly connected to one another. In some embodiments, the transmission output shaft 52 and the pump drive shaft 54 may be connected to one another via any known coupling types as will be understood by those skilled in the art (e.g., such as a universal joint and/or a torsional coupling).

As shown in FIG. 3A, in some embodiments, the chassis 40 may be or include a trailer 56 including the platform 42 for supporting components of the hydraulic fracturing unit 10, one or more pairs of wheels 58 facilitating movement of the trailer 56, a pair of retractable supports 60 to support the hydraulic fracturing unit 10 during use, and a tongue 62 including a coupler 64 for connecting the trailer 56 to a truck for transport of the hydraulic fracturing unit 10 between well sites to be incorporated into a hydraulic fracturing system 14 of a well site fracturing operation, as will be understood by those skilled in the art.

As shown in FIGS. 1, 2, 3A, and 3B, some embodiments of the hydraulic fracturing unit 10 may include an enclosure 66 connected to and supported by the chassis 40 according to embodiments of the disclosure. In some embodiments, as shown in FIGS. 1 and 3A, the prime mover 16 may be connected to the transmission 18 via the prime mover output shaft 50 and the transmission input shaft 48, both of which may be substantially contained within the enclosure 66 (shown without doors or side panels to provide a view of the interior of the enclosure 66). The prime mover 16 may include an air intake duct 68 and a turbine exhaust duct 70 (e.g., when the prime mover is a GTE) passing through walls of the enclosure 66 and connected to the prime mover 16. The prime mover 16 may be connected to the hydraulic fracturing pump 12 (or 12') via the transmission 18, with the transmission output shaft 52 connected to the pump drive shaft 54, for example, as explained herein.

As shown in FIGS. 1, 3A, and 3B, some embodiments of the hydraulic fracturing pump 12 (or 12') may have physical dimensions configured such that the hydraulic fracturing pump 12 does not exceed the space available on the platform 42, for example, while still providing a desired pressure output and/or flow output to assist with performing the fracturing operation as explained herein. For example, referring to FIG. 3A, the hydraulic fracturing pump 12 may have a pump length dimension L substantially parallel to a longitudinal axis X of the platform 42 that facilitates placement and/or connection of the hydraulic fracturing pump 12 on the platform 42, for example, without causing the hydraulic fracturing unit 10 to exceed a length permitted for transportation on public highways, for example, in compliance with government regulations. The pump length dimension L the hydraulic fracturing pump 12 may be greater than 1 meter (m). In some embodiments, the pump length dimension L may be from about 0.5 m to about 3 m, from about 0.75 m to about 2.5 m, or from about 1 m to about 2 m.

In some embodiments, for example, as shown in FIG. 3B, the hydraulic fracturing pump 12 may have a pump width dimension W substantially perpendicular to a longitudinal axis X of the platform 42 that facilitates placement and/or connection of the hydraulic fracturing pump 12 on the platform 42, for example, without causing the hydraulic fracturing unit 10 to exceed a width permitted for transportation on public highways, for example, in compliance with government regulations. For example, the hydraulic fracturing pump 12 may have a pump width W perpendicular to the longitudinal axis X of the platform, such that the pump width W is less than or equal to the width of the platform WP, for example, as shown in FIG. 3B. In some embodiments, the pump width W may be at least 50%, at least 75%, or at least 90% of the width of the platform WP. For example, a ratio of the pump width W to the width of the platform WP, expressed as W:WP, may be from about 0.8:1, about 0.9:1, about 0.93:1, or about 0.95:1 to about 0.98:1, about 1:1, about 1.05:1, or about 1.1 to 1. As shown in FIG. 3B, in some embodiments, as viewed from the rear of the platform 42 and in a direction substantially parallel to the longitudinal axis X of the platform 42, an end of the hydraulic fracturing pump 12 may take on the appearance of an inverted V, as explained in more detail herein.

Figure 4A:
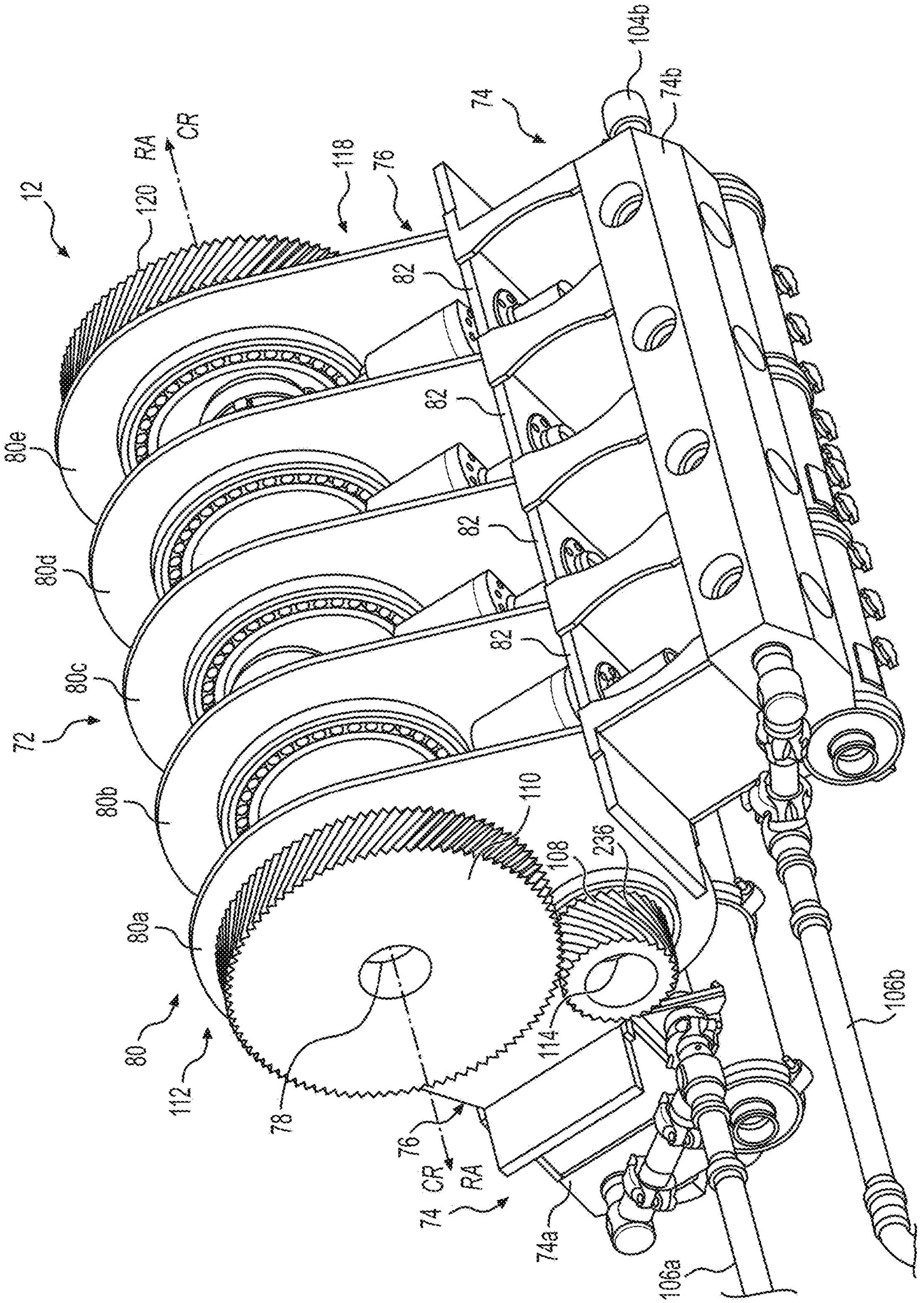
FIG. 4A is a schematic perspective view of an example hydraulic fracturing pump, according to embodiments of the disclosure.

FIG. 4A is a schematic perspective view of an example hydraulic fracturing pump 12, according to embodiments of the disclosure. As shown in FIG. 3A, in some embodiments, the hydraulic fracturing pump 12 may include a single power end 72 and respective first and second fluid ends **74*a* and 74*b* connected to the single power end 72. For example, the single power end 72 may include a pump frame 76, the crankshaft 78, and/or the plungers 84 and/or 88. The first fluid end 74*a* and the second fluid end 74*b* may each be connected to the pump frame 76, for example, on opposite lateral sides of the hydraulic fracturing pump 12. In some embodiments, for example, as shown in FIGS. 3A, 3B, and 4A, the first and second fluid ends 74*a* and 74*b* may be connected to the hydraulic fracturing pump 12, and the hydraulic fracturing pump 12 may be connected to the platform 42, such that the first and second fluid ends 74*a* and 74*b* are closer to the platform 42 than the power end 72. For example, the first and second fluid ends 74*a* and 74*b* may be relatively closer to the ground than if the hydraulic fracturing pump 12 was oriented such that the first and second fluid ends 74*a* and 74*b* were farther away from the platform 42 than the power end 72. The example orientation shown may render the fluid ends 74***a* and 74*b* relatively more easily accessible to operators and/or maintenance service personal, for example, during set-up of the hydraulic fracturing unit 10 for a fracturing operation, take-down of the hydraulic fracturing unit 10, for example, once a fracturing operation is completed, and/or during maintenance or service of the hydraulic fracturing unit 10.

Figure 4B:
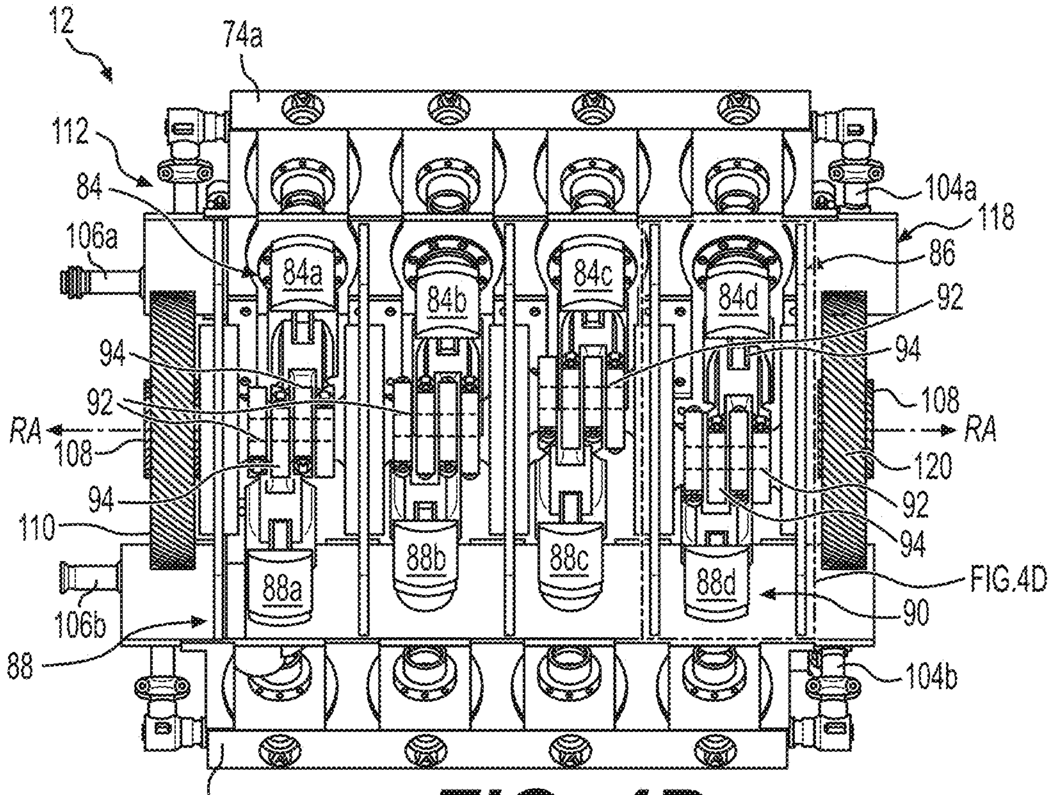
FIG. 4B is a schematic top view of the example hydraulic fracturing pump shown in FIG. 4A, according to embodiments of the disclosure.
Figure 4C:
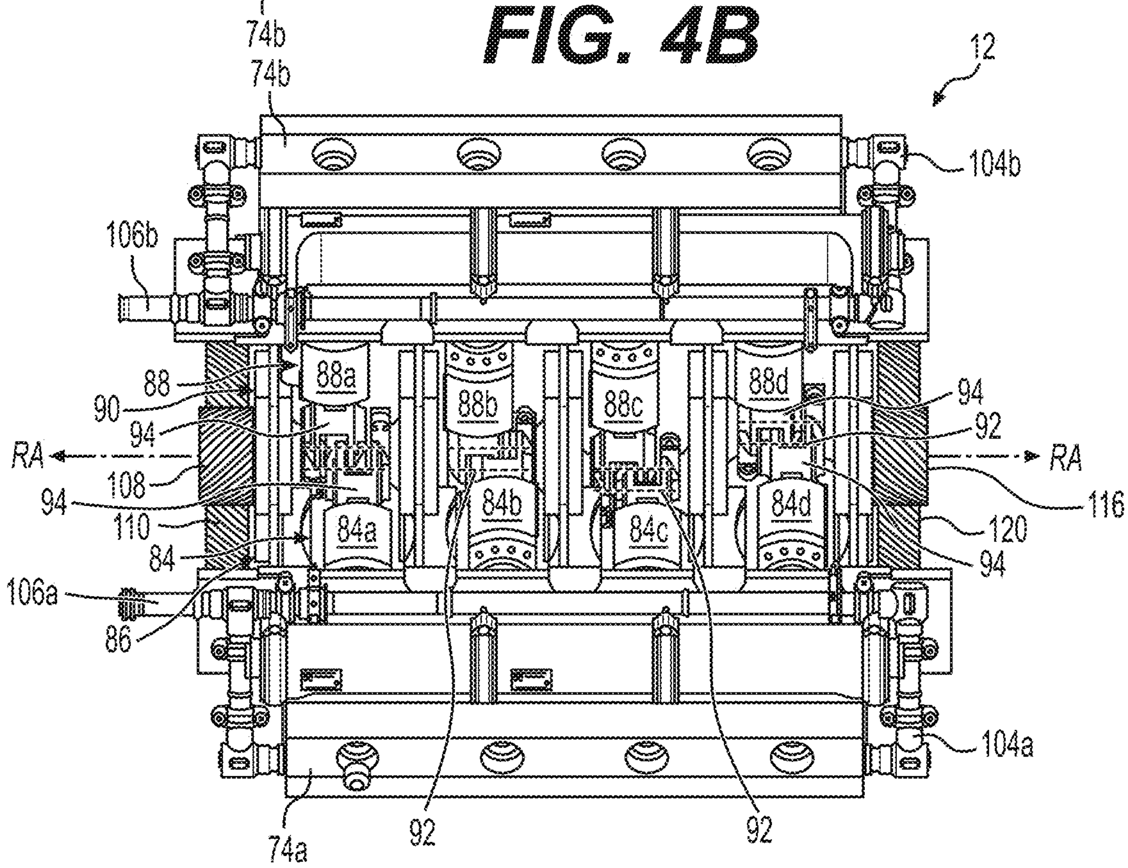
FIG. 4C is a schematic bottom view of the example hydraulic fracturing pump shown in FIG. 4A, according to embodiments of the disclosure.
Figure 4D:
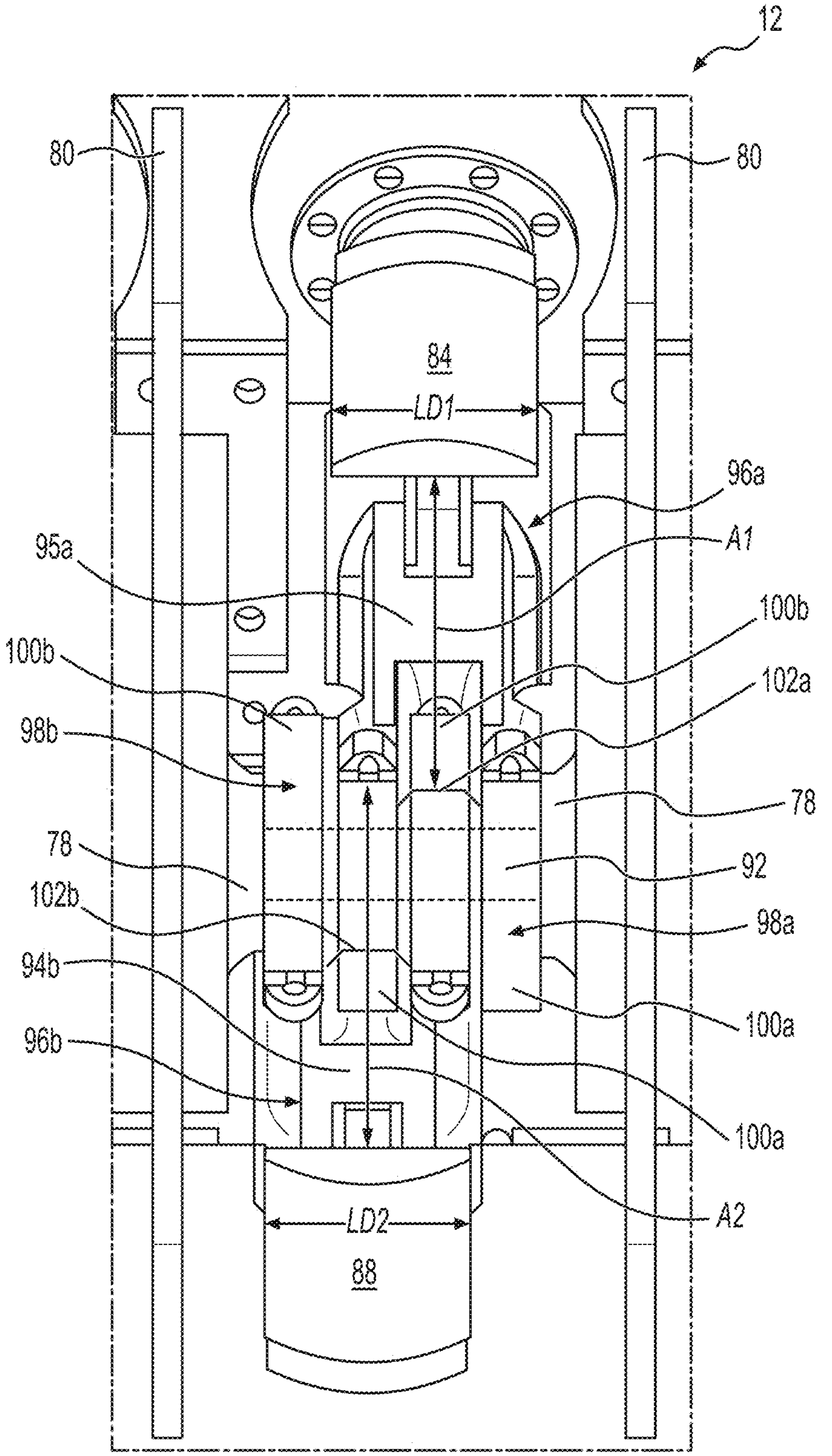
FIG. 4D is a schematic detailed view of a portion of an example crankshaft and connecting rod assembly for an example hydraulic fracturing pump, according to embodiments of the disclosure.
Figure 4E:
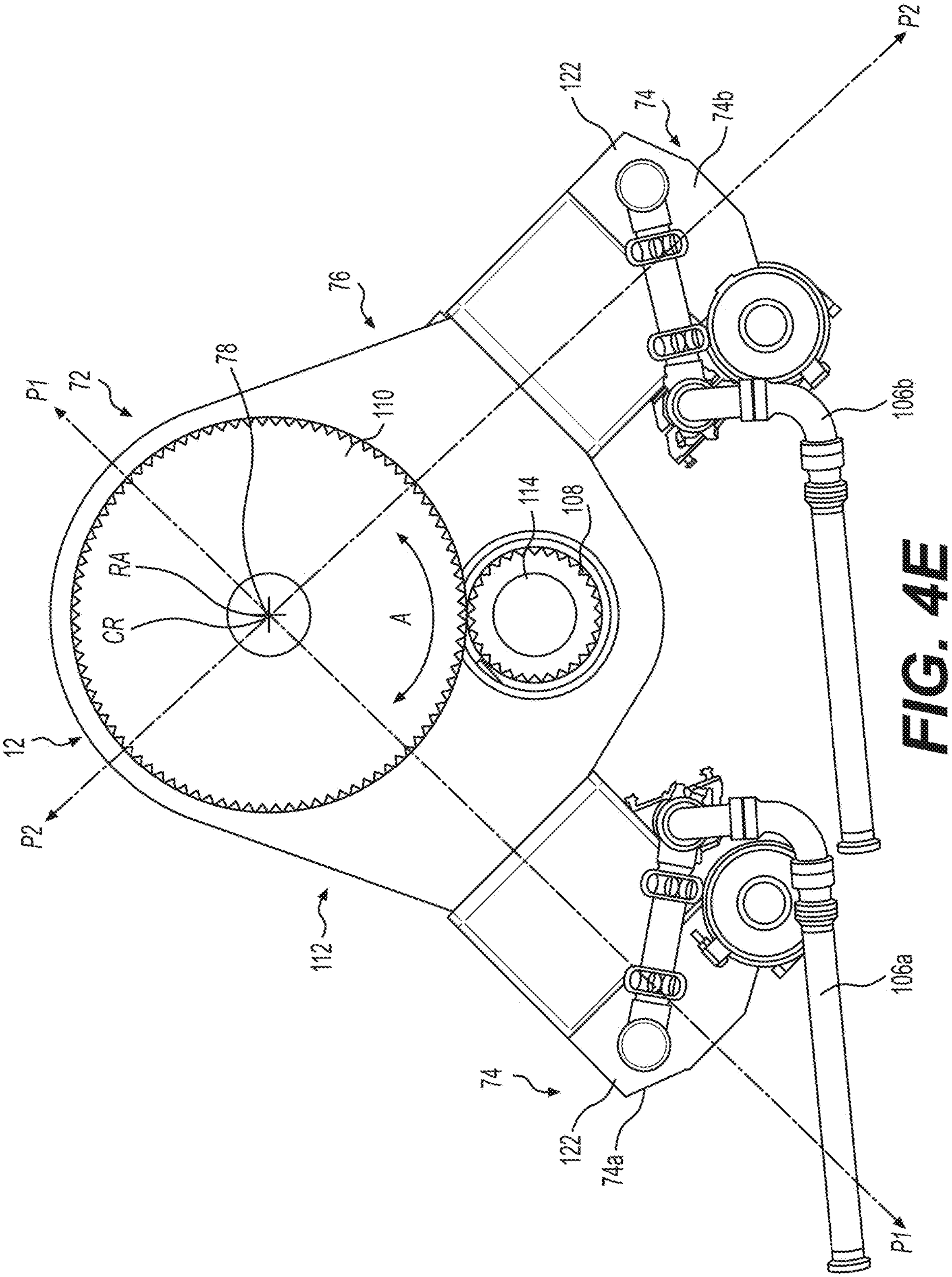
FIG. 4E is a schematic end view of the example hydraulic fracturing pump shown in FIG. 4A, according to embodiments of the disclosure.

FIG. 4B is a schematic top view of the example hydraulic fracturing pump 12 shown in FIG. 4A, and FIG. 4C is a schematic bottom view of the example hydraulic fracturing pump 12 shown in FIG. 4A and FIG. 4B, according to embodiments of the disclosure. FIG. 4D is a schematic detailed view of a portion of an example crankshaft and connecting rod assembly 150 for the example hydraulic fracturing pump 12 shown in FIG. 4A, according to embodiments of the disclosure. FIG. 4E is a schematic end view of the example hydraulic fracturing pump 12 shown in FIG. 4A, according to embodiments of the disclosure.

As shown in FIGS. 4A, 4B, 4C, 4D, and 4E, in some embodiments, the hydraulic fracturing pump 12 may include the pump frame 76, which may at least partially define a shaft aperture, and a crankshaft 78 extending through the shaft aperture. In some embodiments, the pump frame 76 may include a plurality of pump frame sections 80, and each of the pump frame sections 80 may at least partially define the shaft aperture(s). For example, as shown in FIG. 4A, the example pump frame 76 includes five pump frame sections 80*a*, 80*b*, 80*c*, 80*d*, and 80*e*. Pump frames 76 having different numbers of pump frame sections 80 are contemplated. For example, the hydraulic fracturing pump 12 may include the pump frame 76, which may include any suitable number of pump frame sections 80. In some embodiments, the hydraulic fracturing pump 12 may include from two, three, or four to five, six, eight, ten, or twelve pump frame sections 80. As shown in FIG. 4E, one or more of the pump frame sections 80 may have an inverted V-shaped cross-section as viewed in a direction substantially parallel to a longitudinal axis of the crankshaft CR. In some embodiments, one or more of the pump frame sections 80 may have an upright V-shaped cross-section as viewed in a direction substantially parallel to a longitudinal axis of the crankshaft CR. In some embodiments, one or more of the pump frame sections 80 may be connected to one another to form the pump frame 76, for example, via frame connectors 82 and/or the first and second fluid ends 74*a* and 74*b*. Though first and second fluid ends 74*a* and 74*b* are shown, the hydraulic fracturing pump 12 may include three or more fluid ends. In some embodiments, the fracturing pump 12 may include at least three fluid ends and at least three corresponding banks of plungers. For example, one or more pump frame sections 80 may have an inverted Y-shaped cross-section as viewed in a direction substantially parallel to a longitudinal axis of the crankshaft CR, wherein the third fluid end is disposed above the crankshaft 78. In other embodiments, the fracturing pump 12 may include four fluid ends and four corresponding banks of plungers. For example, one or more pump frame sections may have an X-shaped cross-section as viewed in a direction substantially parallel to a longitudinal axis of the crankshaft CR, wherein the third fluid end is disposed above the first fluid end 74*a*, and the fourth fluid end is disposed above the second fluid end 74*b*.

As shown in FIGS. 4A, 4B, 4C, 4D, and 4E, in some embodiments, the hydraulic fracturing pump 12 may include a plurality of first plungers 84 connected to the crankshaft 78 and positioned to reciprocate relative to the crankshaft 78 as the crankshaft 78 rotates. For example, as shown in FIGS. 4B and 4C, the hydraulic fracturing pump 12 may include a first bank 86 of four first plungers 84*a*, 84*b*, 84*c*, and 84*d*. In addition, in some embodiments, the hydraulic fracturing pump 12 may include a plurality of second plungers 88 connected to the crankshaft 78 and positioned to reciprocate relative to the crankshaft 78 as the crankshaft 78 rotates. For example, as shown in FIGS. 4B and 4C, the hydraulic fracturing pump 12 may include a second bank 90 of four second plungers 88*a*, 88*b*, 88*c*, and 88*d*. Though four first plungers 84 and four second plungers 88 are shown, the hydraulic fracturing pump 12 may include any suitable number of first and second plungers 84 and 88. In some embodiments, the hydraulic fracturing pump 12 may include from two, three, or four to five, six, eight, ten, or twelve first plungers 84 and from two, three, or four to five, six, eight, ten, or twelve second plungers 88.

Each of the of first plungers 84 may be configured to reciprocate and draw-in fracturing fluid at a first pressure and discharge the fracturing fluid at a second pressure greater than the first pressure. Each of the second plungers 88 may be configured to reciprocate and draw-in fracturing fluid at a third pressure and discharge the fracturing fluid at a fourth pressure greater than the third pressure. For example, the first pressure and/or the third pressure may be substantially equal to a pressure associated with the fracturing fluid being supplied to the hydraulic fracturing pump 12 from the blender 28 (FIG. 2). The second pressure and the fourth pressure may be substantially equivalent to the high pressure of the fracturing fluid being supplied to the wellhead 38 by operation of the prime mover 16, the transmission 18, and the hydraulic fracturing pump 12 of the hydraulic fracturing unit 10. In some embodiments, the first pressure and the third pressure may be substantially the same. In some embodiments, the second pressure and the fourth pressure may be substantially the same. In some embodiments, the first pressure and the third pressure may be different, and/or the second pressure and the fourth pressure may be different.

In some embodiments, for example, as shown in FIG. 4E, each of the first plungers 84 may reciprocate in a first plane P1 and draw-in fracturing fluid at the first pressure and discharge the fracturing fluid at the second pressure, and/or each of the second plungers 88 may reciprocate in a second plane P2 and draw-in fracturing fluid at the third pressure and discharge the fracturing fluid at the fourth pressure. In some embodiments, the first plane P1 and the second plane P2 may intersect at the crankshaft axis CR and/or define an offset angle A between the first plane P1 and the second plane P2. For example, the offset angle A may range from zero degrees to three hundred-sixty degrees, for example, from about ten degrees to about three hundred degrees, from about thirty degrees to about one two hundred-seventy degrees, or from about forty-five degrees to about one hundred-eighty degrees. In some embodiments, the offset angle A between the first plane P1 and the second plane P2 may be a non-zero offset angle. For example, the offset angle A may range from about thirty degrees to about one hundred-eighty degrees, for example, from about ninety degrees to about one hundred-eighty degrees, from about thirty degrees to about one hundred-fifty degrees, from about forty-five degrees to about one hundred thirty-five degrees, from about sixty degrees to about one hundred-twenty degrees, or from about seventy-five degrees to about one hundred-five degrees, for example, about ninety degrees.

In some embodiments, providing the first and second plungers 84 and 88 in different planes may result in increasing the pumping capacity of the hydraulic fracturing pump 12, for example, without substantially increasing the physical dimensions of the hydraulic fracturing pump 12, for example, without substantially increasing the pump length L and/or without substantially increasing the pump width W. In some embodiments, providing the first and second plungers 84 and 88 in different planes may result in relatively reducing the level of shock and/or vibration associated with operation of the hydraulic fracturing pump 12, for example, the level of shock and/or vibration associated with torque shock and/or torque vibration generated during operation of the hydraulic fracturing pump 12, for example, as each of the first plungers 84 and/or each of the second plungers 88 discharges fracturing fluid at the second and fourth pressures, respectively. For example, in some embodiments, the shock and/or torque generated by one or more of the first plungers 84 and/or one or more of the second plungers 88 may substantially offset or cancel one another.

As shown in FIGS. 4B and 4C, in some embodiments, the crankshaft 78 may include a plurality of crankpins 92, and each of the crankpins 92 may be substantially parallel to and offset from a longitudinal rotation axis RA of the crankshaft 78. In some embodiments, the crankshaft axis CR and the longitudinal rotation axis RA may be substantially coexistent. The crankpins 92 may be spaced from, but parallel to, the longitudinal rotation axis RA, such that as the crankshaft 78 rotates, the first plungers 84 and the second plungers 88 are caused to reciprocate, for example, in respective chambers of the first and second fluid ends 74*a* and 74*b*, for example, a distance equal to two times the offset of the respective crankpin 92 to which the plunger 84 or 88 is connected. In some embodiments, one or more of the crankpins 92 may be radially spaced from one another, for example, such that the respective reciprocations of the plungers occur according to a desired timing relative to one another. The crankshaft 78 may include any suitable number of crankpins 92. In some embodiments, the crankshaft 78 may include one, two, three, or four to five, six, eight, ten, or twelve or more crankpins 92. For example, in the embodiment shown in FIGS. 4B and 4C, the example crankshaft 78 includes four crankpins 92. In some embodiments, each of the crankpins 92 may be radially offset relative to one another by, for example, ninety degrees. This may result in the respective reciprocations of the plungers being spaced from one another. The spacing of the plunger reciprocations may result in at least some force cancellation due to the plungers 84 and 88 moving in different directions as more fully described below.

As shown in FIGS. 4B, 4C, and 4D, in some embodiments, the hydraulic fracturing pump 12 may include a plurality of connecting rods 94. In some embodiments, the plurality of connecting rods 94 may include from two, four, or six to eight, ten, twelve, sixteen, twenty, or twenty-four or more connecting rods 94. For example, each of connecting rods 94 may connect one of the first plungers 84 to each of the plurality of crankpins 92 or one of the second plungers 88 to each of the of crankpins 92 (e.g., connecting rods 94*a* and 94*b*, respectively), for example, such that each of the crankpins 92 is connected to one of the first plungers 84 and one of the second plungers 88. For example, each of the connecting rods 94*a* and 94*b* may include an elongated rod body 95 (e.g., rod bodies 95*a* and 95*b*, respectively) defining a longitudinal rod axis (e.g., rod axis A1 and rod axis A2) and having a plunger end 96 connected to either one of the first plungers 84 or one of the second plungers 88 (e.g., plunger ends 96*a* and 96*b*, respectively), and a crank end 98 connected to one of the crankpins 92 (e.g., crank ends 98*a* and 98*b*, respectively). For example, each of the plunger ends 96 may be connected to a respective plunger (84 or 88) via a pin that permits the plunger (84 or 88) to pivot with respect to the respective connecting rod 94 as the plunger (84 or 88) reciprocates in a chamber of a respective fluid end (74*a* or 74*b*), and each of the respective crank ends 98 may be connected to a respective crankpin 92, such that the crankpin 92 is able to rotate freely relative to the respective crank end 98 as the crankshaft 78, driven by the prime mover 16 and/or the transmission 18, rotates. As shown in FIGS. 4B, 4C, and 4D, in some embodiments, the plurality of connecting rods 94*a* may have a longitudinal rod axis A1 offset from a longitudinal rod axis A2 of connecting rods 94*b*. In other embodiments, the plurality of connecting rods 94*a* may be axially aligned with the plurality of connecting rods 94*b*, for example, as described herein with respect to FIGS. 5A-5J.

In some embodiments, the crankshaft 78 and/or the crankpins 92 may be configured such that different pairs of the first and second plungers 84 and 88 are in different locations along their respective stroke paths as the crankshaft 78 rotates. In some embodiments, the crankshaft 78 and/or the crankpins 92 may be configured such that different pairs of first and second plungers 84 and 88 of the first and second banks of plungers 86 and 90 and are offset by the crankpins 92, for example, in some embodiments, the plungers of the first and third pairs of plungers shown in the drawings may be offset from each other by the crankpins 92 by about ninety degrees, for example, and may move in different directions, for example, along an intake stroke direction toward the crankshaft 78 for drawing-in fracturing fluid and a discharge stroke direction away from the crankshaft 78 for discharging fracturing fluid. For example, a first pair of plungers may include a first one of the first plungers 84 (e.g., first plunger 84*a*) and a first one of the second plungers 88 (e.g., second plunger 88*a*), and a second pair of plungers may include a second one of the first plungers 84 (e.g., first plunger 84*b*) and a second one of the second plungers 88 (e.g., second plunger 88*b*), and the crankshaft 78 may be configured such that the first pair of plungers moves in a first direction to discharge at least a portion of the fracturing fluid while the second pair of plungers moves in a second direction to draw-in at least a portion of the fracturing fluid. In some embodiments, each of the pairs of first and second plungers 84 and 88 may be connected to a common crankpin 92 of the crankshaft 78. In some embodiments, different pairs and/or additional pairs of the first and second plungers 84 and 88 may similarly move in different directions. This example movement of plunger pairs in different directions may result in relatively reducing the level of shock and/or vibration associated with operation of the hydraulic fracturing pump 12, for example, the level of shock and/or vibration associated with torque shock and/or torque vibration generated during operation of the hydraulic fracturing pump 12, for example, as each of the first plungers 84 and/or each of the second plungers 88 discharges fracturing fluid at the second and fourth pressures, respectively. For example, in some embodiments, the shock and/or torque generated by one or more of the pairs of first and second plungers 84 and 88 may substantially offset or cancel one another.

As shown in FIG. 4D, in some embodiments, each of the first plungers 84 has a first longitudinal dimension LD1 (e.g., relative to the hydraulic fracturing pump 12, for example, a first diameter), and each of the second plungers 88 has a second longitudinal dimension LD2 (e.g., relative to the hydraulic fracturing pump 12, for example, a second diameter). In some embodiments, for example, as shown, the first longitudinal dimension LD1 is substantially equal to the second longitudinal dimension LD2. In some embodiments, the first plungers 84 and the second plungers 88 are each connected to one of the crankpins 92, such that, for example, a total longitudinal distance occupied by the first plunger 84 and the second plunger 88 is less than a sum of the first longitudinal dimension LD1 and the second longitudinal dimension LD2.

For example, as shown in FIG. 4D, each of the crank ends 98*a* and 98*b* of the respective connecting rods 94*a* and 94*b* includes two crank end connectors 100 (e.g., crank end connectors 100*a* and 100*b*, respectively) separated by a crank end space 102 (e.g., crank end spaces 102*a* and 102*b*, respectively). For example, each of a group of first connecting rods 94*a* may be connected to one of the first plungers 84, and each of a group of second connecting rods 94*b* may be connected to one of the second plungers 88. The respective crank end connector 100*a* of each of the first connecting rods 94*a* may be positioned at least partially in a respective crank end space 102*b* of one of the second connecting rods 94*b*, and the respective crank end connector 100*b* of each of the second connecting rods 94*b* may be positioned at least partially in a crank end space 102*a* of one of the first connecting rods 94*a*. This example intermeshing of the connecting rods 94*a* and 94*b* connected to the first and second plungers 84 and 88 may result in further reducing the pump length L of at least some embodiments of the hydraulic fracturing pump 12.

As shown in FIGS. 4A, 4B, 4C, and 4E, in some embodiments, the hydraulic fracturing pump 12 may include a first pinion gear 108 engaged with the crankshaft 78, for example, via a first drive gear 110, at a first end 112 of the pump frame 76, and a connector shaft 114 connected to the first pinion gear 108. In some embodiments, the hydraulic fracturing pump 12 also may include a second pinion gear 116 connected to the hydraulic fracturing pump 12 at a second end 118 of the pump frame 76 and connected to the first pinion gear 108 via the connector shaft 114. In some such embodiments, the first pinion gear 108 may drive the connector shaft 114 and the crankshaft 78 at the first end 112 of the pump frame 76. The connector shaft 114 may transfer the torque from the first pinion gear 108 and drive the second pinion gear 116 at the second end 118 of the pump frame 76. The second pinion gear 116 may drive the crankshaft 78 at the second end 118 of the pump frame 76, for example, via a second drive gear 120. In some such embodiments, because the crankshaft 78 is driven at both ends, the torque tending to twist the crankshaft 78 may be relatively reduced as compared to a crankshaft that is driven at one end. This may result in an ability to drive the crankshaft 78 with relatively more torque and/or power without damaging the crankshaft 78 (e.g., for a crankshaft of a given strength) and/or adversely affecting operation of the hydraulic fracturing pump 12. In some embodiments, the hydraulic fracturing pump 12 may be configured to be driven by one or more prime movers 16 located at opposite ends of the hydraulic fracturing pump 12. For example, the hydraulic fracturing pump 12 may be driven by one or more prime movers 16 from each of both the first end 112 and the second end 118 of the pump frame 76, for example, via the first pinion gear 108 and the second pinion gear 116. For example, a second prime mover may be connected to the hydraulic fracturing pump 12 at an end of the hydraulic fracturing pump 12 opposite a first prime mover 16, for example, via a second transmission, to supply power to the hydraulic fracturing pump 12.

Figure 5A:
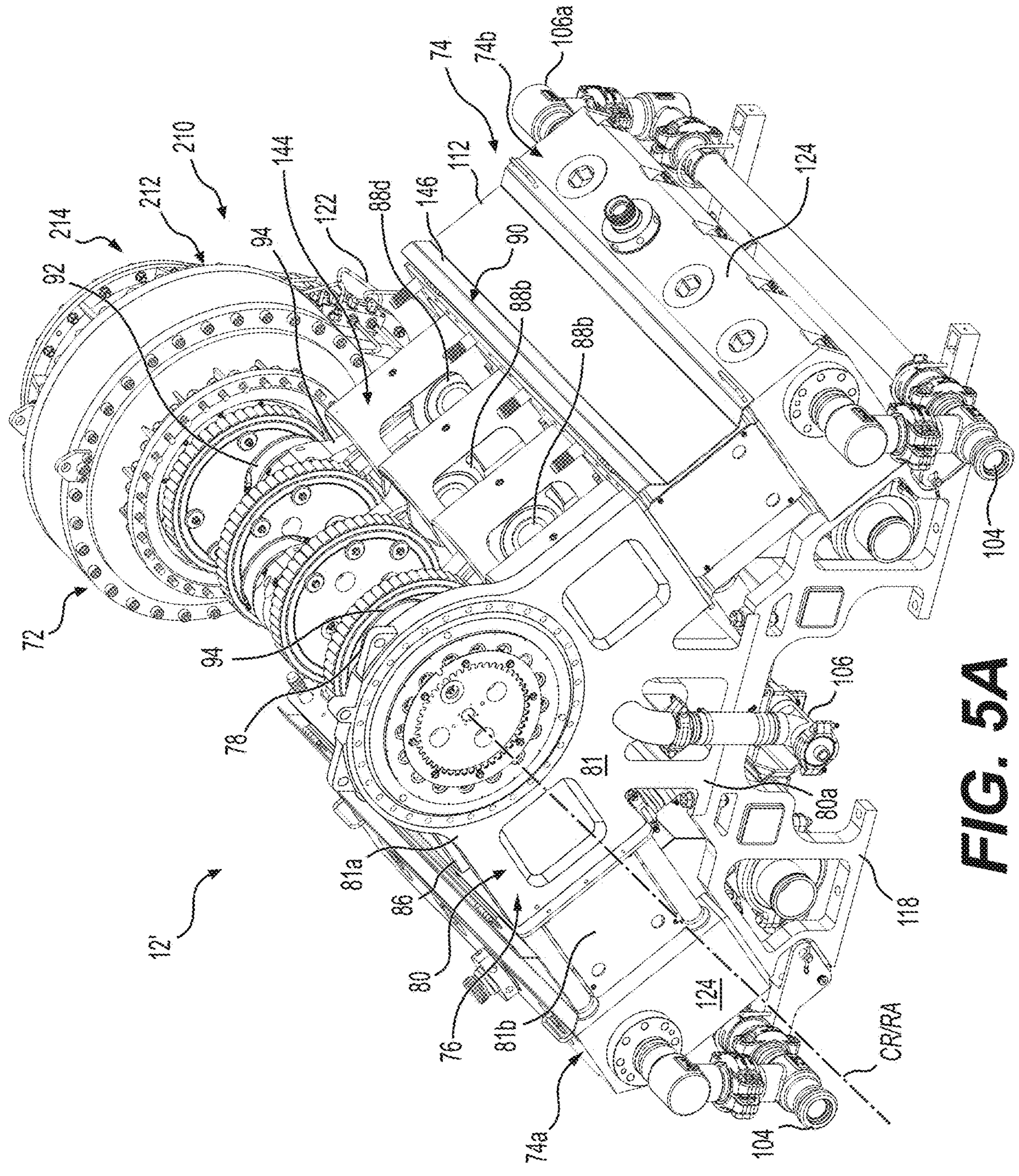
FIG. 5A is a schematic perspective view of an example hydraulic fracturing pump, according to embodiments of the disclosure.

FIG. 5A is a schematic perspective view of an example hydraulic fracturing pump 12', according to embodiments of the disclosure. In some embodiments, the hydraulic fracturing pump 12' shown in FIG. 5A may have a similar construction the hydraulic fracturing pump 12 shown in FIGS. 4A-4E, and thus, like numerals will be used to refer to similar parts in the example embodiments shown in FIGS. 5A-5J. In embodiments consistent with the embodiments shown in FIGS. 5A-5J, a drive assembly of the hydraulic fracturing pump 12' may include a planetary gear drive train having one or more planetary gearboxes, for example, located at the first end 112 of the hydraulic fracturing pump 12', though one or more additional planetary gearboxes may be provided at the second end 118 of the hydraulic fracturing pump 12' for driving the crankshaft 78 from a second end thereof, for example, as described herein. Similar to the example hydraulic fracturing pump 12 shown in FIG. 4A, hydraulic fracturing pump 12' may be mounted on the platform 42 and supported on the chassis 40 of the transportable hydraulic fracturing unit 10. The hydraulic fracturing pump 12' may be configured for pumping one or more fluids, such as fluids for use in hydraulic fracturing operations. The hydraulic fracturing pump 12' generally may be mounted in a substantially centrally aligned position adjacent the rear of the platform 42, for example, as shown in FIGS. 3A and 3B.

Figure 5B:
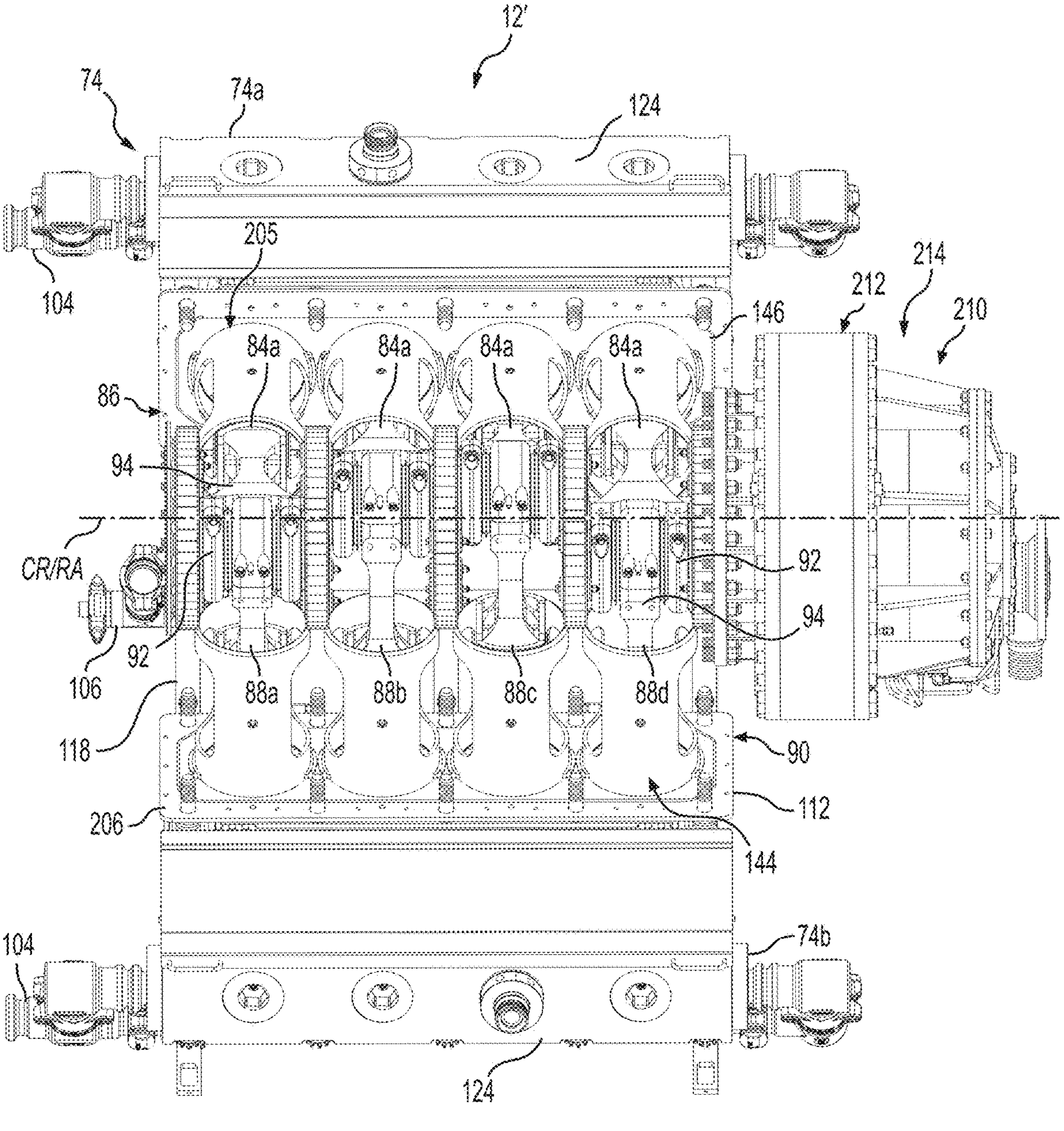
FIG. 5B is a schematic top view of the hydraulic fracturing pump shown in FIG. 5A, according to embodiments of the disclosure.
Figure 5C:
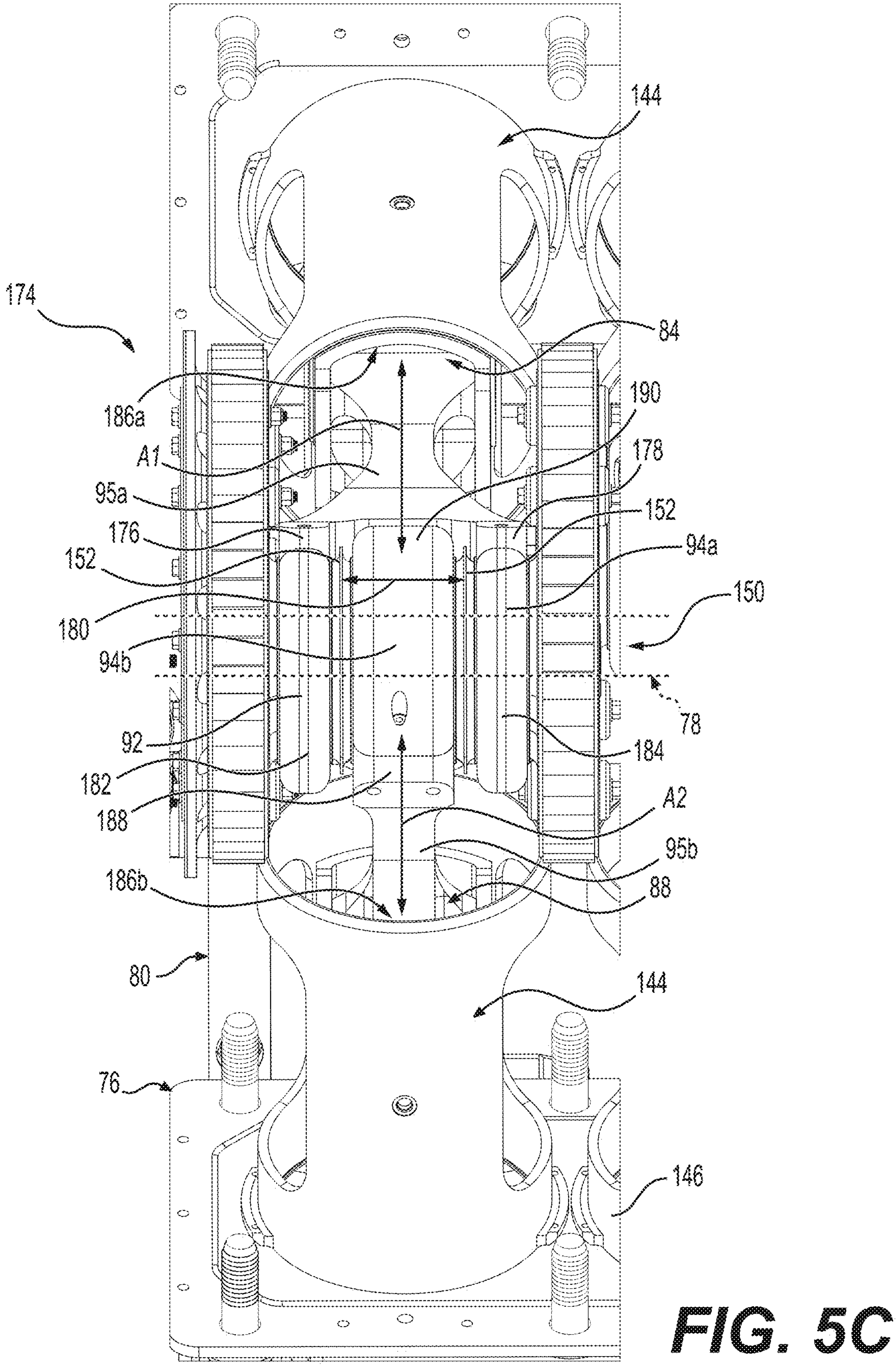
FIG. 5C is a schematic detailed view of a portion of an example crankshaft and connecting rod assembly for the example hydraulic fracturing pump shown in FIG. 5A, according to embodiments of the disclosure.
Figure 5D:
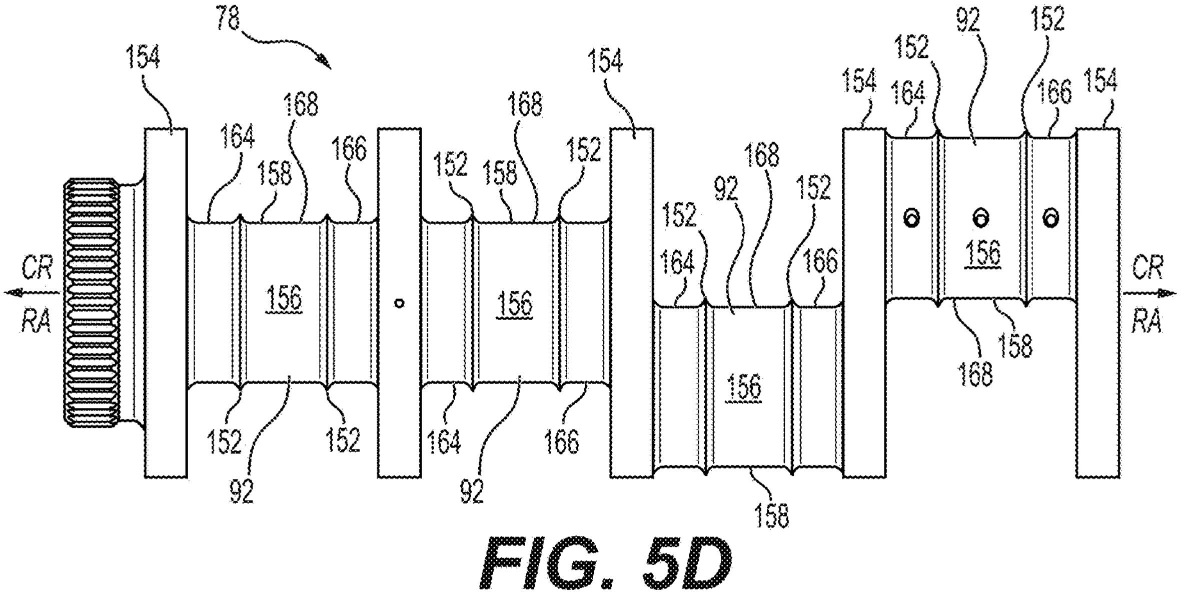
FIG. 5D is a schematic side view of an example crankshaft for the example hydraulic fracturing pump shown in FIG. 5A, according to embodiments of the disclosure.
Figure 5E:
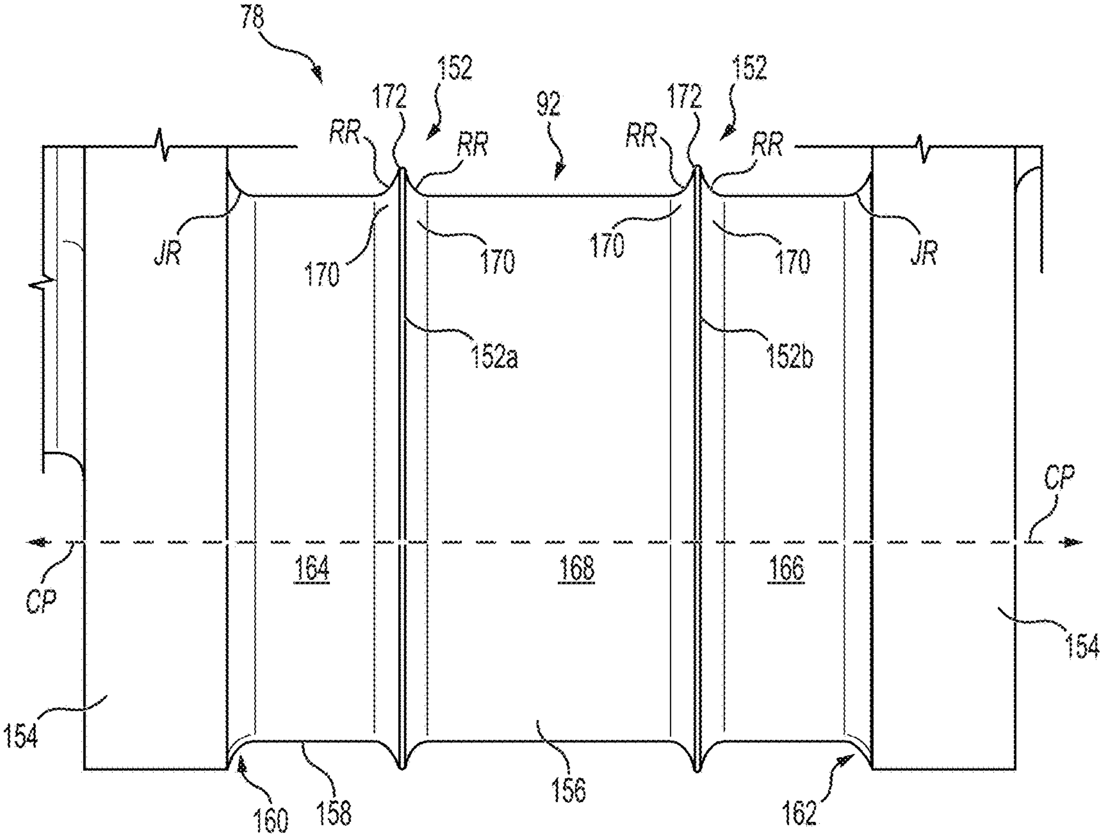
FIG. 5E is a schematic detailed section view of a portion of the example crankshaft shown in FIG. 5D, according to embodiments of the disclosure.
Figure 5F:
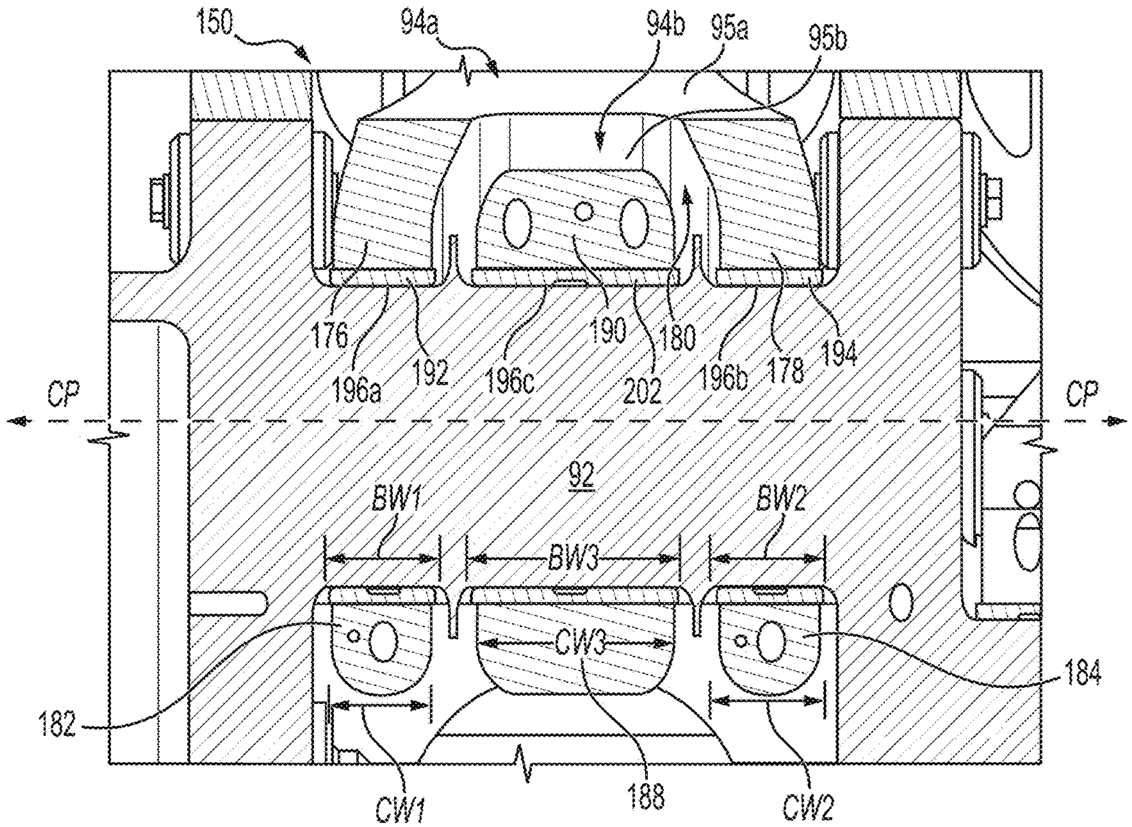
FIG. 5F is a schematic detailed section view of a portion of the example crankshaft and connecting rod assembly shown in FIG. 5C showing example ridges of an example crankpin, according to embodiments of the disclosure.

As illustrated in FIGS. 5A-5B and 5F, the hydraulic fracturing pump 12' may include a pump frame 76 with at least one power end 72 located along an upper portion of the pump frame 76, and one or more fluid ends 74 (e.g., respective first and second fluid ends 74*a* and 74*b*) located along a lower portion of the pump frame 76. The pump frame 76 may include a first end 112 (e.g., an upstream end) at which at least one planetary gearbox may be located, and a second end 118 (e.g., a downstream end) at which fluid is discharged from the hydraulic fracturing pump 12'.

Figure 5G:
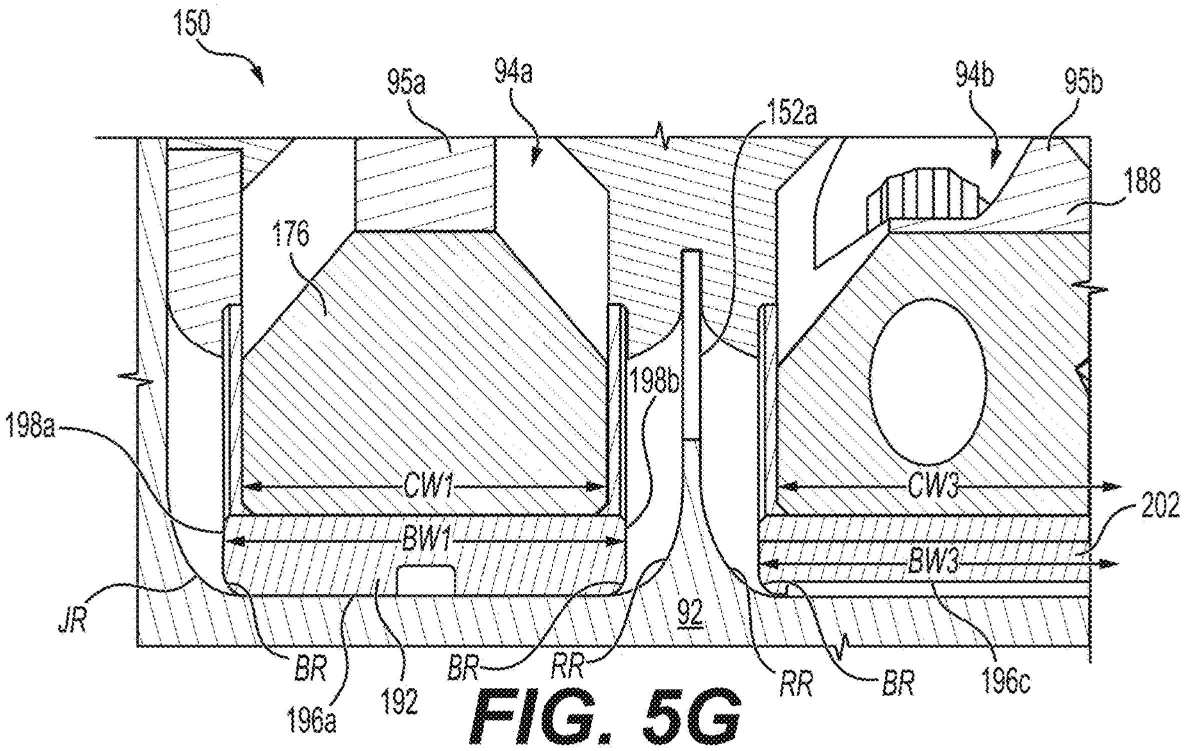
FIG. 5G is a schematic detailed section view of a portion of the example crankshaft and connecting rod assembly shown in FIGS. 5C and 5F, according to embodiments of the disclosure.
Figure 5H:
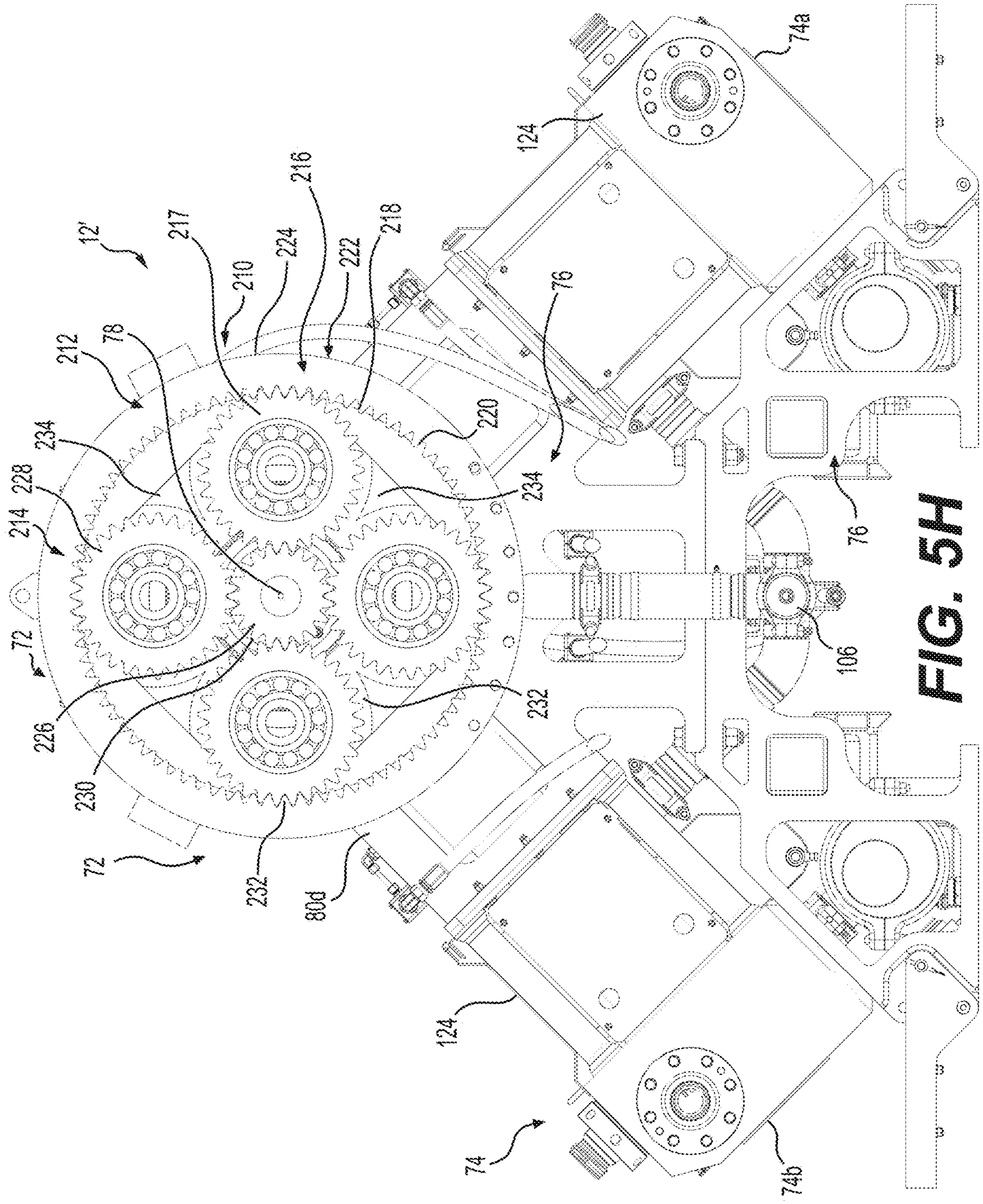
FIG. 5H is a schematic partial section end view along an example pump frame and showing an example planetary gear arrangement of an example planetary gear train, according to embodiments of the present disclosure.
Figure 5I:
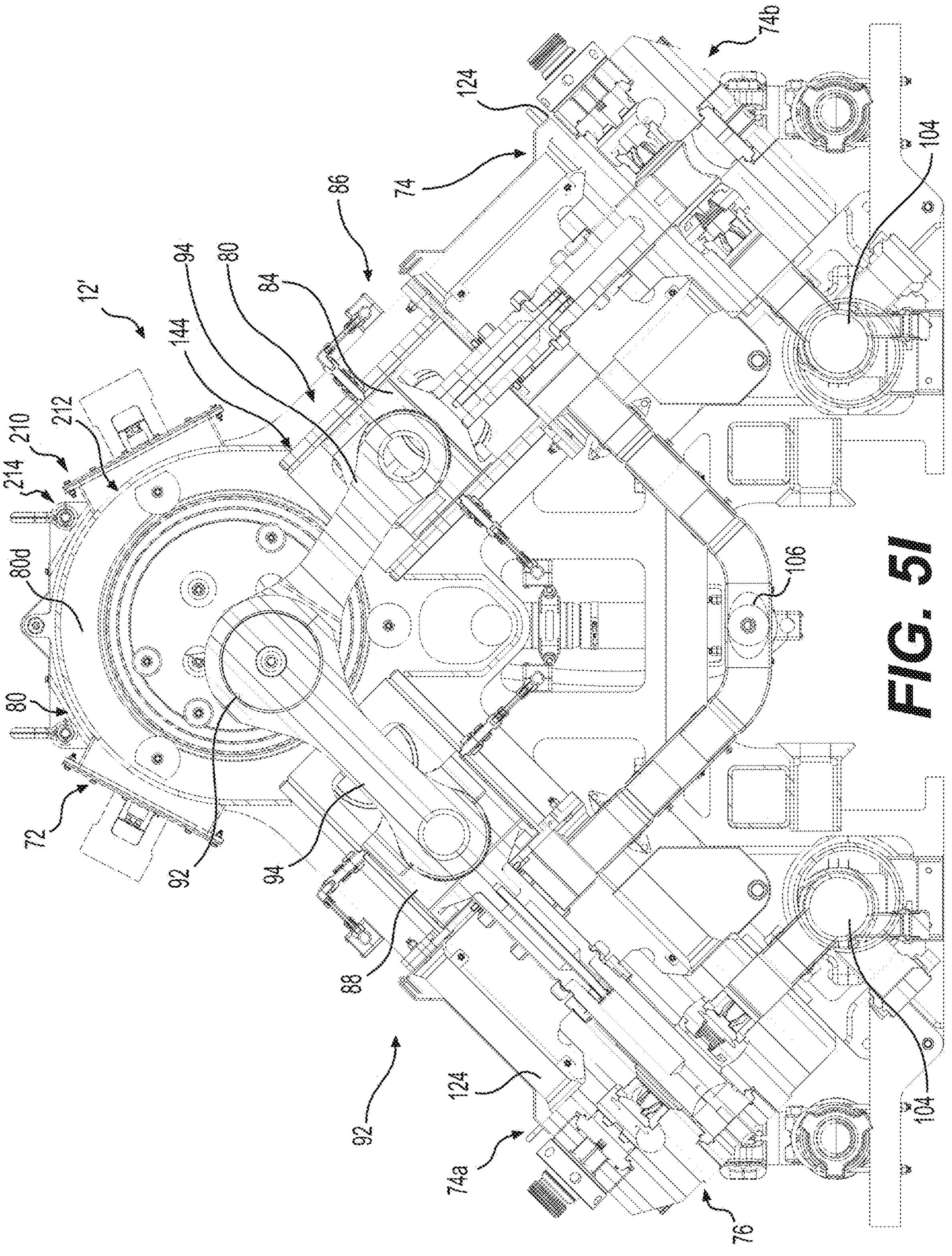
FIG. 5I is a schematic partial section end view along an example pump frame and showing a second end or fluid inlet end of the example hydraulic fracturing pump consistent with FIGS. 5A and 5B, according to embodiments of the present disclosure.
Figure 5J:
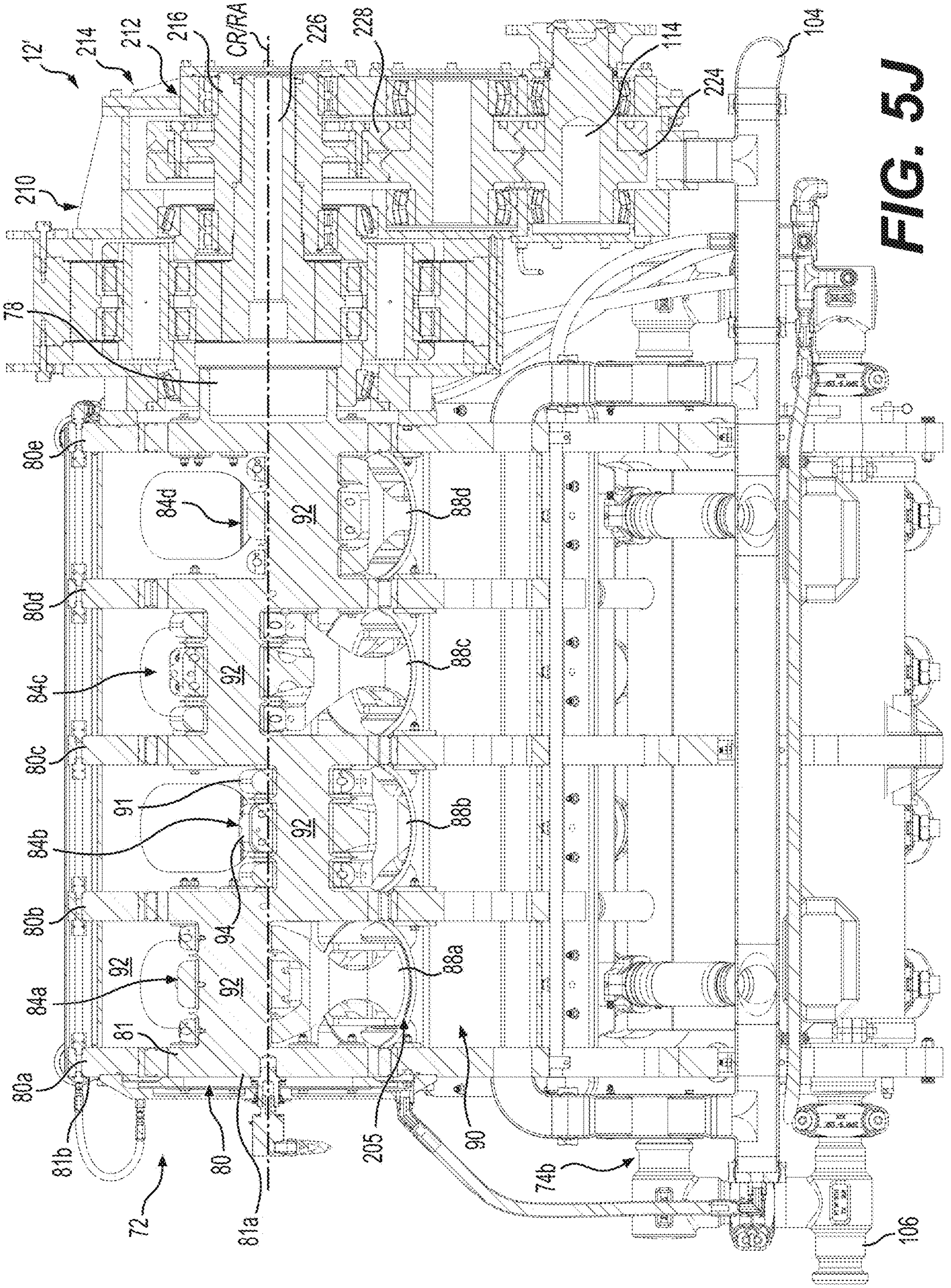
FIG. 5J is a schematic partial section side view of an example hydraulic fracturing pump consistent with FIGS. 5A and 5B, according to embodiments of the present disclosure.

As shown in FIG. 5A, the pump frame 76 further may include a series of pump frame sections 80 (e.g., pump frame sections 80*a*, 80*b*, 80*c*, 80*d*, and 80*e* shown in FIG. 5J) extending between the power end 72 and the fluid ends 74*a* and 74*b* of the pump frame 76. Each pump frame section 80 may be connected together to form the pump frame 76, with each pump frame section 80 including a body 81 having an upper end 81*a* that may be formed with a substantially circular configuration and that may include a bearing assembly and a lower end 81*b*. The upper ends 81*a* of one or more of the pump frame sections 80 further may include an aperture or opening, with the openings of the pump frame sections 80 being longitudinally aligned along a common axis, such that together they define a crankshaft aperture, along which a crankshaft 78 is extended through the pump frame 76 of the hydraulic fracturing pump 12'.

FIG. 5B is a schematic top view of the hydraulic fracturing pump 12' shown in FIG. 5A, according to embodiments of the disclosure. As illustrated in FIG. 5B, the hydraulic fracturing pump 12' may include a series of first and second plungers 84 and 88, which may be arranged in sets or banks 86 and 90 of first plungers 84*a*-84*d* and second plungers 88*a*-88*d*, respectively, and along each side of the pump frame 76. For example, FIG. 5A and FIG. 5B show two example banks 86 and 90 of plungers 84 and 88 arranged on opposite sides of the pump frame 76 and which may be coupled to the crankshaft 78 in an offset arrangement, so as to be driven in a reciprocating motion toward and away from/into and out of fluid chambers 124 (see FIGS. 5A and 5B) arranged along each of the first and second fluid ends 74*a* and 74*b* of the pump frame 76, in an alternating motion. For example, as shown in FIG. 5B, as the plungers first 84*a*-84*d* of the first bank 86 of plungers is driven along a downward stroke in a first direction toward the first fluid end 74*a*, the plungers 88*a*-88*d* of the second bank 90 of plungers will be retracted from the fluid chamber 124 of the second fluid end 74*b*.

In some embodiments, the first and second plungers 84 and 88 of the first and second banks 86 and 90 of plungers may be arranged in pairs or groups of first and second plungers 84 and 88, with the plungers of each pair of plungers offset from the first and second plungers 84 and 88 of other ones of the pairs of plungers. For example, as shown in FIG. 5I, the plungers of a first pair of plungers may be arranged at an offset with respect to a second and/or third pair of first and second plungers, for example, at an offset angle of approximately ninety degrees, although in some embodiments, the offset angles between the pairs of first and second plungers may be less or may be greater, for example, such offset angles may range between about zero degrees to about one hundred-eighty degrees.

For example, similar to the embodiment shown in FIG. 4E, each of the first plungers 84 may reciprocate in a first plane P1 and draw-in fracturing fluid at the first pressure and discharge the fracturing fluid at the second pressure, and/or each of the second plungers 88 may reciprocate in a second plane P2 and draw-in fracturing fluid at the third pressure and discharge the fracturing fluid at the fourth pressure. In one or more embodiments, the first plane P1 and the second plane P2 may intersect at the crankshaft axis CR and/or define an offset angle A between the first plane P1 and the second plane P2. In some embodiments, the offset angle A between the first plane P1 and the second plane P2 may be a non-zero offset angle. For example, the offset angle A may range from zero degrees to three hundred-sixty degrees, for example, from about ten degrees to about three hundred degrees, from about thirty degrees to about one two hundred-seventy degrees, or from about forty-five degrees to about one hundred-eighty degrees. For example, the offset angle A may range from about thirty degrees to about one hundred-eighty degrees, for example, from about ninety degrees to about one hundred-eighty degrees, from about thirty degrees to about one hundred-fifty degrees, from about forty-five degrees to about one hundred thirty-five degrees, from about sixty degrees to about one hundred-twenty degrees, or from about seventy-five degrees to about one hundred-five degrees, for example, about ninety degrees As shown in, for example, FIGS. 5A, 5B, 5H, and 5I, the first and second fluid ends 74*a* and 74*b* may each include a fluid chamber 124 into which the plungers 84 and 88 of the first and second banks 86 and 90 of plungers will be received. Similar to the embodiment of the hydraulic fracturing pump 12 shown in FIGS. 4A-4E, while the hydraulic fracturing pump 12' (FIGS. 5A-5J) is shown with a pair of fluid ends 74*a* and 74*b* and two banks 86 and 90 of four plungers on each side of the pump frame 76 in FIGS. 5A and 5B, it will be understood by those skilled in the art that additional plungers and additional fluid ends or chambers may be provided. Thus, depending on applications, the pump frame 76 of the hydraulic fracturing pump 12' may be configured (e.g., may be lengthened or extended, or reduced in length as needed) to accommodate any suitable number of plungers 84 or 88, as well as more or less numbers of fluid ends 74 and/or or fluid chambers 124. For example, in some embodiments, the hydraulic fracturing pump 12' may include multiple banks of plungers, each of which may include one, two, three, four, five, six, seven, eight, nine, ten, eleven, or twelve, or more, plungers arranged on each side of the pump frame 76, and, in some embodiments, the hydraulic fracturing pump 12' may include three or more fluid ends 74 with three or more sets or banks of plungers, each corresponding to one of the fluid ends 74.

In some embodiments, the pump frame sections 80, as generally illustrated in FIG. 5A and FIG. 5J, may have a substantially inverted Y-shaped cross-section or configuration, as viewed in a direction substantially parallel to a longitudinal axis CR of the crankshaft 78, for example, as shown in FIGS. 5A, 5H, and 5I. In some embodiments, such as where the hydraulic fracturing pump 12' includes three or more fluid ends, the additional fluid ends may be stacked along the sides of the pump frame 76. For example, a third fluid end may be disposed above the crankshaft 78 adjacent upper ends of the pump frame sections 80, which may have a Y-shaped configuration, and in some embodiments where four or more fluid ends are provided, the pump frame sections 80 may have a substantially X-shaped cross-section or configuration, as viewed in the direction substantially parallel to the longitudinal axis CR of the crankshaft 78. In some embodiments, the fluid ends may be stacked or disposed with one above another. For example, a third fluid end may be disposed above the first fluid end, and a fourth fluid end may be disposed above the second fluid end.

As shown in FIGS. 5A, 5B, 5C, and 5I, each of the plungers 84 or 88 may be received within a sleeve 144 that may be configured to help direct or guide the reciprocating motion of each of the plungers 84 or 88 into and out of the chambers 124 of each of their respective or associated first and second fluid ends 74*a* and 74*b* of the hydraulic fracturing pump 12'. For example, as shown in FIG. 5C, the sleeves 144 may be formed with a generally cylindrical configuration that substantially matches the configuration of the plungers 84 or 88, generally being configured to help control and/or guide the movement of the plungers 84 or 88, so as to substantially minimize or reduce transverse movement or vibration of the plungers 84 or 88 during their reciprocating motion. In some embodiments, the sleeves 144 may be mounted along the pump frame 76, for example, between each of the pump frame sections 80, as shown in FIGS. 5A and 5C, and secured by fasteners, welding, and/or integrated construction, along a support 146 (e.g., a mounting plate), and may be arranged at an angle corresponding to the angle of the movement or stroke of an associated plunger 84 or 88.

In some embodiments, as shown in FIGS. 5A, 5C, and 5I, each of the plungers 84 or 88 may be connected at an upper end to a connecting rod 94, for example, as described herein. Each of the connecting rods 94 may include an elongated rod body 95 having a plunger end 96 that connects to an upper end of a corresponding one of the plungers 84 or 88, and a crank end 98 that is generally pivotally attached to the crankshaft 78 at a corresponding crankpin 92. The crankshaft 78 may have a plurality of crankpins 92 as needed for driving the connecting rods 94 and plungers 84 or 88 of the hydraulic fracturing pump 12', and the crankpins 92 may be offset from the longitudinal rotation axis RA of the crankshaft 78, for example, as described herein. As noted with respect to embodiments consistent with the embodiments shown in FIGS. 4A-4E, the crankshaft axis CR and the longitudinal rotation axis RA may be substantially aligned or coexistent, with the crankpins 92 being arranged substantially parallel to and offset from the longitudinal rotation axis RA.

In some embodiments, each of the crankpins 92 connected to alternating ones of the connecting rods 94 and plungers 84 or 88 may be radially offset with respect to one another, for example, by ninety degrees, although greater or lesser offsets (e.g., between about zero degrees to about one hundred-eighty degrees) may be used. As a result, the respective reciprocation of the plungers 84 or 88 of the first bank of plungers 86 may be opposite of the reciprocal movement of the plungers 84 or 88 of the second bank of first plungers 90. For example, as the first plungers 84 are moved in the first direction toward their corresponding fluid end 74*a*, so as to discharge fluid from the fluid end 74*a*, the second plungers 88 may be retracted in the second direction away from their corresponding fluid end 74*b*. This example configuration may enable a plunger firing sequence, whereby two consecutive plunger groups fire one after the other, for example, such that a plunger firing sequence of 1-3-2-4 may be provided. The spacing of the plunger reciprocations thus may potentially provide at least some degree of force cancellation in at least some of the bearings due to a ninety-degree phasing of the plungers, so as to reduce peak loads acting on at least some of the bearings in the pump frame sections 80.

As shown in FIGS. 5B and 5I, for example, each of the connecting rods 94 may be connected to their corresponding plungers 84 or 88 by a pivotal connection between the plunger end 96 of each connecting rod 94 and its corresponding plunger 84 or 88, such as by pin or similar pivoting connector that permits each plunger 84 or 88 to pivot with respect to its corresponding connecting rod 94 as the plunger 84 or 88 reciprocates into and out of the chamber 124 of its corresponding or associated fluid end 74*a* or 74*b*. The crank ends 98 of each of the connecting rods 94 may be connected to their respective crankpins 92, such that each of the crankpins 92 is able to freely rotate relative to the crank end 98 of its associated or corresponding connecting rods 94 as the crankshaft 78 is driven, for example, by the prime mover 16 and/or the transmission 18 (see, e.g., FIG. 3A). In some embodiments, each of the connecting rods 94 corresponding to each of the plungers 84 and 88 of the first and second banks of plungers 86 and 90 may be axially aligned, so as to move along substantially axially aligned stroke paths as the crankshaft 78 is rotated.

In some embodiments, the crankpins 92 may be arranged along the crankshaft 78, such that different pairs of the plungers 84 and 88 of the first and second banks of plungers 86 and 90 will be at different locations along their respective stroke paths as the crankshaft 78 rotates, and, as discussed herein, further may be moved in different directions, for example, in an intake stroke direction towards the crankshaft 78 for drawing in fracturing fluid, and in a discharge stroke direction away from the crankshaft 78 for discharging the fracturing fluid.

Each of the of first and second plungers 84 or 88 may be configured to reciprocate in first and second directions to discharge and draw-in fracturing fluid at different pressures. For example, the first plungers 84 may be aligned and reciprocate in a first plane P1 (see, e.g., FIG. 4E) to draw-in fracturing fluid at a first pressure and discharge the fracturing fluid at a second pressure that may be greater than the first pressure, while the second plungers 88 may be configured to reciprocate in a second plane P2 to draw-in fracturing fluid at a third pressure and discharge the fracturing fluid at a fourth pressure that may be greater than the third pressure, for example, as described herein with respect to FIG. 4E. In some embodiments, the first pressure and/or the third pressure may be substantially equal to a pressure associated with the fracturing fluid being supplied to the hydraulic fracturing pump 12' from the blender 28 (see FIG. 2); and the second pressure and the fourth pressure may be substantially equivalent to the high pressure of the fracturing fluid being supplied to the wellhead 38 by operation of the prime mover 16, the transmission 18, and the hydraulic fracturing pump 12' of the hydraulic fracturing unit 10. In some embodiments, the first pressure and the third pressure may be substantially the same. In some embodiments, the second pressure and the fourth pressure may be substantially the same. In some embodiments, the first pressure and the third pressure may be different, and/or the second pressure and the fourth pressure may be different.

In some embodiments, reciprocating the first and second plungers 84 and 88 in their respective planes also may result in increasing the pumping capacity of the hydraulic fracturing pump 12' without substantially increasing a pump length L and/or without substantially increasing the pump width P thereof, and/or may assist in relatively reducing the level of shock and/or vibration associated with operation of the hydraulic fracturing pump 12', for example, the level of shock and/or vibration associated with torque shock and/or torque vibration generated during operation of the hydraulic fracturing pump 12', as each of the first plungers 84 and/or each of the second plungers 88 discharges fracturing fluid. This further may lead to the shock and/or torque generated by one or more of the first plungers 84 and/or one or more of the second plungers 88 substantially offsetting or canceling one another.

FIG. 5C is a schematic detailed view of a portion of an example crankshaft and connecting rod assembly 150 for the example hydraulic fracturing pump 12' shown in FIGS. 5A, 5B, and 5H-5J, according to embodiments of the disclosure. FIG. 5D is a schematic side view of an example crankshaft 78 for the example hydraulic fracturing pump 12' shown in FIGS. 5A, 5B, and 5H-5J, according to embodiments of the disclosure. FIG. 5E is a schematic detailed section view of a portion of the example crankshaft 78 shown in FIG. 5D, according to embodiments of the disclosure. FIG. 5F is a schematic detailed section view of a portion of the example crankshaft and connecting rod assembly 150 shown in FIG. 5C showing example ridges 152 of an example crankpin 92, according to embodiments of the disclosure. FIG. 5G is a schematic detailed section view of a portion of the example crankshaft and connecting rod assembly 150 shown in FIGS. 5C and 5F, according to embodiments of the disclosure.

As shown in FIG. 5C, in some embodiments, the hydraulic fracturing pump 12' may include a crankshaft and connecting rod assembly 150 in which the crankshaft 78 includes one or more crankpins 92 that include one or more ridges 152, for example, as shown in FIGS. 5D-5G. For example, as shown in FIGS. 5D and 5E, in some embodiments, the crankshaft 78 may include two or more journals 154 configured to be rotatably supported in two or more pump frame sections 80 of the hydraulic fracturing pump 12'. The two or more journals 154 may define therebetween the longitudinal crankshaft axis CR. As shown, in some embodiments, the crankshaft 78 may include a crankpin 92 between adjacent journals 154, and the crankpin 92 may define a longitudinal crankpin axis CP extending substantially parallel to and offset from the longitudinal crankshaft axis CR. Each of the one or more crankpins 92, in some embodiments, may be configured to receive two or more connecting rods 94, for example, as shown in FIGS. 5C, 5F, and 5G.

In some embodiments, as shown in FIGS. 5D and 5E, the crankpins 92 may include a crankpin body 156 extending along the longitudinal crankpin axis CR and defining a crankpin surface 158. The crankpin surface 158 may be substantially cylindrical. The crankpins 92 further may include a first ridge 152*a* at least partially extending (e.g., fully extending) circumferentially around the crankpin surface 158 of the crankpin body 156, and a second ridge 152*b* longitudinally spaced from the first ridge 152*a* and at least partially extending (e.g., fully extending) circumferentially around the crankpin surface 158 of the crankpin body 156. For example, as shown in FIG. 5E, each of the crankpin bodies 156 may define a first end 160 and a second end 162 between which the crankpin surface 158 extends. The first ridge 152*a* may be spaced from and adjacent the first end 160 of the crankpin body 156, and the second ridge 152*b* may be located between the first ridge 152*a* and the second end 162 of the crankpin body 156. Embodiments having more than two ridges are contemplated.

As shown in FIGS. 5D and 5E, in some embodiments, the crankpin bodies 156 may define a first rod receiver portion 164 between the first end 160 of the crankpin body 156 and the first ridge 152*a*, a second rod receiver portion 166 between the second ridge 152*b* and the second end 162 of the crankpin body 156, and a third rod receiver portion 168 between the first ridge 152*a* and the second ridge 152*b*. In some embodiments, for example as shown in FIGS. 5F and 5G, the first rod receiver portion 164, the second rod receiver portion 166, and the third rod receiver portion 168 may be configured to be connected to at least two connecting rods 94, as explained herein.

As shown in FIG. 5E, in some embodiments, the first ridge 152*a* and/or the second ridge 152*b* may include a ridge base 170 and a ridge extension 172 extending radially outward from the ridge base 170. The ridge base 170 and/or the ridge extension 172 may at least partially define a ridge radius RR, and the ridge radius RR may be concave, for example, as shown in FIG. 5E. In some embodiments, the ridge radius RR may be on both or longitudinally opposite sides of the first ridge 152*a* and/or the second ridge 152*b*, for example, as shown. It is contemplated that in some embodiments, one of the sides and/or one of the ridges 152 may not include a ridge radius. As shown in FIG. 5E, in some embodiments, one or more of the journals 154 of the crankpins 92 may at least partially define a journal radius JR, and the journal radius JR may be concave, for example, as shown. In some embodiments, one or more of the ridge radii RR and one or more of the journal radii JR may be substantially equal. In some embodiments, one or more of the ridge radii RR and one or more of the journal radii JR may differ.

FIGS. 5F and 5G are schematic detailed views of a portion of an example crankshaft and connecting rod assembly 150 for the example hydraulic fracturing pump 12' shown in FIGS. 5A, 5B, and 5H-5J, according to embodiments of the disclosure. As shown in FIGS. 5F and 5G, in some embodiments, the crankshaft and connecting rod assembly 150 may include a connecting rod assembly 174. In some embodiments, the connecting rod assembly 174 may include a first connecting rod 94*a*. The first connecting rod 94*a* may include an elongated rod body 95*a* defining a longitudinal rod axis A1 and having a crank end 98*a* and a plunger end 96*a* opposite the crank end 98*a*. The crank end 98*a* may include a first crankpin connector 176 (FIG. 5F) configured to be connected to a crankpin 92 of the crankshaft 78, and a second crankpin connector 178 configured to be connected to the crankpin 92. In some embodiments, the crank end 98*a* may at least partially define a connecting rod clearance 180 between the first crankpin connector 176 and the second crankpin connector 178 and configured to at least partially receive therein a crank end of another connecting rod 94, for example, as described herein, such that two connecting rods 94 may be connected to a common crankpin 92 and, in some embodiments, in a longitudinally aligned a manner.

The first connecting rod 94*a* further may include a first rod clamp 182 configured to be connected to the first crankpin connector 176, thereby to rotatably connect the elongated rod body 95*a* of the first connecting rod 94*a* to the crankpin 92. The first connecting rod 94*a* also may include a second rod clamp 184 configured to be connected to the second crankpin connector 178, thereby to rotatably connect the elongated rod body 95*a* to the crankpin 92. The first connecting rod 94*a* further may include a plunger connector 186*a* (see FIG. 5C) at the plunger end 96*a* of the elongated rod body 95*a* and configured to connect a first plunger 84 to the elongated rod body 95*a* of the first connecting rod 94*a*, for example, via known plunger mechanisms, such as those described herein (e.g., a wristpin).

As shown in FIGS. 5F and 5G, in some embodiments, the connecting rod assembly 174 further may include a second connecting rod 94*b* configured to be connected to the same crankpin 92 as the first connecting rod 94*a*. For example, the second connecting rod 94*b* may include an elongated rod body 95*b* defining a second longitudinal rod axis A2 and having a crank end 98*b* and a plunger end 96*b* opposite the crank end 98*b*. The crank end 98*b* of the second connecting rod 94*b* may include a third crankpin connector 188 configured to be connected to the crankpin 92, and a third rod clamp 190 configured to be connected to the third crankpin connector 188, thereby to rotatably connect the elongated rod body 95*b* of the second connecting rod 94*b* to the crankpin 92, for example, between the first crankpin connector 176 and the second crankpin connector 178 of the first connecting rod 94*a*, for example, in the connecting rod clearance 180, as shown in FIGS. 5C, 5F, and 5G. The second connecting rod 94*b* further may include a plunger connector 186*b* (see FIG. 5C) at the plunger end 96*b* of the elongated rod body 95*b* and configured to connect a second plunger 88 to the elongated rod body 95*b* of the second connecting rod 94*b*, for example, via known plunger connection mechanisms, such as those described herein (e.g., a wristpin).

In some embodiments, for example, as shown in FIG. 5C, the first longitudinal rod axis A1 of the first connecting rod 94*a* and the second longitudinal rod axis A2 of the second connecting rod 94*b* may lie in a common rod plane. In some embodiments, this may result in reducing the length of the crankshaft 78 and/or the length L of the hydraulic fracturing pump 12 or 12'. For example, in embodiments consistent with the embodiment shown in FIG. 5C, the respective plungers 84 and 88 connected to the connecting rods 94*a* and 94*b*, reciprocate in a common plane rather than being longitudinally offset from one another, for example, as they would be if the connecting rods 94*a* and 94*b* were connected to different crankpins 92 and/or if the connecting rods 94*a* and 94*b* were connected adjacent to one another on a common crankpin 92. In the embodiment shown in FIG. 5C, the first connecting rod 94*a* and the second connecting rod 94*b* are connected to the common crankpin 92 in a nested fashion, for example, such that the third crankpin connector 188 of the second connecting rod 94*b* is received in the connecting rod clearance 180 created by the separation of the respective first and second crankpin connectors 176 and 178 of the first connecting rod 94*a*. In some embodiments, this results in the plungers 84 and 88 connected to the respective first and second connecting rods 94*a* and 94*b* being connected to a common crankpin 92 and the plungers 84 and 88 reciprocating in a common plane that is perpendicular to the longitudinal crankshaft axis CR.

In some embodiments consistent with the embodiments shown in FIGS. 5C, 5F, and 5G, Applicant has recognized that connecting both the first connecting rod 94*a* and the second connecting rod 94*b* to a common crankpin 92 may provide a number of potential benefits. For example, by connecting two connecting rods to a common crankpin, the overall length of the hydraulic fracturing pump may be reduced, for example, by reducing the number of crankpins required for connecting the connecting rods to the crankshaft. As compared to a hydraulic fracturing pump in which a single crankpin is required for connection to each connecting rod, a hydraulic fracturing pump having two connecting rods connected to a common crankpin may result in a crankshaft having a relatively shorter length. For example, for embodiments of the hydraulic fracturing pump including banks of plungers that reciprocate in different planes (e.g., the example hydraulic fracturing pumps 12 and 12'), connecting two connecting rods to each crankpin may serve to double the number of plungers of the hydraulic fracturing without substantially increasing the length of the crankshaft and/or without substantially increasing the length of the hydraulic fracturing pump. This may result in increasing the output capacity of the hydraulic fracturing pump without substantially increasing the length of the crankshaft or hydraulic fracturing pump.

Reducing the length of the crankshaft 78 and/or the length L of the hydraulic fracturing pump 12 or 12' may result in reducing stress to which the crankshaft is subjected during operation of the hydraulic fracturing pump 12 or 12'. For example, during operation of the hydraulic fracturing pump 12 or 12', the crankshaft 78 is driven by one or more prime movers 16, for example, via a transmission 18. As the crankshaft 78 is driven and rotates, the plungers 84 and/or 88, due to reciprocating movement and/or energy associated with pressurizing the fluid being pumped, exert force against the crankpins 92 of the crankshaft 78. The force exerted results in bending force and torsional force being applied along the length of the crankshaft 78. In some configurations, this may result in a helical twisting and/or deflection of the crankshaft 78. In some embodiments, reducing the length of the crankshaft 78 may result in reducing the helical twisting and/or deflection of the crankshaft 78.

For at least some embodiments in which respective first and second connecting rods 94*a* and 94*b* are connected to a common crankpin 92, such that the respective rod axes A1 and A2 lie substantially within a common rod plane (e.g., FIG. 5C), for example, as described herein, may result in spreading force applied to the crankpin 92 more evenly across the length of the crankpin 92, for example, as compared to configurations in which two connecting rods 94 are connected adjacent to one another on a common crankpin 92, for example, as shown in FIG. 4D. For example, in some embodiments consistent with the crankshaft and connecting rod assembly 150 shown in FIG. 5C, the load on the crankpin 92 may be relatively more symmetric as compared to the example arrangement shown in FIG. 4D. For example, for embodiments consistent with the embodiment shown in FIG. 4D, the first and second connecting rods 94*a* and 94*b* and the respective plungers 84 and 88 reciprocate in longitudinally offset planes, which may cause or increase bending loads on the crankpin 92 and/or crankshaft 78 relative to the crankshaft and connecting rod assembly 150 shown in FIG. 5C.

As described herein, for example, with respect to FIGS. 5D and 5E, in some embodiments, the crankpins 92 may include one or more ridges 152 (e.g., two ridges 152*a* and 152*b*). In some embodiments, the one or more ridges 152 may serve to prevent the first connecting rod 94*a* and the second connecting rod 94*b* from contacting one another, for example, at the crankpin 92. As described herein, as the crankshaft 78 is driven and rotates, the crankshaft 78 and the crankpins 92 are subjected to torsional and/or bending stress, which may result ins twisting and deflection of the crankshaft 78 and/or crankpins 92. This may promote longitudinal movement of the first connecting rod 94*a* and the second connecting rod 94*b* relative to the crankpin 92 to which they are connected. As a result, the first crankpin connector 176 and/or the second crankpin connector 178 of the first connecting rod 94*a* may be forced against the third crankpin connector 188 of the second connecting rod 94*b*, which may lead to increased friction, increased heat, and/or to damage and/or failure of the first connecting rod 94*a* and/or the second connecting rod 94*b*.

In some embodiments, the one or more ridges 152 may serve to reduce the likelihood or prevent the first connecting rod 94*a* and the second connecting rod 94*b* from contacting one another during operation of the hydraulic fracturing pump 12'. For example, the ridges 152 may act as a guide or barrier to prevent the first connecting rod 94*a* and/or the second connecting rod 94*b* from moving longitudinally along the crankpin 92 an amount sufficient for the first crankpin connector 176 and/or the second crankpin connector 178 of the first connecting rod 94*a* from contacting the third crankpin connector 188 of the second connecting rod 94*b* during operation of the hydraulic fracturing pump 12'. This, in turn, may reduce the likelihood or prevent such contact, which may lead to reduced friction, reduced heat build-up, and/or to mitigate or prevent damage and/or failure of the first connecting rod 94*a* and/or the second connecting rod 94*b*.

As shown in FIGS. 5F and 5G, in some embodiments, the crankshaft and connecting rod assembly 150 further may include bushings between the connecting rods 94 and the associated crankpins 92. For example, the crankshaft and connecting rod assembly 150 may include a first crankpin bushing 192 associated with the first crankpin connector 176 and configured to act as a first bearing between the first crankpin connector 176 and the crankpin 92. The crankshaft and connecting rod assembly 150 further may include a second crankpin bushing 194 associated with the second crankpin connector 178 and configured to act as a second bearing between the second crankpin connector 178 and the crankpin 92.

In some embodiments, as shown in FIG. 5G, the first crankpin bushing 192 and/or the second crankpin bushing 194 may include an interior surface 196*a* and/or 196*b*, respectively, configured to face the crankpin 92 and outboard edges 198*a* and 198*b* having lateral surfaces. One or more of the outboard edges 198*a* and 198*b* may at least partially define a bushing radius BR extending between the interior surface 196 and the lateral surfaces. As shown, the bushing radius BR may be convex.

As shown in FIGS. 5F and 5G, in some embodiments, the crankshaft and connecting rod assembly 150 further may include a third crankpin bushing 202 associated with the third crankpin connector 188 of the second connecting rod 94*b* and configured to act as a bearing between the third crankpin connector 188 and the crankpin 92. The third crankpin bushing 202 may include an interior surface 196*c* configured to face the crankpin 92 and outboard edges 198*a* and 198*b* having lateral surfaces. One or more of the outboard edges 198*a* and 198*b* may at least partially define a bushing radius BR extending between the interior surface 196 and the lateral surfaces of the third crankpin bushing 202.

In some embodiments, the ridge radii RR, the journal radii JR, and/or the bushing radii BR may act to alleviate or reduce stress concentrations that might otherwise develop at the interfaces between the first and second connecting rods 94*a* and 94*b*, the crankpins 92, the ridges 152, and/or the journals 154 of the crankshaft 78. In some embodiments, the ridge radii RR, the journal radii JR, and/or the bushing radii BR may act to reduce friction, heat, and/or wear that might otherwise develop at the interfaces between the first and second connecting rods 94*a* and 94*b*, the crankpins 92, the ridges 152, and/or the journals 154 of the crankshaft 78. For example, the ridge radii RR, the journal radii JR, and/or the bushing radii BR may provide a relatively gentle transition between the interfaces.

As shown in FIG. 5F, in some embodiments, the first crankpin connector 176 of the first connecting rod 94*a* may define a first connector width CW1 perpendicular to the longitudinal rod axis A1, and the first crankpin bushing 192 may have a first bushing width BW1 greater than the first connector width CW1. Similarly, in some embodiments, the second crankpin connector 178 of the first connecting rod 94*a* may define a second connector width CW2 perpendicular to the first longitudinal rod axis A1, and the second crankpin bushing 194 may have a second bushing width BW2 greater than the second connector width CW2. In some embodiments, the third crankpin connector 188 of the second connecting rod 94*b* may define a third connector width CW3 perpendicular to the second longitudinal rod axis A2, and the third crankpin bushing 202 may have a third bushing width BW3 greater than the third connector width CW3. In some embodiments, one or more of the connector widths CW1, CW2, or CW3 may be substantially the same. In some embodiments, one or more of the connector widths CW1, CW2, or CW3 may differ from one another. In some embodiments, one or more of the bushing widths BW1, BW2, or BW3 may be substantially the same. In some embodiments, one or more of the bushing widths BW1, BW2, or BW3 may differ from one another.

In some embodiments, the bushing widths BW1, BW2, and/or BW3 may be at least about 105%, at least about 110%, at least about 115%, at least about 120%, or at least about 125% of the corresponding connector widths CW1, CW2, and/or CW3. For example, a ratio of the bushing widths BW1, BW2, and/or BW3 to the connector widths CW1, CW2, and/or CW3, expressed as BW1:CW1, BW2:CW2, and/or BW3:CW3, may range from about 1.25:1 to about 1:1, for example, from about 1.2:1 to about 1:1, from about 1.15:1 to about 1:1, from about 1.10:1 to about 1:1, or from about 1.05:1 to about 1:1. In some embodiments, the first and/or second connector widths CW1 and/or CW2 may be equal to or relatively smaller than the third connector width CW3. For example, the first and/or second connector widths CW1 and/or CW2 may range from about 25% of the third connector width CW3 to about 100% of the third connector width CW3, for example, from about 30% of the third connector width CW3 to about 100% of the third connector width CW3, from about 35% of the third connector width CW3 to about 100% of the third connector width CW3, from about 40% of the third connector width CW3 to about 100% of the third connector width CW3, from about 45% of the third connector width CW3 to about 100% of the third connector width CW3, from about 50% of the third connector width CW3 to about 100% of the third connector width CW3, from about 60% of the third connector width CW3 to about 100% of the third connector width CW3, or from about 75% of the third connector width CW3 to about 100% of the third connector width CW3. In some embodiments, a ratio of the first and/or second connector widths CW1 and/or CW2 to the third connector width CW3, expressed as CW1:CW3 and/or CW2:CW3, may range from about 0.25:1 to about 1:1, for example, from about 0.3:1 to about 1:1, from about 0.35:1 to about 1:1, from about 0.4:1 to about 1:1, from about 0.45:1 to about 1:1, from about 0.5:1 to about 1:1, from about 0.6:1 to about 1:1, or from about 0.75:1 to about 1:1. In some embodiments, the first and/or second bushing widths BW1 and/or BW2 may have lengths relative to the third bushing width BW3 at least similar to the relative lengths of the first, second, and/or third connector widths CW1, CW2, and/or CW3.

In some embodiments, providing the first, second, and/or third bushings 192, 194, and/or 202 with relatively greater widths than the widths of the corresponding first, second, and/or third crankpin connectors 176, 178, and/or 188 may prevent the respective crankpin connectors 176, 178, and/or 188 from directly contacting the ridges 152 and/or the journals 154 of the corresponding crankpins 92, which may reduce wear and/or prevent damage or failure of the first and second connecting rods 94*a* and 94*b*, the crankpins 92, the ridges 152, and/or the journals 154.

In some embodiments, for example, as shown in FIGS. 5F and 5G, one or more of the bushing radii BR may be configured to nest in an associated one of the ridge radii RR, or in an associated one of the journal radii JR. In some embodiments, one or more of the ridge radii RR may be (or have a radius of curvature) equal to or greater than (the radius of curvature of) an associated bushing radius BR. In some embodiments, one or more of the journal radii JR may be (or have a radius of curvature) equal to or greater than (a radius of curvature of) an associated bushing radius BR. This may create a relatively smoother interface and/or transition between the one or more bushing radii BR and the associated ridge radii RR and/or the associated journal radii JR.

In some embodiments, the relative differences between the radii and/or the nesting between the bushing radii BR and the journal radii JR or ridge radii RR may reduce stress concentrations, friction, and/or heat build-up between the first and second connecting rods 94*a* and 94*b* and the ridges 152 and/or journals 154. In some embodiments, the relative differences between the radii and/or the nesting between the bushing radii BR and the journal radii JR or ridge radii RR may provide a less abrupt mechanical transition between the first and second connecting rods 94*a* and 94*b* and the ridges 152 and/or journals 154.

With reference to FIGS. 5A and 5B, the drive assembly of the hydraulic fracturing pump 12' may include an epicyclic or planetary gear drive train 210, with at least one planetary gear box 212 located at the first or upstream end 112 of the pump frame 76. The planetary gearbox 212 may be connected to the prime mover 16, for example, via the transmission 18 (see, e.g., FIG. 3A) of the hydraulic fracturing unit 10.

FIG. 5H is a schematic partial section end view along an example pump frame 76 and showing an example planetary gear arrangement 214 of an example planetary gear drive train 210, according to embodiments of the disclosure. As shown in FIG. 5H, the planetary drive gear train 210 may include a first drive gear 216, which may be configured, for example, as a ring gear having an inner circumference 218 at least partially defining an interior chamber or area, and further may include a first series of gear teeth 220 projecting radially inward, and a second series of gear teeth 222 arranged about an outer circumference 224 of the first drive gear 216. The planetary gear arrangement 214 may be received within the interior of the first drive gear chamber, such that the planetary gear arrangement 214 is surrounded by and engages the first drive gear 216. As shown in FIG. 5H, in some embodiments, the planetary gear arrangement 214 may include a central or sun gear 226 that may engage with or be mounted to a first end of the crankshaft 78, and may generally be aligned with the longitudinal axis CR of the crankshaft 78 and/or the rotational axis RA of the crankshaft 78, and a series of planet gears 228 arranged about the sun gear 226. In some embodiments, a series of four planet gears 228 are provided as shown in FIG. 5H, though it will be understood by those skilled in the art that other types of planetary gear arrangements also may be used. The sun gear 226 and each of the planet gears 228 may include a series of gear teeth 230 and 232, respectively, formed about the outer circumferences thereof. The gear teeth 232 of the planet gears 228 may be configured to engage both the gear teeth 220 of the inner circumference 218 of the first drive gear 216, as well as the gear teeth 230 of the sun gear 226. Each of the planet gears 228 may be rotatably mounted to a support 234, so as to be held in a substantially fixed orientation, while still being freely rotatable with respect to the support 234.

During operation of the hydraulic fracturing pump 12', the prime mover 16 of the hydraulic fracturing unit 10 may supply power, so as to drive rotation of the sun gear 226, which, in turn, drives rotation of the crankshaft 78 from the first end thereof. As the crankshaft 78 is rotated, the first plungers 84 of the first bank of plungers 86 and the second plungers 88 of the second bank of plungers 90 accordingly will be reciprocated in an alternating fashion in opposite directions toward and away from their respective fluid chambers 124 of their respective fluid ends 74*a* and 74*b*. For example, one or more of the first plungers 84 of the first bank of plungers 86 may be moved in a first, substantially downward direction along a discharge stroke, so as to discharge at least a portion of fracturing fluid contained within the chamber 124 of the first fluid end 74*a*. The discharged fluid may be directed out of the respective chamber 124 of the first fluid end 74*a* and via the fluid output conduit 106, for example, as shown in FIGS. 5A and 5B. Substantially simultaneously or concurrently, one or more of second plungers 88 of the second bank of plungers 90 may be moved in a second, substantially upward direction along an intake stroke to draw-in at least a portion of fracturing fluid into the respective chamber 124 of the second fluid end 74*b*. The fracturing fluid may be drawn into the chamber 124 via the fluid inlet conduit 104, which may be fluidly connected to a source or supply of the fracturing fluid (see, e.g., FIG. 2). In some embodiments, different pairs and/or multiple pairs of the first and second plungers 84 and 88 may be configured to similarly move in different directions, which may further help reduce a level of shock and/or vibration associated with the operation of the hydraulic fracturing pump 12', such as when each of the first plungers 84 and/or each of the second plungers 88 discharges the fracturing fluid at different pressures.

Rotation of the sun gear 226 may drive rotation of the first drive gear 216 of the planetary gear drive train 210. For example, as the sun gear 226 rotates, the engagement of the gear teeth 232 of the planet gears 228 with the gear teeth 230 of the sun gear 226 causes rotation of the planet gears 228, which further engages the first series of gear teeth 220 formed about the inner circumference 218 of the first drive gear 216, so as to translate the rotational motion of the sun gear 226 to the first drive gear 216 and thus drive rotation of the first drive gear 216.

Similar to described with respect to FIGS. 4A-4C, in some embodiments, the second series of gear teeth 222 at the outer circumference 224 of the first drive gear 216 engage with gear teeth 236 of the first pinion gear 108 arranged along the first end 112 of the pump frame 76. The first pinion gear 108 further may engage with the first end of a connector shaft 114 that extends through the pump frame 76 at the first end 112 thereof. As discussed with respect to the example embodiment shown in FIGS. 4A-4E, a second end of the connector shaft 114 further may be connected to or may engage with a second pinion gear 116 at the second end 118 of the pump frame 76. The second pinion gear 116 may have a series of gear teeth configured to engage with a second drive gear that may be connected to or may engage with a second end of the crankshaft 78. In some such embodiments, the crankshaft 78 may be supported and/or driven from opposite ends of the pump frame 76, for example, either (1) substantially simultaneously or concurrently, or (2) alternatively.

In some embodiments, the planetary gear drive train 210 may include a second planetary gear box that may be located at the second end 118 of the pump frame 76 for driving the crankshaft 78 from its second end. The second planetary gear box may have a similar construction to the planetary gear box 212 shown in FIG. 5H, with a second drive gear including a ring gear having a sun gear and a series of planet gears mounted therein. Alternatively, the second end of the crankshaft 78 may be supported and/or driven by a drive gear arrangement, such as illustrated in FIG. 4A, for example, whereby a large second drive gear may be mounted to the second end of the crankshaft 78 and may be rotated by rotation of a smaller second pinion gear located along the lower end of the pump frame 76 and driven by the rotation of a connector shaft by the planetary gear box at the first end 112 of the pump frame 76.

As shown in FIGS. 4A, 4B, 4C, and 4E, and in FIGS. 5A, 5B, and 5H-5J, in some embodiments, the hydraulic fracturing pump 12 or 12' may be configured to pump fracturing fluids from two independent fracturing fluid supplies. For example, as shown in FIGS. 4A, 4B, 4C, 4E, and 5J, the first bank 86 of first plungers 84 may be supplied by a first input conduit 104*a* for supplying a first fracturing fluid from a first fracturing fluid supply, and a first output conduit 106*a* for outputting the first fracturing fluid at high pressure and/or a high flow rate. The second bank 90 of second plungers 88 may be supplied by a second input conduit 104*b* for supplying a second fracturing fluid from a second fracturing fluid supply, and a second output conduit 106*b* for outputting the second fracturing fluid at high pressure and/or a high flow rate. In some embodiments, the first fracturing fluid may have a first fracturing fluid composition, and the second fracturing fluid may have a second fracturing fluid composition. In some embodiments, the first fracturing fluid composition and the second fracturing fluid composition may be substantially the same.

In some embodiments, the first fracturing fluid composition and the second fracturing fluid composition may be different. For example, the first fracturing fluid composition may include water and proppant having a first size and/or first bulk density, and the second fracturing fluid composition may include water and proppant having a second size and/or second bulk density. For example, the first fracturing fluid composition may include water and proppant having a size of greater than 100 Mesh, from about 80 Mesh to about 20 Mesh, from about 70 Mesh to about 30 Mesh, from about 20 Mesh to about 40 Mesh, or from about 40 Mesh to about 60 Mesh, and the second fracturing fluid composition may include water and proppant having a size of less than 100 Mesh, less than 150 Mesh, from about 150 Mesh to about 500 Mesh, or from about 200 Mesh to about 400 Mesh.

In some embodiments, the first fracturing fluid composition may include water, gels, and/or proppants, and the second fracturing fluid composition may include water and/or other components, but may be substantially devoid of proppants. In such embodiments, the first bank 86 of the first plungers 84 may pump a fracturing fluid including proppants while the second bank 90 of the second plungers 88 pumps water, etc., without proppants. Some such embodiments may result in increasing a service interval for the hydraulic fracturing pump 12 or 12', for example, because plungers pumping water (e.g., without proppants) will be expected to experience relatively less wear (e.g., have a slower wear rate) as compared to plungers that pump a fracturing fluid that includes proppants, for example, because pumping proppants may result in increasing the wear rates of plungers and associated fluid ends.

In some embodiments, the hydraulic fracturing pump 12 or 12' may be configured to pump fracturing fluids from three or more independent fracturing fluid supplies. For example, the first fracturing fluid may exit the first fluid end 74*a* via the first output conduit 106*a*, the second fracturing fluid may exit the second fluid end 74*b* via the second output conduit 106*b*, a third fracturing fluid may exit a third fluid end via a third output conduit, and optionally a fourth fracturing fluid may exit a fourth fluid end via a fourth output conduit.

In some embodiments, each of the first, second, third, and fourth fracturing fluids may have substantially the same compositions. In some embodiments, the compositions of the first, second, third, and fourth fracturing fluids may be different. For example, the first fracturing fluid composition may include water and proppant having a first size and/or first bulk density, and the second fracturing fluid composition may include water and proppant having a second size and/or second bulk density. The third fracturing fluid composition may include water and proppant having a third size and/or third bulk density, and the fourth fracturing fluid composition may include water and proppant having a fourth size and/or fourth bulk density.

In some embodiments the hydraulic fracturing pump 12 or 12' may be in fluid communication with two or more wells. For example, the hydraulic fracturing pump 12 or 12' may be in fluid communication with one, two, three, four, five, or more wells. In some such embodiments, the first output conduit 106*a* for outputting the first fracturing fluid at a high pressure and/or a high flow rate may be in fluid communication with a first well for receiving the first fracturing fluid at the high pressure and/or the high flow rate and the second output conduit 106*b* for outputting the second fracturing fluid at high pressure and/or a high flow rate may be in fluid communication with a second well for receiving the second fracturing fluid at the high pressure and/or the high flow rate. In some embodiments, the first output conduit 106*a* may be in fluid communication with a first well for receiving the first fracturing fluid, the second output conduit 106*b* may be in fluid communication with a second well for receiving the second fracturing fluid, a third output conduit may be in fluid communication with a third well for receiving the third fracturing fluid, and a fourth output conduit may be in fluid communication with a fourth well for receiving the fourth fracturing fluid.

As shown in FIGS. 4E and 5A, in some embodiments, the hydraulic fracturing pump 12 or 12' may include the first fluid end 74*a* connected to the pump frame 76, such that the first plungers 84 draw fracturing fluid into the first fluid end 74*a* at the first pressure and discharge the fracturing fluid from the first fluid end 74*a* at the second pressure. The hydraulic fracturing pump 12 or 12' may include the second fluid end 74*b* connected to the pump frame 76, such that the second plungers 88 draw fracturing fluid into the second fluid end 74*b* at the third pressure and discharge the fracturing fluid from the second fluid end 74*b* at the fourth pressure. In some embodiments, one or more of the first plungers 84 of the first fluid end 74*a* may be configured such that as each of the first plungers 84 travels in a first direction, fracturing fluid is drawn into the first fluid end 74*a* and fracturing fluid is discharged from the first fluid end 74*a*, and as each of the first plungers 84 travels in a second direction opposite the first direction, fracturing fluid is drawn into the first fluid end 74*a* and fracturing fluid is discharged from the first fluid end 74*a*. In addition, or alternatively, in some embodiments, one or more of the second plungers 88 of the second fluid end 74*b* may be configured such that as each of the second plungers 88 travels in a third direction, fracturing fluid is drawn into the second fluid end 74*b* and fracturing fluid is discharged from the second fluid end 74*b*, and as each of the second plungers 88 travels in a fourth direction opposite the third direction, fracturing fluid is drawn into the second fluid end 74*b* and fracturing fluid is discharged from the second fluid end 74*b*. Thus, in some embodiments, the hydraulic fracturing pump 12 or 12' may be configured to both draw-in and discharge fracturing fluid relative to the fluid end chambers 124 with each stroke of the respective plungers, regardless of the direction of the respective strokes. This, in at least some embodiments, may result in a significant increase in the output capability of the hydraulic fracturing pump 12 or 12' relative to, for example, fracturing pumps having plungers that draw-in fluid only when moving in a first direction and discharge fluid only when moving in the opposite direction.

A method for attaching connecting rods to a crankshaft of a hydraulic fracturing pump may include providing a first ridge at least partially extending (e.g., fully extending) circumferentially around a crankpin of the crankshaft, for example, as described herein. In some embodiments, the method further may include providing a second ridge spaced from the first ridge and at least partially extending (e.g., fully extending) circumferentially around the crankpin, for example, as described herein. The first ridge may at least partially define a first rod receiver portion, the first ridge and the second ridge may at least partially define a second rod receiver portion therebetween, and the second ridge may at least partially define a third rod receiver portion. The method also may include connecting a first connecting rod at the first rod receiver portion and at the third rod receiver portion, and connecting a second connecting rod at the second rod receiver portion, for example, as described herein. In some embodiments, one or more of the first ridge or the second ridge may be positioned to substantially prevent one or more of the first connecting rod or the second connecting rod from moving longitudinally on the crankpin and contacting one another.

In some embodiments of the method, connecting the first connecting rod at the first rod receiver portion and at the third rod receiver portion may include connecting a first crankpin connector of the first connecting rod and a first rod clamp to the first rod receiver portion of the crankpin, and connecting a second crankpin connector of the first connecting rod and a second rod clamp to the third rod receiver portion of the crankpin, for example, as described herein. In some embodiments of the method, connecting the second connecting rod at the second rod receiver portion may include connecting a third crankpin connector of the second connecting rod and a third rod clamp to the second rod receiver portion of the crankpin, for example, as described herein.

In some embodiments, the first connecting rod may define a first longitudinal rod axis, and the second connecting rod may define a second longitudinal rod axis, and connecting the first connecting rod and connecting the second connecting rod may include connecting the first connecting rod and connecting the second connecting rod to the crankpin, such that the first longitudinal rod axis and the second longitudinal rod axis lie in a common rod plane, for example, as described herein.

In some embodiments of the method, providing the first ridge may include providing a first ridge radius on a first side of the first ridge and a second ridge radius on a second side opposite the first side of the first ridge, and providing the second ridge may include providing a third ridge radius on a first side of the second ridge and a fourth ridge radius on a second side of the second ridge opposite the first side of the second ridge, for example, as described herein. In some embodiments of the method, one or more of the first ridge radius, the second ridge radius, the third ridge radius, or the fourth ridge radius may be configured to reduce stress concentration, reduce wear, and/or reduce friction between one or more of (a) the first connecting rod and the crankpin or (a) the second connecting rod and the crankpin.

In some embodiments, a method of operating a pump to increase pumping capacity during operating of the pump may include supplying power to a pump having a longitudinal pump axis, and driving via the power a crankpin connected to a first plunger and a second plunger to cause the first plunger and the second plunger to reciprocate and draw-in fluid at a first pressure during an intake stroke and discharge fluid at a second pressure greater than the first pressure during a discharge stroke. The first plunger and the second plunger may be substantially longitudinally aligned relative to the longitudinal pump axis, and the method further may include flowing fluid responsive to operating of the pump. In some embodiments of the method of operating a pump, driving via the power the crankpin connected to the first plunger and the second plunger may include connecting the first plunger to the crankpin via a first connecting rod, connecting the second plunger to the crankpin via a second connecting rod, and separating the first connecting rod from the second connecting rod via one or more ridges on the crankpin, for example, as described herein. In some embodiments, separating the first connecting rod from the second connecting rod via the one or more ridges on the crankpin may include providing a ridge radius on the one or more ridges. In some embodiments of the method, it also may include providing a first bushing between the first connecting rod and the crankpin and a second bushing between the second connecting rod and the crankpin, and providing one or more bushing radii on the first bushing and the second bushing, for example, as described herein.

In some embodiments, a method of operating a pump to increase pumping capacity during operating of the pump may include supplying power to a pump having a longitudinal pump axis, and operating the pump via the power so as to pump fluid. The pump may have a first plunger and a second plunger, and each of the first plunger and the second plunger may be configured to draw-in fluid at a first pressure during an intake stroke and discharge fluid at a second pressure greater than the first pressure during a discharge stroke. The first plunger and the second plunger may be substantially longitudinally aligned relative to the longitudinal pump axis, and the method further may include flowing fluid responsive to operating of the pump. In some embodiments, operating the pump may include driving via the power a crankpin connected to the first plunger and the second plunger to cause the first plunger and the second plunger to draw-in and discharge the fluid. In some embodiments of the method, driving via the power the crankpin connected to the first plunger and the second plunger may include connecting the first plunger to the crankpin via a first connecting rod, connecting the second plunger to the crankpin via a second connecting rod, and separating the first connecting rod from the second connecting rod via one or more ridges on the crankpin, for example, as described herein. In some embodiments, separating the first connecting rod from the second connecting rod via the one or more ridges on the crankpin may include providing a ridge radius on the one or more ridges. In some embodiments, the method further may include providing a first bushing between the first connecting rod and the crankpin and a second bushing between the second connecting rod and the crankpin, and providing one or more bushing radii on the first bushing and the second bushing, for example, as described herein.

In some embodiments, a method of operating a pump to increase pumping capacity during operating of the pump may include supplying power to a pump, and operating the pump via the power so as to pump fluid via rotation of a crankpin connected to two or more plungers to cause the two or more plungers to reciprocate through a stroke length to draw-in fluid at a first pressure during an intake stroke and discharge fluid during a discharge stroke at a second pressure greater than the first pressure. The two or more plungers may discharge a first volume of fluid per stroke of the two or more plungers that is greater than a second volume of fluid per stroke discharged by another plunger of another pump reciprocating through the stroke length and discharging the first volume per stroke during operation of the another pump, for example, as described herein. The method further may include flowing fluid responsive to operating of the pump. In some embodiments, operating the pump via the power may include connecting a first plunger of the two or more plungers to the crankpin via a first connecting rod, connecting a second plunger of the two or more plungers to the crankpin via a second connecting rod, and separating the first connecting rod from the second connecting rod via one or more ridges on the crankpin, for example, as described herein. In some embodiments, separating the first connecting rod from the second connecting rod via the one or more ridges on the crankpin may include providing a ridge radius on the one or more ridges, for example, as described herein. In some embodiments, the method further may include providing a first bushing between the first connecting rod and the crankpin and a second bushing between the second connecting rod and the crankpin, and providing one or more bushing radii on the first bushing and the second bushing.

In some embodiments, a method of operating a pump to increase pumping capacity during operating of the pump may include supplying power to a pump having a pump length and a pump width defining a pump footprint. The method further may include operating the pump via the power so as to pump fluid via rotation of a crankpin connected to two or more plungers to cause the two or more plungers to reciprocate through a stroke length to draw-in fluid at a first pressure during an intake stroke and discharge fluid during a discharge stroke at a second pressure greater than the first pressure. The two or more plungers may discharge a first volume of fluid per stroke of the two or more plungers that is greater than a second volume of fluid per stroke discharged by another pump having another pump footprint substantially equal to or greater than the footprint of the pump, for example, as described herein. The method also may include flowing fluid responsive to operating of the pump. In some embodiments, operating the pump via the power may include connecting a first plunger of the two or more plungers to the crankpin via a first connecting rod, connecting a second plunger of the two or more plungers to the crankpin via a second connecting rod, and separating the first connecting rod from the second connecting rod via one or more ridges on the crankpin, for example, as described herein. In some embodiments, separating the first connecting rod from the second connecting rod via the one or more ridges on the crankpin may include providing a ridge radius on the one or more ridges, for example, as described herein. In some embodiments, the method further may include providing a first bushing between the first connecting rod and the crankpin and a second bushing between the second connecting rod and the crankpin, and providing one or more bushing radii on the first bushing and the second bushing, for example, as described herein.

Some embodiments of the method further may include providing a first crankpin bushing between the first connecting rod and the crankpin, for example, as described herein. The first crankpin bushing may define a first bushing radius and a second bushing radius at opposite edges of the first crankpin bushing. The method also may include providing a second crankpin bushing between the second connecting rod and the crankpin, for example, as described herein. The second crankpin bushing may define a third bushing radius and a fourth bushing radius at opposite edges of the second crankpin bushing. In some embodiments, the first bushing radius, the second bushing radius, the third bushing radius, and/or the fourth bushing radius may be configured to interact with the first ridge radius, the second ridge radius, the third ridge radius, and/or the fourth ridge radius, for example, as described herein.

In some embodiments, the hydraulic fracturing pumps, such as disclosed in the example embodiments set forth in the present disclosure may provide a substantially non-consecutive firing sequence between at least two or more pairs or groups of first and second plungers arranged on opposite sides of the pump frame. For example, a plunger firing sequence of four plunger pairs that are offset by about forty-five to about ninety degrees may be provided, wherein engaging or firing of the plunger pairs or groups may be executed in a 1-3-2-4 sequence. While the two consecutive plunger pairs (e.g., plunger pairs 3 and 2) firing in sequence may result in a relatively higher than maximum connecting rod load through half the duration of one crankshaft revolution, the generally overall non-consecutive engagement of firing of the plunger pairs provides at least some degree of force cancellation in the bearings of the frame sections due to the ninety-degree phasing of the crankpin pairs, such that peak loads acting on the other bearings generally will not reach full connecting rod loads.

According to a first aspect of the disclosure, a crankshaft and connecting rod assembly for a hydraulic fracturing pump includes a crankshaft, a first connecting rod, and a second connecting rod. The crankshaft includes a first journal configured to be rotatably supported in a first frame section of the hydraulic fracturing pump, a second journal configured to be rotatably supported in a second frame section of the hydraulic fracturing pump, the first journal and the second journal defining therebetween a longitudinal crankshaft axis, and a crankpin between the first journal and the second journal and defining a longitudinal crankpin axis extending substantially parallel to and offset from the longitudinal crankshaft axis. The crankpin includes a crankpin body extending along the longitudinal crankpin axis and defining a crankpin surface, the crankpin surface being substantially cylindrical; a first ridge at least partially extending circumferentially around the crankpin surface of the crankpin body; and a second ridge longitudinally spaced from the first ridge and at least partially extending circumferentially around the crankpin surface of the crankpin body. The first connecting rod includes a first elongated rod body, a first rod clamp, a second rod clamp, and a first plunger connector. The first elongated rod body defines a first longitudinal rod axis and has a first crank end and a first plunger end opposite the first crank end. The first crank end includes a first crankpin connector connected to the crankpin between the first journal and the first ridge; and a second crankpin connector connected to the crankpin between the second ridge and the second journal, the first crank end defining a connecting rod clearance between the first crankpin connector and the second crankpin connector. The first rod clamp is connected to the first crankpin connector thereby to rotatably connect the first elongated rod body to the crankpin. The second rod clamp is connected to the second crankpin connector thereby to rotatably connect the first elongated rod body to the crankpin. The first plunger connector is at the plunger end of the first elongated rod body and configured to connect a first plunger to the first elongated rod body. The second connecting rod includes a second elongated rod body defining a second longitudinal rod axis and having a second crank end and a second plunger end opposite the second crank end. The second crank end includes a third crankpin connector connected to the crankpin between the first crankpin connector and the second crankpin connector of the first connecting rod, thereby to increase pumping capacity of the hydraulic fracturing pump without substantially increasing a length of the hydraulic fracturing pump.

According to a second aspect of the disclosure, in combination with the first aspect, one or more of the first ridge or the second ridge may include a ridge base and a ridge extension extending radially outward from the ridge base; and one or more of the ridge base or the ridge extension may at least partially define a ridge radius, the ridge radius being concave.

According to a third aspect of the disclosure, in combination with the second aspect, the crankshaft and connecting rod assembly may include: a first crankpin bushing associated with the first crankpin connector and acting as a first bearing between the first crankpin connector and the crankpin; a second crankpin bushing associated with the second crankpin connector and acting as a second bearing between the second crankpin connector and the crankpin; and a third crankpin bushing associated with the third crankpin connector and acting as a bearing between the third crankpin connector and the crankpin.

According to a fourth aspect of the disclosure, in combination with the third aspect, the first crankpin bushing may include a first interior surface facing the crankpin and first outboard edges having first lateral surfaces, one or more of the first outboard edges at least partially defining a first bushing radius extending between the first interior surface and one or more of the first lateral surfaces, the first bushing radius being convex; the second crankpin bushing may include a second interior surface facing the crankpin and second outboard edges having second lateral surfaces, one or more of the second outboard edges at least partially defining a second bushing radius extending between the second interior surface and one or more of the second lateral surfaces, the second bushing radius being convex; or the third crankpin bushing may include a third interior surface facing the crankpin and third outboard edges having third lateral surfaces, one or more of the third outboard edges at least partially defining a third bushing radius extending between the third interior surface and one or more of the third lateral surfaces, the third bushing radius being convex.

According to a fifth aspect of the disclosure, in combination with the fourth aspect, one or more of the first bushing radius, the second bushing radius, or the third bushing radius may nest between two of the ridge radii.

According to a sixth aspect of the disclosure, in combination with the fourth aspect, the ridge radius may be greater than one or more of the first bushing radius, the second bushing radius, or the third bushing radius.

According to a seventh aspect of the disclosure, in combination with the first aspect, the crankpin body may define a first end and a second end between which the crankpin surface extends; the first ridge may be spaced from and adjacent the first end of the crankpin body and may define a first rod receiver portion between the first end of the crankpin body and the first ridge; and the second ridge may be located between the first ridge and the second end of the crankpin body and may define (a) a second rod receiver portion between the first ridge and the second ridge and (b) a third rod receiver portion between the second ridge and the second end of the crankpin body.

According to an eight aspect of the disclosure, in combination with the seventh aspect, the first crankpin connector may be connected to the crankpin at the first rod receiver portion; the second crankpin connector may be connected to the crankpin at the third rod receiver portion; and the third crankpin connector may be connected to the crankpin at the second rod receiver portion.

According to a ninth aspect of the disclosure, in combination with the first aspect, the second connecting rod may include: a third rod clamp connected to the third crankpin connector thereby to rotatably connect the second elongated rod body to the crankpin between the first crankpin connector and the second crankpin connector of the first connecting rod; and a second plunger connector at the second plunger end of the second elongated rod body and configured to connect a second plunger to the second elongated rod body.

According to a tenth aspect of the disclosure, in combination with the first aspect, the third crankpin connector may be connected to the crankpin in the connecting rod clearance of the first connecting rod.

According to an eleventh aspect of the disclosure, in combination with the first aspect, the first longitudinal rod axis of the first connecting rod and the second longitudinal rod axis of the second connecting rod may lie in a common rod plane.

According to a twelfth aspect of the disclosure, in combination with the third aspect, the first crankpin connector may define a first connector width perpendicular to the first longitudinal rod axis, and the first crankpin bushing may have a first bushing width greater than the first connector width; the second crankpin connector may define a second connector width perpendicular to the first longitudinal rod axis, and the second crankpin bushing may have a second bushing width greater than the second connector width; or the third crankpin connector may define a third connector width perpendicular to the second longitudinal rod axis, and the third crankpin bushing may have a third bushing width greater than the third connector width.

According to a thirteen aspect of the disclosure, a crankshaft for a high-power pump comprises a first journal configured to be rotatably supported in a first frame section of the high-power pump; a second journal configured to be rotatably supported in a second frame section of the high-power pump, the first journal and the second journal defining therebetween a longitudinal crankshaft axis; and a crankpin between the first journal and the second journal and defining a longitudinal crankpin axis extending substantially parallel to and offset from the longitudinal crankshaft axis. The crankpin is configured to receive one or more connecting rods and includes: a crankpin body extending along the longitudinal crankpin axis and defining a crankpin surface, the crankpin surface being substantially cylindrical; a first ridge at least partially extending circumferentially around the crankpin surface of the crankpin body; and a second ridge longitudinally spaced from the first ridge and at least partially extending circumferentially around the crankpin surface of the crankpin body.

According to a fourteen aspect of the disclosure, in combination with the thirteen aspect, the crankpin body may define a first end and a second end between which the crankpin surface extends; the first ridge may be spaced from and adjacent the first end of the crankpin body; and the second ridge may be located between the first ridge and the second end of the crankpin body.

According to a fifteen aspect of the disclosure, in combination with the fourteen aspect, the crankpin body may define a first rod receiver portion between the first end of the crankpin body and the first ridge, a second rod receiver portion between the first ridge and the second ridge, and a third rod receiver portion between the second ridge and the second end of the crankpin body.

According to a sixteen aspect of the disclosure, in combination with the fifteen aspect, the first rod receiver portion, the second rod receiver portion, and the third rod receiver portion may be configured to be connected to at least two connecting rods.

According to a seventeen aspect of the disclosure, in combination with the thirteen aspect, one or more of the first ridge or the second ridge may include a ridge base and a ridge extension extending radially outward from the ridge base; and one or more of the ridge base or the ridge extension may at least partially define a ridge radius, the ridge radius being concave.

According to an eighteen aspect of the disclosure, in combination with the seventeen aspect, the ridge radius may be a first ridge radius at least partially defined by a first ridge base and a first ridge extension of the first ridge, the first ridge radius being on a first side of the first ridge; and the first ridge may further include a second side longitudinally opposite the first side of the first ridge, the second side of the first ridge at least partially defining a second ridge radius opposite the first ridge radius.

According to a nineteen aspect of the disclosure, in combination with the seventeen aspect, the ridge radius may be a first ridge radius at least partially defined by a first ridge base and a first ridge extension of the first ridge; the second ridge may include a second ridge base and a second ridge extension extending radially outward from the second ridge base; and one or more of the second ridge base or the second ridge extension may at least partially define a second ridge radius, the second ridge radius being concave.

According to a twentieth aspect of the disclosure, in combination with the nineteen aspect, the second ridge radius may be on a first side of the second ridge; and the second ridge may further include a second side longitudinally opposite the first side of the second ridge, the second side of the second ridge at least partially defining a second ridge radius of the second ridge opposite the first ridge radius of the second ridge.

According to a twenty-first aspect of the disclosure, in combination with the thirteen aspect, the crankpin body may define a first end and a second end between which the crankpin surface extends; and one or more of the first journal and the second journal may at least partially define a journal radius, the journal radius being concave.

According to a twenty-second aspect of the disclosure, a connecting rod assembly for a high-power pump includes a first connecting rod. The first connecting rod includes a first elongated rod body, a first rod clamp, a second rod clamp, and a first plunger connector. The first elongated rod body defines a first longitudinal rod axis and has a first crank end and a first plunger end opposite the first crank end. The first crank end includes a first crankpin connector configured to be connected to a crankpin; and a second crankpin connector configured to be connected to the crankpin, the first crank end defining a connecting rod clearance between the first crankpin connector and the second crankpin connector and configured to at least partially receive therein a second crank end of a second connecting rod. The first rod clamp is configured to be connected to the first crankpin connector thereby to rotatably connect the first elongated rod body to the crankpin. The second rod clamp is configured to be connected to the second crankpin connector thereby to rotatably connect the first elongated rod body to the crankpin. The first plunger connector is at the plunger end of the first elongated rod body and configured to connect a first plunger to the first elongated rod body.

According to a twenty-third aspect of the disclosure, in combination with the twenty-second aspect, the connecting rod assembly may further include a second connecting rod. The second connecting rod may include a second elongated rod body defining a second longitudinal rod axis and having a second crank end and a second plunger end opposite the second crank end, the second crank end including a third crankpin connector configured to be connected to the crankpin; a third rod clamp configured to be connected to the third crankpin connector thereby to rotatably connect the second elongated rod body to the crankpin between the first crankpin connector and the second crankpin connector of the first connecting rod; and a second plunger connector at the second plunger end of the second elongated rod body and configured to connect a second plunger to the second elongated rod body.

According to a twenty-fourth aspect of the disclosure, in combination with the twenty-second aspect, the connecting rod assembly may further include a first crankpin bushing associated with the first crankpin connector and configured to act as a first bearing between the first crankpin connector and the crankpin; and a second crankpin bushing associated with the second crankpin connector and configured to act as a second bearing between the second crankpin connector and the crankpin.

According to a twenty-fifth aspect of the disclosure, in combination with the twenty-fourth aspect, the first crankpin bushing may include a first interior surface configured to face the crankpin and first outboard edges having first lateral surfaces, one or more of the first outboard edges at least partially defining a first bushing radius extending between the first interior surface and one or more of the first lateral surfaces, the first bushing radius being convex; or the second crankpin bushing may include a second interior surface configured to face the crankpin and second outboard edges having second lateral surfaces, one or more of the second outboard edges at least partially defining a second bushing radius extending between the second interior surface and one or more of the second lateral surfaces, the second bushing radius being convex.

According to a twenty-sixth aspect of the disclosure, in combination with the twenty-fourth aspect, the first crankpin connector may define a first connector width perpendicular to the first longitudinal rod axis, and the first crankpin bushing may have a first bushing width greater than the first connector width; or the second crankpin connector may define a second connector width perpendicular to the first longitudinal rod axis, and the second crankpin bushing may have a second bushing width greater than the second connector width.

According to a twenty-seventh aspect of the disclosure, in combination with the twenty-third aspect, the connecting rod assembly may further include a third crankpin bushing associated with the third crankpin connector and configured to act as a third bearing between the third crankpin connector and the crankpin.

According to a twenty-eight aspect of the disclosure, in combination with the twenty-seventh aspect, the third crankpin bushing may include a third interior surface configured to face the crankpin and third outboard edges having third lateral surfaces, one or more of the third outboard edges at least partially defining a third bushing radius extending between the third interior surface and one or more of the third lateral surfaces, the third bushing radius being convex.

According to a twenty-ninth aspect of the disclosure, in combination with the twenty-seventh aspect, the third crankpin connector may define a third connector width perpendicular to the second longitudinal rod axis, and the third crankpin bushing may have a third bushing width greater than the third connector width.

According to a thirtieth aspect of the disclosure, a hydraulic fracturing pump includes a pump frame, a crankshaft, a first connecting rod, a first plunger, a second connecting rod, and a second plunger. The crankshaft includes a first journal configured to be rotatably supported in the frame; a second journal configured to be rotatably supported in the frame, the first journal and the second journal defining therebetween a longitudinal crankshaft axis; and a crankpin between the first journal and the second journal and defining a longitudinal crankpin axis extending substantially parallel to and offset from the longitudinal crankshaft axis. The crankpin includes a crankpin body extending along the longitudinal crankpin axis and defining a crankpin surface, the crankpin surface being substantially cylindrical; a first ridge at least partially extending circumferentially around the crankpin surface of the crankpin body; and a second ridge longitudinally spaced from the first ridge and at least partially extending circumferentially around the crankpin surface of the crankpin body. The first connecting rod includes a first elongated rod body, a first rod clamp, a second rod clamp, and a first plunger connector. The first elongated rod body defines a first longitudinal rod axis and has a first crank end and a first plunger end opposite the first crank end. The first crank end includes a first crankpin connector connected to the crankpin between the first journal and the first ridge; and a second crankpin connector connected to the crankpin between the second ridge and the second journal, the first crank end defining a connecting rod clearance between the first crankpin connector and the second crankpin connector. The first rod clamp is connected to the first crankpin connector thereby to rotatably connect the first elongated rod body to the crankpin. The second rod clamp is connected to the second crankpin connector thereby to rotatably connect the first elongated rod body to the crankpin. The first plunger connector is at the plunger end of the first elongated rod body. The first plunger is connected to the first plunger end of the first connecting rod. The second connecting rod includes a second elongated rod body defining a second longitudinal rod axis and having a second crank end and a second plunger end opposite the second crank end, the second crank end including a third crankpin connector connected to the crankpin between the first crankpin connector and the second crankpin connector of the first connecting rod. The second plunger is connected to the second plunger end of the second connecting rod, thereby to increase pumping capacity of the hydraulic fracturing pump without substantially increasing a length of the hydraulic fracturing pump.

According to a thirty-first aspect of the disclosure, in combination with the thirtieth aspect, one or more of the first ridge or the second ridge may include a ridge base and a ridge extension extending radially outward from the ridge base; and one or more of the ridge base or the ridge extension may at least partially define a ridge radius, the ridge radius being concave.

According to a thirty-second aspect of the disclosure, in combination with the thirty-first aspect, the hydraulic fracturing pump may further include: a first crankpin bushing associated with the first crankpin connector and acting as a first bearing between the first crankpin connector and the crankpin; a second crankpin bushing associated with the second crankpin connector and acting as a second bearing between the second crankpin connector and the crankpin; and a third crankpin bushing associated with the third crankpin connector and acting as a third bearing between the third crankpin connector and the crankpin.

According to a thirty-third aspect of the disclosure, in combination with the thirty-second aspect, the first crankpin bushing may include a first interior surface facing the crankpin and first outboard edges having first lateral surfaces, one or more of the first outboard edges at least partially defining a first bushing radius extending between the first interior surface and one or more of the first lateral surfaces, the first bushing radius being convex; the second crankpin bushing may include a second interior surface facing the crankpin and second outboard edges having second lateral surfaces, one or more of the second outboard edges at least partially defining a second bushing radius extending between the second interior surface and one or more of the second lateral surfaces, the second bushing radius being convex; or the third crankpin bushing may include a third interior surface facing the crankpin and third outboard edges having third lateral surfaces, one or more of the third outboard edges at least partially defining a third bushing radius extending between the third interior surface and one or more of the third lateral surfaces, the third bushing radius being convex.

According to a thirty-fourth aspect of the disclosure, in combination with the thirty-third aspect, the crankpin body may define a first end and a second end between which the crankpin surface extends; the first journal and the second journal each may at least partially define a journal radius, the journal radius being concave; and one or more of the first bushing radius, the second bushing radius, or the third bushing radius may nest between one or more of two of the ridge radii, or one of the ridge radii and one of the journal radii.

According to a thirty-fifth aspect of the disclosure, in combination with the thirty-fourth aspect, the ridge radii and the journal radii may be greater than one or more of the first bushing radius or the second bushing radius.

According to a thirty-sixth aspect of the disclosure, in combination with the thirtieth aspect, the crankpin body may define a first end and a second end between which the crankpin surface extends; the first ridge may be spaced from and adjacent the first end of the crankpin body and may define a first rod receiver portion between the first end of the crankpin body and the first ridge; and the second ridge may be located between the first ridge and the second end of the crankpin body and may define a second rod receiver portion between the first ridge and the second ridge and a third rod receiver portion between the second ridge and the second end of the crankpin body.

According to a thirty-seventh aspect of the disclosure, in combination with the thirty-sixth aspect, the first crankpin connector may be connected to the crankpin at the first rod receiver portion; the second crankpin connector may be connected to the crankpin at the third rod receiver portion; and the third crankpin connector may be connected to the crankpin at the second rod receiver portion.

According to a thirty-eight aspect of the disclosure, in combination with the thirtieth aspect, the second connecting rod may further include a third rod clamp connected to the third crankpin connector thereby to rotatably connect the second elongated rod body to the crankpin between the first crankpin connector and the second crankpin connector of the first connecting rod.

According to a thirty-ninth aspect of the disclosure, in combination with the thirty-eight aspect, the third crankpin connector may be connected to the crankpin in the connecting rod clearance of the first connecting rod.

According to a fortieth aspect of the disclosure, in combination with the thirtieth aspect, the first longitudinal rod axis of the first connecting rod and the second longitudinal rod axis of the second connecting rod may lie in a common rod plane.

According to a forty-first aspect of the disclosure, in combination with the thirty-second aspect, the first crankpin connector may define a first connector width perpendicular to the first longitudinal rod axis, and the first crankpin bushing may have a first bushing width greater than the first connector width; the second crankpin connector may define a second connector width perpendicular to the first longitudinal rod axis, and the second crankpin bushing may have a second bushing width greater than the second connector width; the third crankpin connector may define a third connector width perpendicular to the second longitudinal rod axis, and the third crankpin bushing may have a third bushing width greater than the third connector width.

According to a forty-second aspect of the disclosure, in combination with the thirtieth aspect, the first plunger connected to the first plunger end of the first connecting rod may reciprocate in a first plane and the second plunger connected to the second plunger end of the second connecting rod may reciprocate in a second plane, the first plane and the second plane defining a non-zero offset angle between the first plane and the second plane.

According to a forty-third aspect of the disclosure, in combination with the forty-second aspect, the non-zero offset angle may range from about thirty degrees to about one hundred-fifty degrees.

According to a forty-fourth aspect of the disclosure, a crankshaft and connecting rod assembly for a high-power pump includes a crankshaft, a first connecting rod, and a second connecting rod. The crankshaft includes a first journal configured to be rotatably supported in a first frame section of the high-power pump; a second journal configured to be rotatably supported in a second frame section of the high-power pump, the first journal and the second journal defining therebetween a longitudinal crankshaft axis; and a crankpin between the first journal and the second journal and defining a longitudinal crankpin axis extending substantially parallel to and offset from the longitudinal crankshaft axis. The crankpin includes a crankpin body extending along the longitudinal crankpin axis and defining a crankpin surface, the crankpin surface being substantially cylindrical; a first ridge at least partially extending circumferentially around the crankpin surface of the crankpin body; and a second ridge longitudinally spaced from the first ridge and at least partially extending circumferentially around the crankpin surface of the crankpin body. The first connecting rod includes a first elongated rod body, a first rod clamp, a second rod clamp, and a first plunger connector. The first elongated rod body defines a first longitudinal rod axis and has a first crank end and a first plunger end opposite the first crank end. The first crank end includes a first crankpin connector connected to the crankpin between the first journal and the first ridge; a second crankpin connector connected to the crankpin between the second ridge and the second journal, the first crank end defining a connecting rod clearance between the first crankpin connector and the second crankpin connector. The first rod clamp is connected to the first crankpin connector thereby to rotatably connect the first elongated rod body to the crankpin. The second rod clamp is connected to the second crankpin connector thereby to rotatably connect the first elongated rod body to the crankpin. The first plunger connector is at the plunger end of the first elongated rod body and configured to connect a first plunger to the first elongated rod body. The second connecting rod includes a second elongated rod body defining a second longitudinal rod axis and having a second crank end and a second plunger end opposite the second crank end, the second crank end including a third crankpin connector connected to the crankpin between the first crankpin connector and the second crankpin connector of the first connecting rod, thereby to increase pumping capacity of the high-power pump without substantially increasing a length of the high-power pump.

According to a forty-fifth aspect of the disclosure, in combination with the forty-fourth aspect, one or more of the first ridge or the second ridge may include a ridge base and a ridge extension extending radially outward from the ridge base; and one or more of the ridge base or the ridge extension may at least partially define a ridge radius, the ridge radius being concave.

According to a forty-sixth aspect of the disclosure, in combination with the forty-fifth aspect, the crankshaft and connecting rod assembly may further include a first crankpin bushing associated with the first crankpin connector and acting as a first bearing between the first crankpin connector and the crankpin; a second crankpin bushing associated with the second crankpin connector and acting as a second bearing between the second crankpin connector and the crankpin; and a third crankpin bushing associated with the third crankpin connector and acting as a bearing between the third crankpin connector and the crankpin.

According to a forty-seventh aspect of the disclosure, in combination with the forty-sixth aspect, the first crankpin bushing may include a first interior surface facing the crankpin and first outboard edges having first lateral surfaces, one or more of the first outboard edges at least partially defining a first bushing radius extending between the first interior surface and one or more of the first lateral surfaces, the first bushing radius being convex; the second crankpin bushing may include a second interior surface facing the crankpin and second outboard edges having second lateral surfaces, one or more of the second outboard edges at least partially defining a second bushing radius extending between the second interior surface and one or more of the second lateral surfaces, the second bushing radius being convex; or the third crankpin bushing may include a third interior surface facing the crankpin and third outboard edges having third lateral surfaces, one or more of the third outboard edges at least partially defining a third bushing radius extending between the third interior surface and one or more of the third lateral surfaces, the third bushing radius being convex.

According to a forty-eighth aspect of the disclosure, in combination with the forty-seventh aspect, one or more of the first bushing radius, the second bushing radius, or the third bushing radius may nest between two of the ridge radii.

According to a forty-ninth aspect of the disclosure, in combination with the forty-seventh aspect, the ridge radius may be greater than one or more of the first bushing radius, the second bushing radius, or the third bushing radius.

According to a fiftieth aspect of the disclosure, in combination with the forty-fourth aspect, the crankpin body may define a first end and a second end between which the crankpin surface extends; the first ridge may be spaced from and adjacent the first end of the crankpin body and may define a first rod receiver portion between the first end of the crankpin body and the first ridge; and the second ridge may be located between the first ridge and the second end of the crankpin body and may define a second rod receiver portion between the first ridge and the second ridge and a third rod receiver portion between the second ridge and the second end of the crankpin body.

According to a fifty-first aspect of the disclosure, in combination with the fiftieth aspect, the first crankpin connector may be connected to the crankpin at the first rod receiver portion; the second crankpin connector may be connected to the crankpin at the third rod receiver portion; and the third crankpin connector may be connected to the crankpin at the second rod receiver portion.

According to a fifty-second aspect of the disclosure, in combination with the forty-fourth aspect, the second connecting rod may further include a third rod clamp connected to the third crankpin connector thereby to rotatably connect the second elongated rod body to the crankpin between the first crankpin connector and the second crankpin connector of the first connecting rod; and a second plunger connector at the second plunger end of the second elongated rod body and configured to connect a second plunger to the second elongated rod body.

According to a fifty-third aspect of the disclosure, in combination with the forty-fourth aspect, the third crankpin connector may be connected to the crankpin in the connecting rod clearance of the first connecting rod.

According to a fifty-fourth aspect of the disclosure, in combination with the forty-fourth aspect, the first longitudinal rod axis of the first connecting rod and the second longitudinal rod axis of the second connecting rod may lie in a common rod plane.

According to a fifty-fifth aspect of the disclosure, in combination with the forty-sixth aspect, the first crankpin connector may define a first connector width perpendicular to the first longitudinal rod axis, and the first crankpin bushing may have a first bushing width greater than the first connector width; the second crankpin connector may define a second connector width perpendicular to the first longitudinal rod axis, and the second crankpin bushing may have a second bushing width greater than the second connector width; or the third crankpin connector may define a third connector width perpendicular to the second longitudinal rod axis, and the third crankpin bushing may have a third bushing width greater than the third connector width.

According to a fifty-sixth aspect of the disclosure, a high-power pump includes a pump frame, a crankshaft, a first connecting rod, a first plunger, a second connecting rod, and a second plunger. The crankshaft includes a first journal configured to be rotatably supported in the frame; a second journal configured to be rotatably supported in the frame, the first journal and the second journal defining therebetween a longitudinal crankshaft axis; and a crankpin between the first journal and the second journal and defining a longitudinal crankpin axis extending substantially parallel to and offset from the longitudinal crankshaft axis. The crankpin includes a crankpin body extending along the longitudinal crankpin axis and defining a crankpin surface, the crankpin surface being substantially cylindrical; a first ridge at least partially extending circumferentially around the crankpin surface of the crankpin body; and a second ridge longitudinally spaced from the first ridge and at least partially extending circumferentially around the crankpin surface of the crankpin body. The first connecting rod includes a first elongated rod body, a first rod clamp, a second rod clamp, and a first plunger connector. The first elongated rod body defines a first longitudinal rod axis and has a first crank end and a first plunger end opposite the first crank end. The first crank end includes a first crankpin connector connected to the crankpin between the first journal and the first ridge; and a second crankpin connector connected to the crankpin between the second ridge and the second journal, the first crank end defining a connecting rod clearance between the first crankpin connector and the second crankpin connector. The first rod clamp is connected to the first crankpin connector thereby to rotatably connect the first elongated rod body to the crankpin. The second rod clamp is connected to the second crankpin connector thereby to rotatably connect the first elongated rod body to the crankpin. The first plunger connector is at the plunger end of the first elongated rod body. The first plunger is connected to the first plunger end of the first connecting rod. The second connecting rod includes a second elongated rod body defining a second longitudinal rod axis and having a second crank end and a second plunger end opposite the second crank end, the second crank end including a third crankpin connector connected to the crankpin between the first crankpin connector and the second crankpin connector of the first connecting rod. The second plunger is connected to the second plunger end of the second connecting rod, thereby to increase pumping capacity of the high-power pump without substantially increasing a length of the high-power pump, thereby to increase pumping capacity of the high-power pump without substantially increasing a length of the high-power pump.

According to a fifty-seventh aspect of the disclosure, in combination with the fifty-sixth aspect, one or more of the first ridge or the second ridge may include a ridge base and a ridge extension extending radially outward from the ridge base; and one or more of the ridge base or the ridge extension may at least partially define a ridge radius, the ridge radius being concave.

According to a fifty-eight aspect of the disclosure, in combination with the fifty-seventh aspect, the high-power pump may further include a first crankpin bushing associated with the first crankpin connector and acting as a first bearing between the first crankpin connector and the crankpin; a second crankpin bushing associated with the second crankpin connector and acting as a second bearing between the second crankpin connector and the crankpin; and a third crankpin bushing associated with the third crankpin connector and acting as a third bearing between the third crankpin connector and the crankpin.

According to a fifty-ninth aspect of the disclosure, in combination with the fifty-eight aspect, the first crankpin bushing may include a first interior surface facing the crankpin and first outboard edges having first lateral surfaces, one or more of the first outboard edges at least partially defining a first bushing radius extending between the first interior surface and one or more of the first lateral surfaces, the first bushing radius being convex; the second crankpin bushing may include a second interior surface facing the crankpin and second outboard edges having second lateral surfaces, one or more of the second outboard edges at least partially defining a second bushing radius extending between the second interior surface and one or more of the second lateral surfaces, the second bushing radius being convex; or the third crankpin bushing may include a third interior surface facing the crankpin and third outboard edges having third lateral surfaces, one or more of the third outboard edges at least partially defining a third bushing radius extending between the third interior surface and one or more of the third lateral surfaces, the third bushing radius being convex.

According to a sixtieth aspect of the disclosure, in combination with the fifty-ninth aspect, the crankpin body may define a first end and a second end between which the crankpin surface extends; the first journal and the second journal each may at least partially define a journal radius, the journal radius being concave; and one or more of the first bushing radius, the second bushing radius, or the third bushing radius may nest between one or more of two of the ridge radii, or one of the ridge radii and one of the journal radii.

According to a sixty-first aspect of the disclosure, in combination with the sixtieth aspect, the ridge radii and the journal radii may be greater than one or more of the first bushing radius or the second bushing radius.

According to a sixty-second aspect of the disclosure, in combination with the fifty-sixth aspect, the crankpin body may define a first end and a second end between which the crankpin surface extends; the first ridge may be spaced from and adjacent the first end of the crankpin body and may define a first rod receiver portion between the first end of the crankpin body and the first ridge; and the second ridge may be located between the first ridge and the second end of the crankpin body and may define a second rod receiver portion between the first ridge and the second ridge and a third rod receiver portion between the second ridge and the second end of the crankpin body.

According to a sixty-third aspect of the disclosure, in combination with the sixty-second aspect, the first crankpin connector may be connected to the crankpin at the first rod receiver portion; the second crankpin connector may be connected to the crankpin at the third rod receiver portion; and the third crankpin connector may be connected to the crankpin at the second rod receiver portion.

According to a sixty-fourth aspect of the disclosure, in combination with the fifty-sixth aspect, the second connecting rod may further include a third rod clamp connected to the third crankpin connector thereby to rotatably connect the second elongated rod body to the crankpin between the first crankpin connector and the second crankpin connector of the first connecting rod.

According to a sixty-fifth aspect of the disclosure, in combination with the sixty-fourth aspect, the third crankpin connector may be connected to the crankpin in the connecting rod clearance of the first connecting rod.

According to a sixty-sixth aspect of the disclosure, in combination with the fifty-sixth aspect, the first longitudinal rod axis of the first connecting rod and the second longitudinal rod axis of the second connecting rod may lie in a common rod plane.

According to a sixty-seventh aspect of the disclosure, in combination with the fifty-eight aspect, the first crankpin connector may define a first connector width perpendicular to the first longitudinal rod axis, and the first crankpin bushing may have a first bushing width greater than the first connector width; the second crankpin connector may define a second connector width perpendicular to the first longitudinal rod axis, and the second crankpin bushing may have a second bushing width greater than the second connector width; or the third crankpin connector may define a third connector width perpendicular to the second longitudinal rod axis, and the third crankpin bushing may have a third bushing width greater than the third connector width.

According to a sixty-eight aspect of the disclosure, in combination with the fifty-sixth aspect, the first plunger connected to the first plunger end of the first connecting rod may reciprocate in a first plane and the second plunger connected to the second plunger end of the second connecting rod may reciprocate in a second plane, the first plane and the second plane defining a non-zero offset angle between the first plane and the second plane.

According to a sixty-ninth aspect of the disclosure, in combination with the sixty-eight aspect, the non-zero offset angle may range from about thirty degrees to about one hundred-fifty degrees.

According to a seventieth aspect of the disclosure, in combination with one or more of the first aspect through the sixty-ninth aspect, a method for attaching connecting rods to a crankshaft of a high-power pump includes providing a first ridge at least partially extending circumferentially around a crankpin of the crankshaft; providing a second ridge spaced from the first ridge and at least partially extending circumferentially around the crankpin, the first ridge at least partially defining a first rod receiver portion, the first ridge and the second ridge at least partially defining a second rod receiver portion therebetween, and the second ridge at least partially defining a third rod receiver portion; connecting a first connecting rod at the first rod receiver portion and at the third rod receiver portion; and connecting a second connecting rod at the second rod receiver portion, one or more of the first ridge or the second ridge being positioned to substantially prevent one or more of the first connecting rod or the second connecting rod from moving longitudinally on the crankpin and contacting one another, thereby to increase pumping capacity of the high-power pump without substantially increasing a length of the high-power pump.

According to a seventy-first aspect of the disclosure, in combination with the seventieth aspect, connecting a first connecting rod at the first rod receiver portion and at the third rod receiver portion includes connecting a first crankpin connector of the first connecting rod and a first rod clamp to the first rod receiver portion of the crankpin; and connecting a second crankpin connector of the first connecting rod and a second rod clamp to the third rod receiver portion of the crankpin.

According to a seventy-second aspect of the disclosure, in combination with the seventieth aspect, connecting the second connecting rod at the second rod receiver portion includes connecting a third crankpin connector of the second connecting rod and a third rod clamp to the second rod receiver portion of the crankpin.

According to a seventy-third aspect of the disclosure, in combination with the seventieth aspect, the first connecting rod defines a first longitudinal rod axis, and the second connecting rod defines a second longitudinal rod axis; and connecting the first connecting rod and connecting the second connecting rod includes connecting the first connecting rod and connecting the second connecting rod, such that the first longitudinal rod axis and the second longitudinal rod axis lie in a common rod plane.

According to a seventy-fourth aspect of the disclosure, in combination with the seventieth aspect, providing the first ridge includes including a first ridge radius on a first side of the first ridge and a second ridge radius on a second side opposite the first side of the first ridge; and providing the second ridge includes including a third ridge radius on a first side of the second ridge and a fourth ridge radius on a second side of the second ridge opposite the first side of the second ridge.

In some aspects, one or more of the first ridge radius, the second ridge radius, the third ridge radius, or the fourth ridge radius may be configured to one or more of reduce stress concentration, reduce wear, or reduce friction between one or more of (a) the first connecting rod and the crankpin or (a) the second connecting rod and the crankpin.

According to a seventy-fifth aspect of the disclosure, in combination with the seventy-fourth aspect, the method further includes providing a first crankpin bushing between the first connecting rod and the crankpin, the first crankpin bushing defining a first bushing radius and a second bushing radius at opposite edges of the first crankpin bushing; and providing a second crankpin bushing between the second connecting rod and the crankpin, the second crankpin bushing defining a third bushing radius and a fourth bushing radius at opposite edges of the second crankpin bushing, one or more of the first bushing radius, the second bushing radius, the third bushing radius, or the fourth bushing radius being configured to interact with one or more of the first ridge radius, the second ridge radius, the third ridge radius, or the fourth ridge radius.

According to a seventy-sixth aspect of the disclosure, in combination with one or more of the first aspect through the sixty-ninth aspect, a method of operating a pump to increase pumping capacity during operating of the pump includes supplying power to a pump having a longitudinal pump axis; driving via the power a crankpin connected to a first plunger and a second plunger to cause the first plunger and the second plunger to reciprocate and draw-in fluid at a first pressure during an intake stroke and discharge fluid at a second pressure greater than the first pressure during a discharge stroke, the first plunger and the second plunger being substantially longitudinally aligned relative to the longitudinal pump axis; and flowing fluid responsive to operating of the pump.

According to a seventy-seventh aspect of the disclosure, in combination with the seventy-sixth aspect, driving via the power the crankpin connected to the first plunger and the second plunger includes: connecting the first plunger to the crankpin via a first connecting rod; connecting the second plunger to the crankpin via a second connecting rod; and separating the first connecting rod from the second connecting rod via one or more ridges on the crankpin.

According to a seventy-eight aspect of the disclosure, in combination with the seventy-seventh aspect, separating the first connecting rod from the second connecting rod via the one or more ridges on the crankpin includes providing a ridge radius on the one or more ridges.

According to a seventy-ninth aspect of the disclosure, in combination with the seventy-eight aspect, the method further includes providing a first bushing between the first connecting rod and the crankpin and a second bushing between the second connecting rod and the crankpin; and providing one or more bushing radii on the first bushing and the second bushing.

According to an eightieth aspect of the disclosure, in combination with one or more of the first aspect through the sixty-ninth aspect, a method of operating a pump to increase pumping capacity during operating of the pump includes: supplying power to a pump having a longitudinal pump axis; operating the pump via the power so as to pump fluid, the pump having a first plunger and a second plunger, each of the first plunger and the second plunger being configured to draw-in fluid at a first pressure during an intake stroke and discharge fluid at a second pressure greater than the first pressure during a discharge stroke, the first plunger and the second plunger being substantially longitudinally aligned relative to the longitudinal pump axis; and flowing fluid responsive to operating of the pump.

According to an eighty-first aspect of the disclosure, in combination with the eightieth aspect, operating the pump includes driving via the power a crankpin connected to the first plunger and the second plunger to cause the first plunger and the second plunger to draw-in and discharge the fluid.

According to an eighty-second aspect of the disclosure, in combination with the eighty-first aspect, driving via the power the crankpin connected to the first plunger and the second plunger includes: connecting the first plunger to the crankpin via a first connecting rod; connecting the second plunger to the crankpin via a second connecting rod; and separating the first connecting rod from the second connecting rod via one or more ridges on the crankpin.

According to an eighty-third aspect of the disclosure, in combination with the eighty-second aspect, separating the first connecting rod from the second connecting rod via the one or more ridges on the crankpin includes providing a ridge radius on the one or more ridges.

According to an eighty-fourth aspect of the disclosure, in combination with the eighty-third aspect, the method further includes providing a first bushing between the first connecting rod and the crankpin and a second bushing between the second connecting rod and the crankpin; and providing one or more bushing radii on the first bushing and the second bushing.

According to an eighty-fifth aspect of the disclosure, in combination with one or more of the first aspect through the sixty-ninth aspect, a method of operating a pump to increase pumping capacity during operating of the pump includes supplying power to a pump; operating the pump via the power so as to pump fluid via rotation of a crankpin connected to two or more plungers to cause the two or more plungers to reciprocate through a stroke length to draw-in fluid at a first pressure during an intake stroke and discharge fluid during a discharge stroke at a second pressure greater than the first pressure, the two or more plungers discharging a first volume of fluid per stroke of the two or more plungers that is greater than a second volume of fluid per stroke discharged by another plunger of another pump reciprocating through the stroke length and discharging the first volume per stroke during operation of the another pump; and flowing fluid responsive to operating of the pump.

According to an eighty-sixth aspect of the disclosure, in combination with the eighty-fifth aspect, operating the pump via the power includes: connecting a first plunger of the two or more plungers to the crankpin via a first connecting rod; connecting a second plunger of the two or more plungers to the crankpin via a second connecting rod; and separating the first connecting rod from the second connecting rod via one or more ridges on the crankpin.

According to an eighty-seventh aspect of the disclosure, in combination with the eighty-sixth aspect, separating the first connecting rod from the second connecting rod via the one or more ridges on the crankpin includes providing a ridge radius on the one or more ridges.

According to an eighty-eight aspect of the disclosure, in combination with the eighty-seventh aspect, the method further includes providing a first bushing between the first connecting rod and the crankpin and a second bushing between the second connecting rod and the crankpin; and providing one or more bushing radii on the first bushing and the second bushing.

According to an eighty-ninth aspect of the disclosure, in combination with one or more of the first aspect through the sixty-ninth aspect, a method of operating a pump to increase pumping capacity during operating of the pump includes supplying power to a pump having a pump length and a pump width defining a pump footprint; operating the pump via the power so as to pump fluid via rotation of a crankpin connected to two or more plungers to cause the two or more plungers to reciprocate through a stroke length to draw-in fluid at a first pressure during an intake stroke and discharge fluid during a discharge stroke at a second pressure greater than the first pressure, the two or more plungers discharging a first volume of fluid per stroke of the two or more plungers that is greater than a second volume of fluid per stroke discharged by another pump having another pump footprint substantially equal to or greater than the footprint of the pump; and flowing fluid responsive to operating of the pump.

According to a ninetieth aspect of the disclosure, in combination with the eighty-ninth aspect, operating the pump via the power includes connecting a first plunger of the two or more plungers to the crankpin via a first connecting rod; connecting a second plunger of the two or more plungers to the crankpin via a second connecting rod; and separating the first connecting rod from the second connecting rod via one or more ridges on the crankpin.

According to a ninety-first aspect of the disclosure, in combination with the ninetieth aspect, separating the first connecting rod from the second connecting rod via the one or more ridges on the crankpin includes providing a ridge radius on the one or more ridges.

According to a ninety-second aspect of the disclosure, in combination with the ninety-first aspect, the method further includes providing a first bushing between the first connecting rod and the crankpin and a second bushing between the second connecting rod and the crankpin; and providing one or more bushing radii on the first bushing and the second bushing.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems, methods, and/or aspects or techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto, the disclosure may be practiced other than as specifically described.

This is a continuation-in-part of U.S. application Ser. No. 17/664,578, filed May 23, 2022, titled "HYDRAULIC FRACTURING PUMPS TO ENHANCE FLOW OF FRACTURING FLUID INTO WELLHEADS AND RELATED METHODS," which claims priority to and the benefit of U.S. Provisional Application No. 63/202,031, filed May 24, 2021, the disclosures of both of which are incorporated herein by reference in their entireties.

The scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further may be made thereto without departing from the spirit and scope of the present disclosure as set forth in the appended claims.

What is claimed is:

1. A crankshaft for a hydraulic fracturing pump, the crankshaft comprising:

a first journal configured to be rotatably supported in a first frame section of the pump;

a second journal configured to be rotatably supported in a second frame section of the pump, the first journal and the second journal defining therebetween a longitudinal crankshaft axis;

a crankpin between the first journal and the second journal and defining a longitudinal crankpin axis extending substantially parallel to and offset from the longitudinal crankshaft axis, the crankpin configured to receive one or more connecting rods, the one or more connecting rods including a first connecting rod having first and second crankpin connectors spaced along the crankpin and a rod body with a crank end and a plunger end opposite the crank end, the crank end including at least one connector connected to the crankpin, and including:

a crankpin body extending along the longitudinal crankpin axis and defining a crankpin surface, the crankpin surface being substantially cylindrical;

a first ridge at least partially extending circumferentially around the crankpin surface; and a second ridge longitudinally spaced from the first ridge and at least partially extending circumferentially around the crankpin surface, wherein each of the first ridge and the second ridge includes a ridge extension, the ridge extension extending between:

a first ridge base extending radially outward from a first side of the ridge extension, and a second ridge base extending radially outward from a second side of the ridge extension; and a second connecting rod having a crank end with a third crankpin connector configured to be rotatably mounted on the crankpin between the first and second crankpin connectors of the first connecting rod.

2. The crankshaft of claim 1, wherein the crankpin body defines a first end and a second end between which the crankpin surface extends, the first ridge is spaced from and adjacent to the first end of the crankpin body, and the second ridge is located between the first ridge and the second end of the crankpin body.

3. The crankshaft of claim 2, wherein the crankpin body defines a first rod receiver portion between the first end of the crankpin body and the first ridge, a second rod receiver portion between the first ridge and the second ridge, and a third rod receiver portion between the second ridge and the second end of the crankpin body.

4. The crankshaft of claim 2, wherein one or more of the ridge base or the ridge extension at least partially defines a concave ridge radius.

5. The crankshaft of claim 4, wherein the ridge radius is a first ridge radius, the first ridge radius is on a first side of the one or more of the first ridge or the second ridge, and the one or more of the first ridge or the second ridge further includes a second side longitudinally opposite the first side, the second side at least partially defining a concave second ridge radius.

6. The crankshaft of claim 4, wherein the ridge base is a first ridge base, the ridge radius is a first ridge radius, the one or more of the first ridge or the second ridge includes a second ridge base extending radially outward to the ridge extension, and one or more of the second ridge base or the ridge extension at least partially defines a concave second ridge radius.

7. The crankshaft of claim 6, wherein each of the one or more of the first ridge or the second ridge includes the first ridge radius and the second ridge radius.

8. The crankshaft of claim 7, wherein one or more of the first journal or the first end at least partially defines a concave first journal radius, and one or more of the second journal or the second end defines a concave second journal radius.

9. The crankshaft of claim 8, wherein the first ridge radius, the second ridge radius, the first journal radius, and the second journal radius have at least one substantially equal dimension.

10. An assembly, comprising:

a crankshaft including:

a first journal configured to be rotatably supported in a first frame section of a pump;

a second journal configured to be rotatably supported in a second frame section of the pump, the first and the second journals defining therebetween a longitudinal crankshaft axis; and a crankpin between the first journal and the second journal and defining a longitudinal crankpin axis extending substantially parallel to and offset from the longitudinal crankshaft axis, the crankpin including:

a crankpin body extending along the longitudinal crankpin axis and defining a crankpin surface, the crankpin surface being substantially cylindrical;

a first ridge at least partially extending circumferentially around the crankpin surface; and a second ridge longitudinally spaced from the first ridge and at least partially extending circumferentially around the crankpin surface;

a first connecting rod including:

a first elongated rod body defining a first longitudinal rod axis and having a first crank end and a first plunger end opposite the first crank end, the first crank end including:

a first crankpin connector connected to the crankpin between the first journal and the first ridge; and a second crankpin connector connected to the crankpin between the second ridge and the second journal, the first crank end defining a connecting rod clearance between the first crankpin connector and the second crankpin connector; and a second connecting rod including a second elongated rod body defining a second longitudinal rod axis and having a second crank end and a second plunger end opposite the second crank end, the second crank end including a third crankpin connector connected to the crankpin between the first crankpin connector and the second crankpin connector of the first connecting rod.

11. The assembly of claim 10, wherein the third crankpin connector is connected to the crankpin in the connecting rod clearance of the first connecting rod.

12. The assembly of claim 10, wherein the first longitudinal rod axis of the first connecting rod and the second longitudinal rod axis of the second connecting rod lie in a common rod plane.

13. The assembly of claim 10, wherein the crankpin body defines a first end and a second end between which the crankpin surface extends, the first ridge is spaced from and adjacent to the first end of the crankpin body, the crankpin body defines a first rod receiver portion between the first end of the crankpin body and the first ridge, the second ridge is located between the first ridge and the second end of the crankpin body, the crankpin body defines a second rod receiver portion between the first ridge and the second ridge, and the crankpin body defines a third rod receiver portion between the second ridge and the second end of the crankpin body.

14. The assembly of claim 13, wherein the first crankpin connector is connected to the crankpin at the first rod receiver portion; the second crankpin connector is connected to the crankpin at the third rod receiver portion; and the third crankpin connector is connected to the crankpin at the second rod receiver portion.

15. The assembly of claim 13, wherein each of the first ridge and the second ridge includes a first ridge base, a second ridge base, and a ridge extension; the first ridge base and the ridge extension define a concave first ridge radius; and the second ridge base and the ridge extension define a concave second ridge radius.

16. The assembly of claim 15, further including:

a first crankpin bushing associated with the first crankpin connector and acting as a first bearing between the first crankpin connector and the crankpin;

a second crankpin bushing associated with the second crankpin connector and acting as a second bearing between the second crankpin connector and the crankpin; and a third crankpin bushing associated with the third crankpin connector and acting as a third bearing between the third crankpin connector and the crankpin.

17. The assembly of claim 16, wherein one or more of:

the first crankpin bushing includes a first interior surface facing the crankpin and first outboard edges having first lateral surfaces, one or more of the first outboard edges at least partially defining a convex first bushing radius extending between the first interior surface and one or more of the first lateral surfaces;

the second crankpin bushing includes a second interior surface facing the crankpin and second outboard edges having second lateral surfaces, one or more of the second outboard edges at least partially defining a convex second bushing radius extending between the second interior surface and one or more of the second lateral surfaces; or the third crankpin bushing includes a third interior surface facing the crankpin and third outboard edges having third lateral surfaces, one or more of the third outboard edges at least partially defining a convex third bushing radius extending between the third interior surface and one or more of the third lateral surfaces.

18. The assembly of claim 17, wherein one or more of the first journal or the first end at least partially defines a concave first journal radius and one or more of the second journal or the second end defines a concave second journal radius.

19. The assembly of claim 18, wherein each of the first bushing radius, the second bushing radius, or the third bushing radius nests between two of the ridge radii or one of the ridge radius and one of the journal radius.

20. The assembly of claim 19, wherein at least one of the first ridge radius or the second ridge radius is greater than one or more of the first bushing radius, the second bushing radius, or the third bushing radius.

* * * * *